United States Patent
Sakai et al.

(10) Patent No.: US 6,927,289 B2
(45) Date of Patent: *Aug. 9, 2005

(54) SULFATED FUCAN OLIGOSACCHARIDE

(75) Inventors: Takeshi Sakai, Shiga (JP); Hitomi Amarume, Aomori (JP); Takashi Kawai, Shiga (JP); Kaoru Kojima, Aomori (JP); Kazuo Shimanaka, Osaka (JP); Katsushige Ikai, Shiga (JP); Ikunoshin Kato, Kyoto (JP)

(73) Assignee: Takara Bio Inc., Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/694,352

(22) Filed: Oct. 28, 2003

(65) Prior Publication Data

US 2004/0146995 A1 Jul. 29, 2004

Related U.S. Application Data

(63) Continuation of application No. 10/278,942, filed on Oct. 24, 2002, now Pat. No. 6,720,419.

(30) Foreign Application Priority Data

Oct. 24, 2001 (JP) ........................................ 2001-325960

(51) Int. Cl.⁷ ............................................... C07H 5/00
(52) U.S. Cl. ................................... 536/118; 536/123.1
(58) Field of Search ............................... 536/118, 123.1

(56) References Cited

U.S. PATENT DOCUMENTS

| | | |
|---|---|---|
| 4,975,533 A | 12/1990 | Kondo et al. |
| 6,054,577 A | 4/2000 | Sakai et al. |
| 6,207,652 B1 | 3/2001 | Sakai et al. |

FOREIGN PATENT DOCUMENTS

| | | |
|---|---|---|
| EP | 1 057 833 | 12/2000 |
| EP | 1 175 907 | 1/2002 |
| EP | 1 176 153 | 1/2002 |
| WO | WO90/15823 A1 | 12/1990 |
| WO | WO97/08206 A1 | 3/1997 |
| WO | WO01/81560 | 11/2001 |

OTHER PUBLICATIONS

Masato Nagaoka et al "Structural Study of Fucoidan from Cladosiphon Okamuranus Tokida" *Glycoconjugate Journal* (1999) 16:19–26.

*Primary Examiner*—Elli Peselev
(74) *Attorney, Agent, or Firm*—Browdy and Neimark, P.L.L.C.

(57) ABSTRACT

A smaller molecule obtainable by allowing a sulfated fucan-digesting enzyme which digests a novel sulfated polysaccharide derived from an alga belonging to Laminariales to act on a sulfated fucan, and a method for producing the same.

2 Claims, 27 Drawing Sheets

SULFATED FUCAN OLIGOSACCHARIDE

BACKGROUND OF THE INVENTION

1. Field of the Invention

The present invention relates to a sulfated fucan oligosaccharide which is useful in a field of glycotechnology, and a method for producing the same.

2. Description of Related Art

Brown algae contain a variety of sulfated polysaccharides. These polysaccharides are often generically called fucoidans or fucoidins. In many cases, their structures vary depending on the algae from which they derive. For example, sulfated polysaccharides extracted from *Fucus vesiculosus, Laminaria japonica, Cladosiphon okamuranus, Nemacystus decipiens* and sporophyll of *Undaria pinnatifida* have structures different each other. Therefore, it is necessary to obtain enzymes that digest the respective sulfated polysaccharides in order to obtain oligosaccharides from the sulfated polysaccharides by enzymatically digesting them or to determine their structures.

Molecular species of sulfated polysaccharides including sulfated fucans, sulfated fucoglucuronomannans and sulfated fucogalactans as well as several other molecular species have been reported. Sulfated polysaccharides generally have some biological activities in many cases. For example, a sulfated fucan fraction has been reported to have a strong anticoagulant activity, and a sulfated fucoglucuronomannan fraction has been reported to have an apoptosis-inducing activity against tumor cells.

If a sulfated polysaccharide is to be developed as a pharmaceutical, it is necessary to determine its structure. It is very advantageous to determine the structure using an enzyme that digests the sulfated polysaccharide. However, no enzyme that digests a sulfated polysaccharide from a brown alga is commercially available. In addition, a digesting enzyme that specifically digests the sulfated polysaccharide of which the structure is to be determined is required. This is because sulfated polysaccharides from brown algae vary depending on the species of the algae in many cases. Structures of sulfated polysaccharides derived from algae belonging to Laminariales have been studied, although structures have been revealed only for a few kinds among many molecular species.

As described above, a structurally homogeneous sulfated fucan oligosaccharide which is produced by enzymatic means using an enzyme that digests a novel sulfated polysaccharide derived from an alga belonging to Laminariales (i.e., an enzyme that specifically digests a sulfated fucan) has been desired.

Thus, the main object of the present invention is to provide a smaller molecule obtainable by allowing a sulfated fucan-digesting enzyme which digests a novel sulfated polysaccharide derived from an alga belonging to Laminariales to act on a sulfated fucan, and a method for producing the same.

SUMMARY OF THE INVENTION

The first aspect of the present invention relates to a sulfated fucan having the following chemical and physical properties:

(1) containing fucose as a constituting saccharide;

(2) containing a sulfated saccharide of general formula (I) as an essential component of the constituting saccharide:

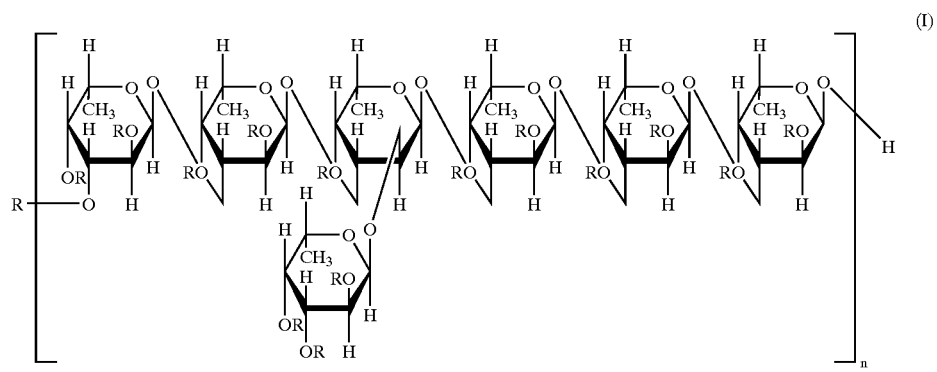

(I)

wherein R is H or $SO_3H$, at least one of Rs is $SO_3H$ and n is an integer of 1 or more; and (3) being converted into smaller molecules by a sulfated fucan-digesting enzyme derived from *Alteromonas* sp. SN-1009 to generate at least one compound selected from the group consisting of the compounds of general formulas (II), (III), (XIII), (XIV), (XV) and (XVI):

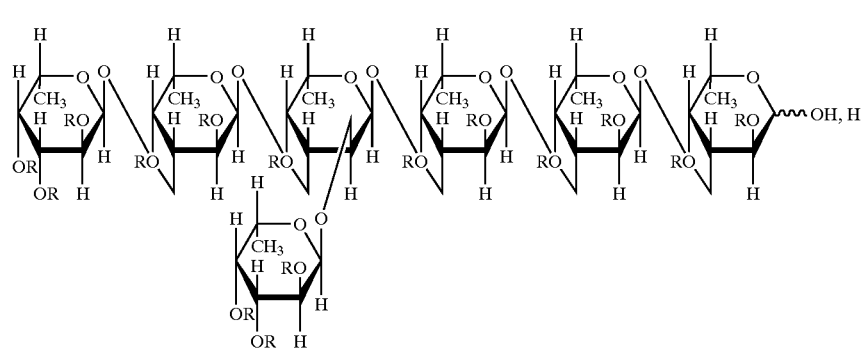
(II)
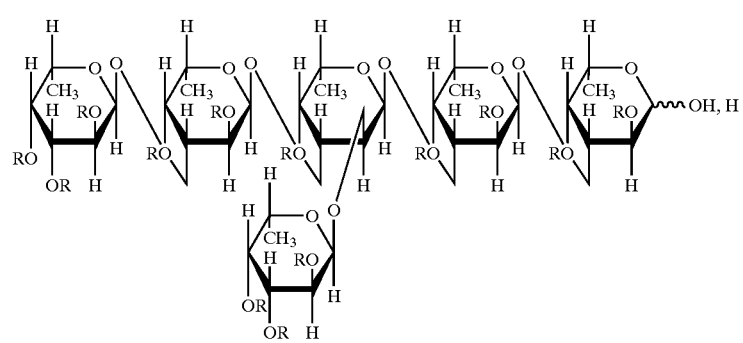
(III)
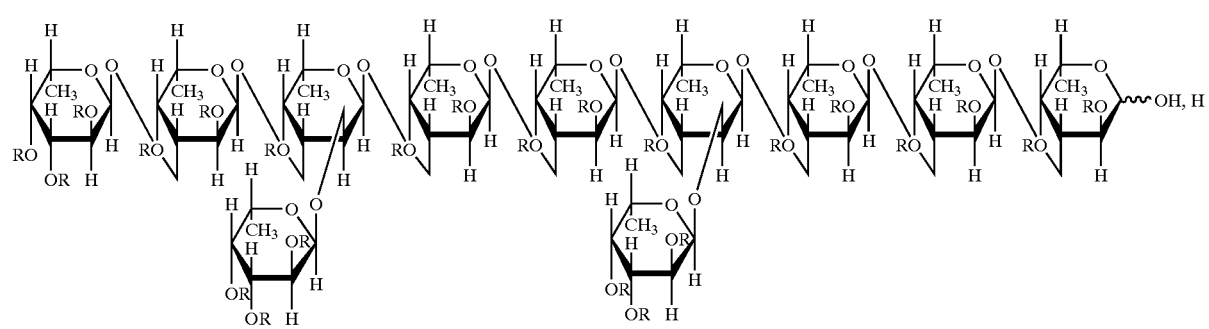
(XIII)
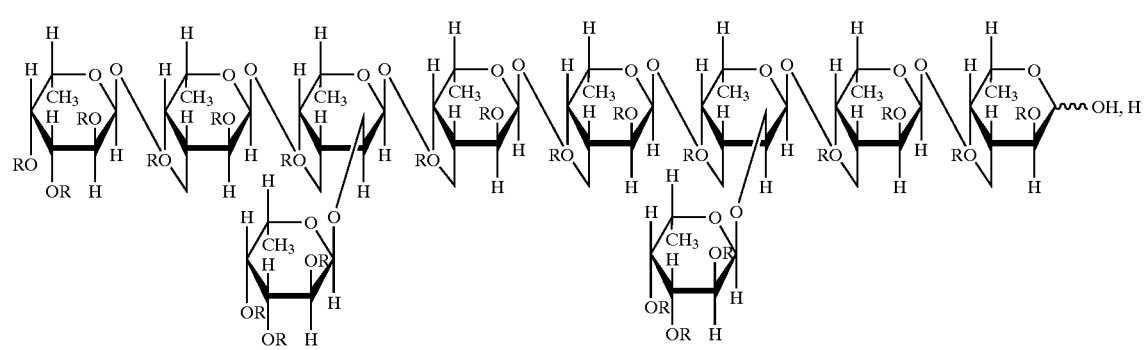
(XIV)
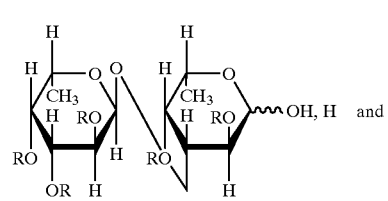 and 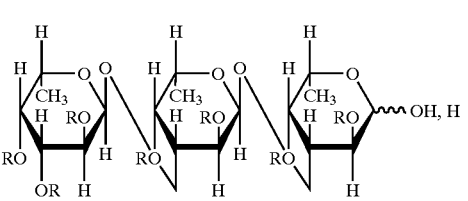
(XV)                              (XVI)
wherein R is H or SO$_3$H and at least one of Rs is SO$_3$H in all formulas above, or a salt thereof.
The second aspect of the present invention relates to a sulfated fucan oligosaccharide of general formula (I):

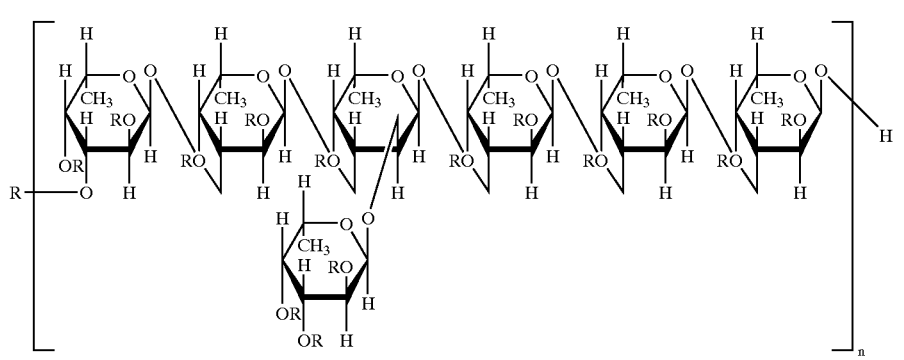

(I)

wherein R is H or SO$_3$H, at least one of Rs is SO$_3$H and n is 1 to 5.

The third aspect of the present invention relates to a method for preparing a sulfated fucan oligosaccharide, the method comprising:

allowing a sulfated fucan-digesting enzyme derived from *Alteromonas* sp. SN-1009 to act on a sulfated fucan of the first or second aspect; and collecting a digestion product.

According to the third aspect, the sulfated fucan is derived from *Kjellmaniella crassifolia, Laminaria japonica* or *Lessonia nigrescens*.

The fourth aspect of the present invention relates to a sulfated fucan oligosaccharide obtainable by the preparation method of the third aspect.

The fifth aspect of the present invention relates to a sulfated fucan oligosaccharide having a chemical structure selected from the group consisting of general formulas (II), (III), (XIII), (XIV), (XV) and (XVI):

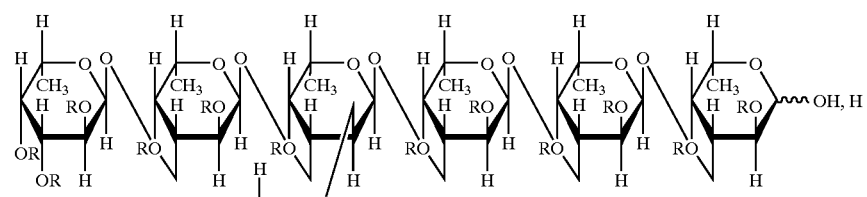

(II)

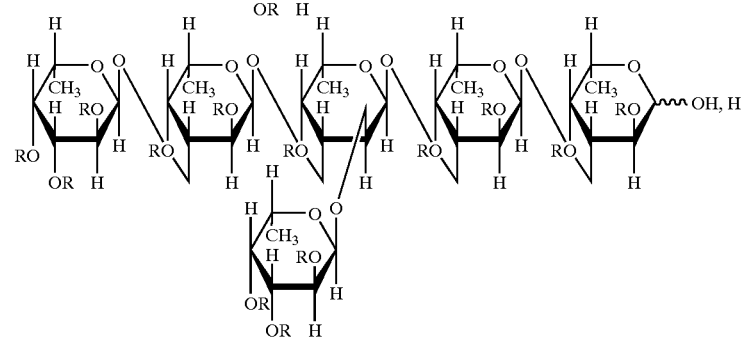

(III)

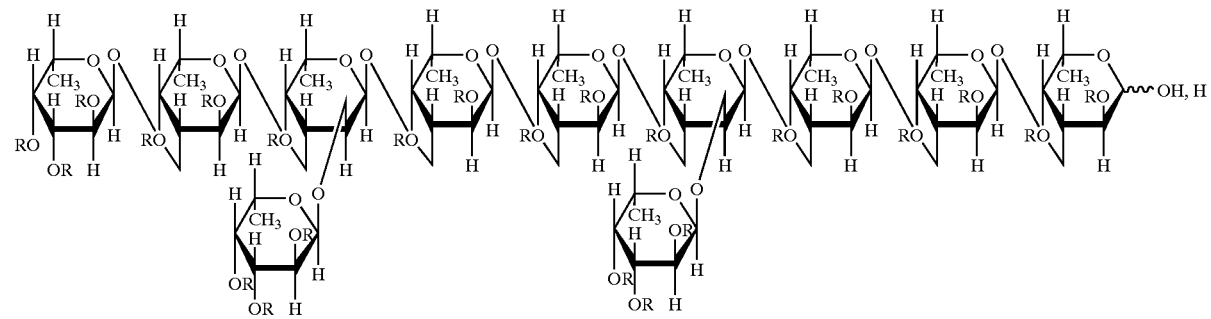

(XIII)

-continued

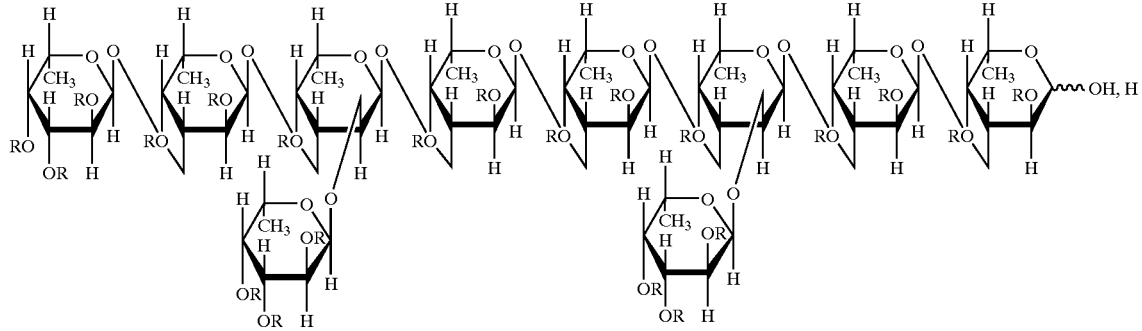

(XIV)

(XV) (XVI)

wherein R is H or SO$_3$H and at least one of Rs is SO$_3$H in all formulas above, or a salt thereof.

As a result of intensive study, the present inventors have found a method for producing a sulfated fucan oligosaccharide by digesting a novel sulfated polysaccharide derived from a alga belonging to Laminariales using a sulfated fucan-digesting enzyme. The sulfated fucan oligosaccharide can be utilized as a reagent for glycotechnology and is structurally homogeneous. Furthermore, the present inventors have determined the structure of the oligosaccharide. Thus, the present invention has been completed.

BRIEF DESCRIPTION OF THE SEVERAL VIEWS OF THE DRAWINGS

FIG. 16: a figure which illustrates the $^1$H-NMR spectrum of the sulfated fucan oligosaccharide 2-(2) according to the present invention.

FIG. 23: a figure which illustrates the $^{13}$C-NMR spectrum of the *Lessonia nigrescens* sulfated fucan oligosaccharide 1-(2) according to the present invention.

FIG. 26: a figure which illustrates the $^{13}$C-NMR spectrum of the *Lessonia nigrescens* sulfated fucan oligosaccharide 1-(3) according to the present invention.

DETAILED DESCRIPTION OF THE INVENTION

Figure 1:
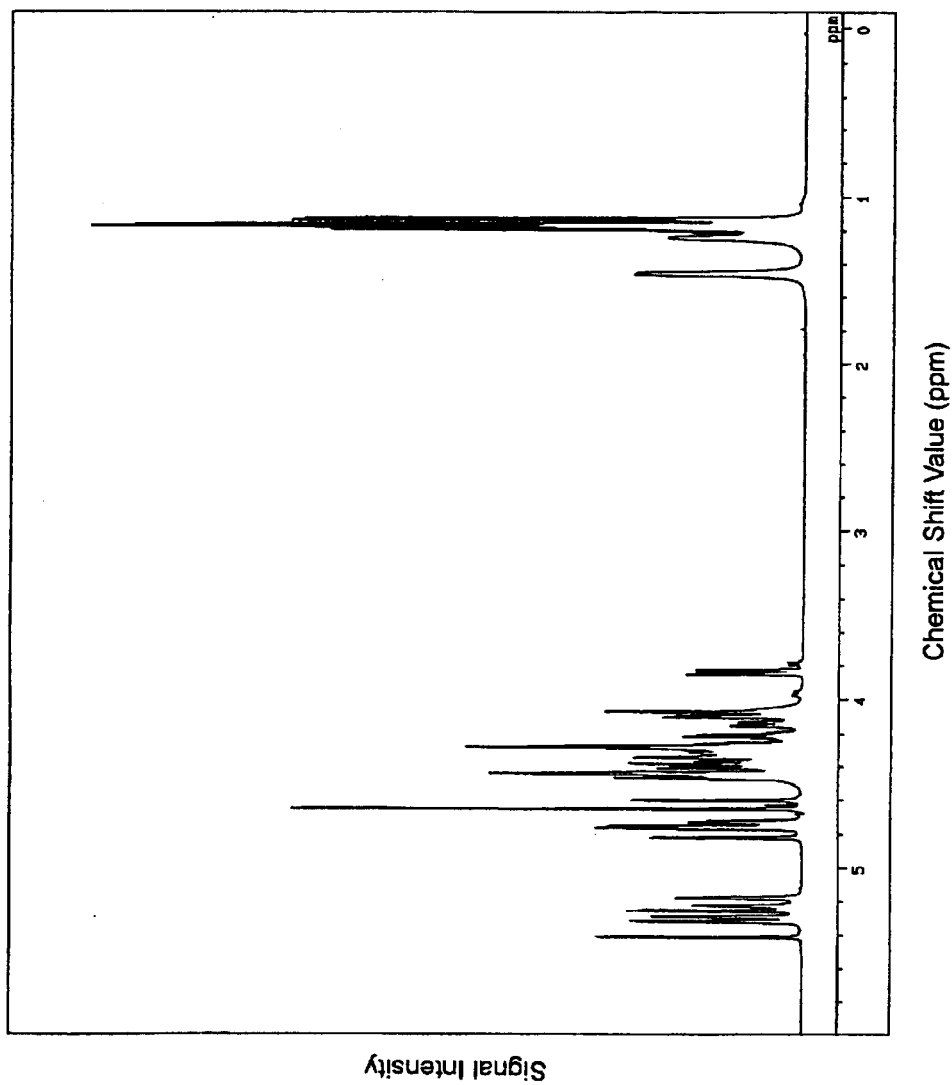
FIG. 1: a figure which illustrates the $^1$H-NMR spectrum of the sulfated fucan oligosaccharide 1-(1) according to the present invention.

The present invention will be explained in detail.

Although it is not intended to limit the present invention, for example, a sulfated fucan derived from an alga belonging to Laminariales can be used according to the present invention. This polysaccharide has a sulfate group and fucose as main constituents. The main chain of a sulfated fucan derived from an alga belonging to Laminariales is composed of L-fucose which is more acid-labile than general saccharides. Therefore, it can be readily converted into smaller molecules by heating or acid treatment.

Furthermore, amino acids, small molecule pigments or the like in the extract can be efficiently removed by ultrafiltration. Activated carbon treatment or the like is effective for the removal of hydrophobic substances.

A sulfated polysaccharide fraction from a brown alga can be obtained as described above. This fraction can be used as a sulfated fucan fraction, for example, as a substrate for the sulfated fucan-digesting enzyme according to the present invention. A more highly pure sulfated fucan can be obtained by separating the fraction using an anion exchange column. Both the sulfated polysaccharide fraction and the sulfated fucan purified using an anion exchange column can be used as raw materials for production of the sulfated fucan oligosaccharide of the present invention.

The main backbone of the sulfated fucan of the present invention is represented by general formula (I) below. The sulfated fucans of the present invention include those of the general formula wherein n is an integer of 1 or more, for example 1 to 20,000, preferably 1 to 10,000. The sulfated fucans of the present invention include those having a structure in which general formula (I) is continuously repeated and those having a structure in which general formula (I) is discontinuously included being intervened by other structures as long as they are within the definition as described above.

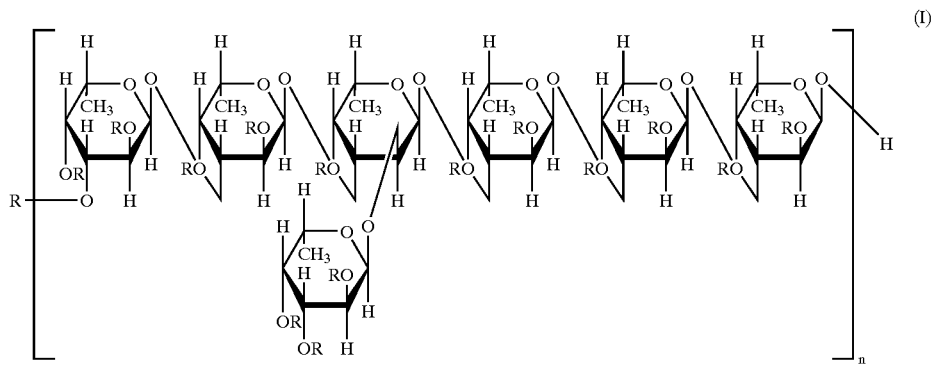

(I)

A sulfated fucan having the above-mentioned characteristics can be used according to the present invention. Although there is no specific limitation concerning the origin, for example, algae belonging to Laminariales such as *Kjellmaniella crassifolia*, *Laminaria japonica* and *Lessonia nigrescens* are preferably used as raw materials because their sulfated fucan contents are high.

The sulfated fucan-digesting enzyme according to the present invention acts on a sulfated fucan, a sulfated fucan oligosaccharide and the like and hydrolyzes an α-L-fucosyl bond between fucoses in an endo-type manner to generate an oligosaccharide having L-fucose at its reducing end.

The sulfated fucan oligosaccharide of the present invention is an oligosaccharide that is obtainable by allowing the sulfated fucan-digesting enzyme according to the present invention to act on a sulfated fucan and has L-fucose as a saccharide at the reducing end.

A water-soluble fraction extract is first obtained from a brown alga in order to produce the sulfated fucan used according to the present invention. In this case, it is preferable to obtain the water-soluble fraction extract at pH 4–9 at a temperature of 100° C. or below in order to prevent the conversion of the sulfated fucan into smaller molecules.

wherein R is H or SO$_3$H, and at least one of Rs is SO$_3$H.;

The bacterial strain producing the sulfated fucan-digesting enzyme to be used according to the present invention is classified as a bacterium belonging to genus *Alteromonas* according to the basic classification as described in Bergey's Manual of Determinative Bacteriology, Vol. 9 (1994). Classification of bacteria belonging to genus *Alteromonas* is recently re-organized. Therefore, it is not appropriate to classify the bacterium based only on the bacteriological properties. The nucleotide sequence of 16S rDNA of this bacterial strain was determined. Comparison of homologies with sequences of known bacteria revealed that a bacterium belonging to genus *Thalassomonas* has the most homologous sequence. However, since the genetic distance is 0.05 (change/average nucleotide position) or more, the bacterium was not determined to belong to this genus. Then, the present inventors concluded that this bacterium does not belong to known genera but belongs to a novel genus based on the 16S rDNA sequence homology, and designated it as *Fucanobacter lyticus* SN-1009. As used herein, *Alteromonas* sp. SN-1009 is the same as *Fucanobacter lyticus* SN-1009.

This bacterial strain is designated as *Alteromonas* sp. SN-1009 and deposited on Feb. 13, 1996 (date of original deposit) at International Patent Organism Depositary, National Institute of Advanced Industrial Science and Technology, AIST Tsukuba Central 6, 1-1, Higashi 1-Chome, Tsukuba-shi, Ibaraki-ken 305-8566, Japan. under accession number FERM BP-5747 (transmitted to international depositary authority under Budapest Treaty on Nov. 15, 1996). The 16S rDNA sequence of this bacterial strain is shown in SEQ ID NO:1.

Thus, the sulfated fucan-digesting enzyme used according to the present invention can be produced by culturing a bacterium that is determined to belong to the same genus as *Fucanobacter lyticus* SN-1009 based on the 16S rDNA sequence. According to the present invention, *Alteromonas* sp. SN-1009, a spontaneous or artificial mutant of *Alteromonas* sp. SN-1009 and microorganisms belonging to genus *Alteromonas* and genus *Fucanobacter* capable of producing the sulfated fucan-digesting enzyme used according to the present invention can be utilized.

The sulfated fucan-digesting enzyme to be used according to the present invention can be obtained from the above-mentioned microorganism according to the method as described in Example 1.

The sulfated fucan oligosaccharide of the present invention can be prepared by allowing a sulfated fucan-digesting enzyme to act on a sulfated fucan-containing material. For example, a partially purified preparation of sulfated fucan, a sulfated fucose-containing polysaccharide fraction derived from a brown alga, a product obtained by extracting a brown alga with an aqueous solvent, or a brown alga itself can be preferably used as a sulfated fucan-containing material.

For preparing the sulfated fucan oligosaccharide of the present invention, a sulfated fucan or a sulfated fucan-containing material may be dissolved according to a conventional method. The sulfated fucan of the present invention or the sulfated fucan-containing material may be dissolved in the solution at the maximal concentration. However, the concentration is usually selected taking its operationality and the amount of the sulfated fucan-digesting enzyme according to the present invention used in a reaction into consideration. The solvent for the sulfated fucan may be selected from water, buffers and the like depending on the objects. Usually, the pH of the solution is nearly neutral. The enzymatic reaction is usually carried out at about 30° C. The molecular weight of the sulfated fucan oligosaccharide can be controlled by adjusting the ratio or amount of the sulfated fucan-digesting enzyme according to the present invention used in the reaction, the composition of the reaction mixture, the reaction time and the like. The sulfated fucan oligosaccharide of the present invention having more homogeneous molecular weight distribution or more homogeneous charge density distribution can be prepared by subjecting the sulfated fucan oligosaccharide of the present invention obtained as described above to molecular weight fractionation or fractionation using an anion exchange column. A conventional means for molecular weight fractionation can be applied. For example, gel filtration or molecular weight fractionation membrane may be used. Optionally, the smaller molecules may be further purified using ion-exchange resin treatment, active carbon treatment or the like, or they may be desalted, sterilized or lyophilized. Thus, the sulfated fucan oligosaccharide of the present invention having a structure so homogeneous that one can determine the structure by NMR analysis as described below can be obtained.

Although it is not intended to limit the present invention, for example, a sulfated fucan oligosaccharide having a chemical structure selected from the group consisting of general formulas (II), (III), (XIII), (XIV), (XV) and (XVI):

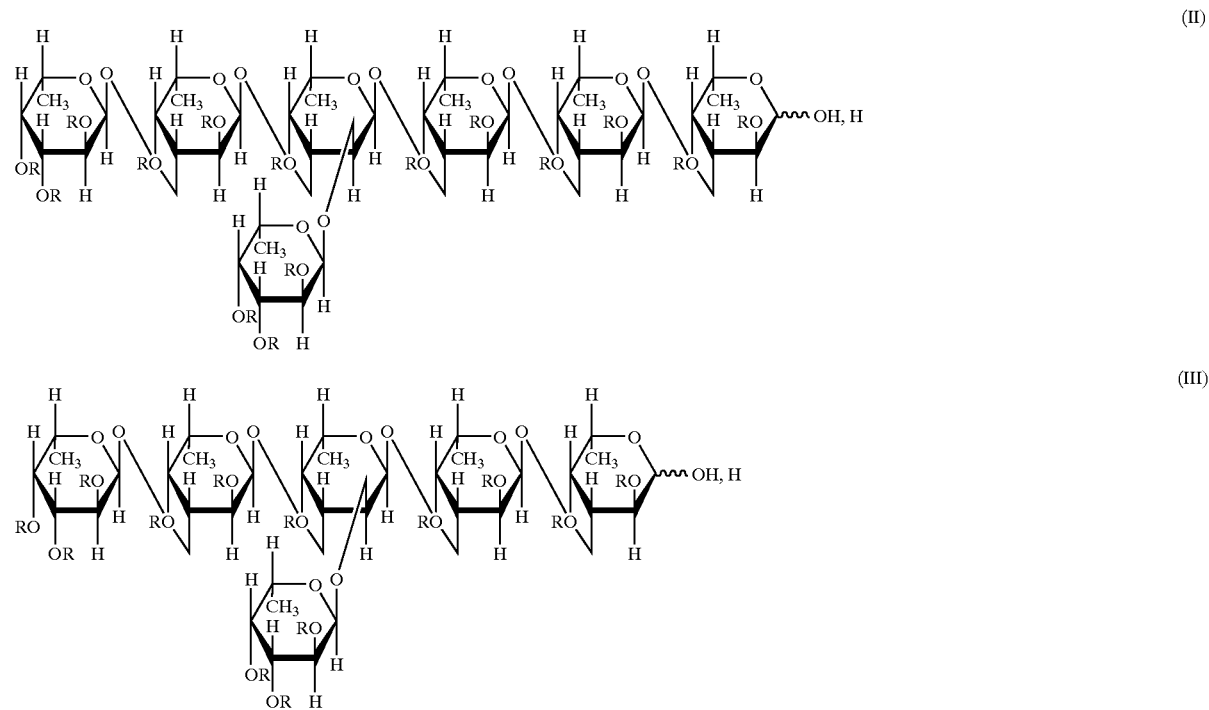

(XIII)
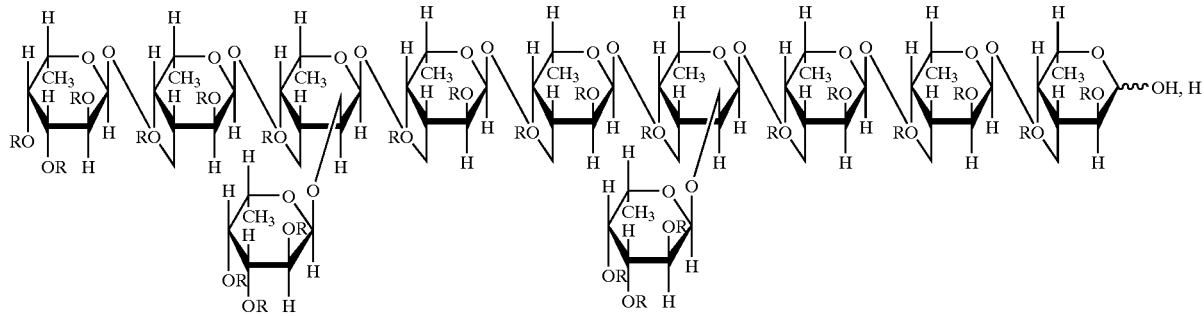

(XIV)
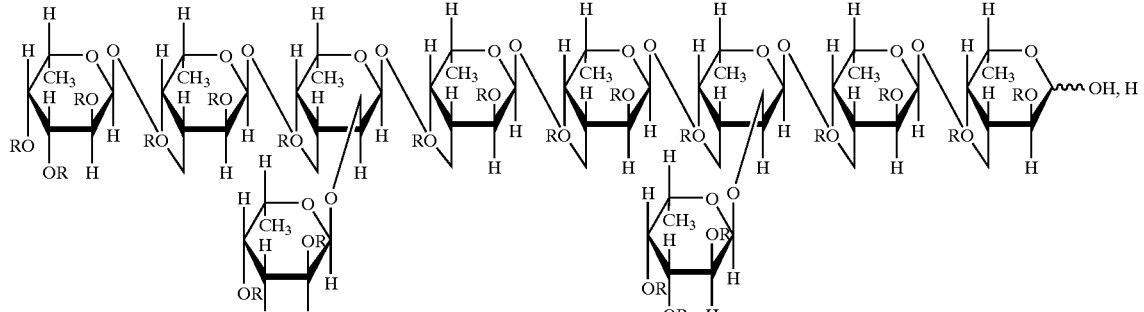

(XV)
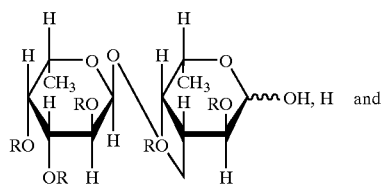
and (XVI)
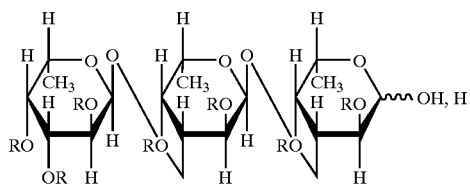

wherein R is H or SO$_3$H and at least one of Rs is SO$_3$H in all formulas above,
or a salt thereof exemplifies the sulfated fucan oligosaccharide of the present invention.

The sulfated fucan oligosaccharides of the present invention have sulfate groups within the molecules, which groups react with various bases to form salts. The sulfated fucan oligosaccharide of the present invention is stable when it is in a form of salt. It is usually provided in a form of sodium and/or potassium and/or calcium salt. The sulfated fucan oligosaccharide of the present invention in a free form can be derived from a salt thereof by utilizing cation-exchange resin such as Dowex 50W. Optionally, it can be subjected to conventional salt-exchange to convert it into any one of various desirable salts.

Pharmaceutically acceptable salts can be used as the salts of the sulfated fucan oligosaccharide of the present invention. Examples of the salts include salts with alkaline metals such as sodium and potassium and alkaline earth metals such as calcium, magnesium and zinc as well as ammonium salts.

Additionally, the sulfated fucan oligosaccharide of the present invention can be used as a reagent for glycotechnology. For example, a substance which is very useful as a reagent for glycotechnology (e.g., which can be used as a fluorescence-labeled standard for the sulfated fucan oligosaccharide) can be provided by subjecting the oligosaccharide to 2-aminopyridine (PA)-labeling according to the method as described in JP-B 5-65108 to prepare a PA-labeled oligosaccharide.

EXAMPLES

The following examples further illustrate the present invention in detail but are not to be construed to limit the scope thereof.

In the following examples, the molecular weights of the oligosaccharides of sulfated fucan are their average molecular weights that were calculated from the results of mass analyses of them.

Referential Example 1

Preparation of Fucoidan from *Kjellmaniella crassifolia*

2 kg of dried cultured *Kjellmaniella crassifolia* was disrupted using a cutter mill (Masuko Sangyo) equipped with a screen having a pore diameter of 1 mm and suspended in 20 L of 80% ethanol. The suspension was stirred at 25° C. for 3 hours and filtered through a filter paper. The residue was suspended in 40 L of 30 mM phosphate buffer (pH 6.5) containing 100 mM sodium chloride. The suspension was treated at 95° C. for 2 hours and filtered through a stainless steel screen having a pore diameter of 106 μm. 200 g of active carbon, 4.5 L of ethanol and 12,000 U of alginate lyase K (Nagase Biochemicals) were added to the filtrate. The mixture was stirred at 25° C. for 20 hours, and then centrifuged. The supernatant was concentrated to 4 L using an ultrafiltration device equipped with hollow fibers with exclusion molecular weight of 100,000, centrifuged to remove insoluble substances and allowed to stand at 5° C.

for 24 hours. The formed precipitate was removed by centrifugation. The supernatant was subjected to solvent exchange for 100 mM sodium chloride using an ultrafiltration device. The solution was cooled to 4° C. or below, and the pH was adjusted to 2.0 with hydrochloric acid. The formed precipitate was removed by centrifugation. The pH of the supernatant was adjusted to 8.0 with sodium hydroxide. The supernatant was concentrated to 4 L. The concentrate was subjected to solvent exchange for 20 mM sodium chloride using an ultrafiltration device. Insoluble substances in the solution were removed by centrifugation. The supernatant was then lyophilized to obtain 76 g of a dried fucoidan preparation from *Kjellmaniella crassifolia*.

Referential Example 2

Preparation of Sulfated Fucan Fraction 7 g of the dried fucoidan preparation as described in Referential Example 1 was dissolved in 700 ml of 20 mM imidazole-hydrochloride buffer (pH 8.0) containing 50 mM sodium chloride and 10% ethanol and centrifuged to remove insoluble substances. The supernatant was loaded onto a DEAE-Cellulofine A-800 column (11.4×48 cm) equilibrated with the same buffer. After washing with the same buffer, elution was then carried out with a gradient of 50 mM to 1.95 M sodium chloride. Each fraction contained 250 ml of the eluate. The total sugar content and the uronic acid content of each fraction were measured according to the phenol-sulfuric acid method and the carbazole-sulfuric acid method, respectively. The fractions 43–49, 50–55 and 56–67 were combined, desalted by electrodialysis and lyophilized. 340 mg, 870 mg and 2.64 g of dried products were obtained from the fractions 43–49, 50–55 and 56–67, respectively. The fraction obtained from the fractions 56–67 was used as a sulfated fucan fraction.

Referential Example 3

Method for Measuring Activity of Sulfated Fucan-Digesting Enzyme

12 $\mu$l of a 2.5% solution of the sulfated fucan fraction, 60 $\mu$l of 50 mM imidazole-hydrochloride buffer (pH 7.5), 9 $\mu$l of 4 M sodium chloride, 6 $\mu$l of 1 M calcium chloride, 21 $\mu$l of water and 12 $\mu$l of a solution of the sulfated fucan-digesting enzyme according to the present invention were mixed together. After reacting at 30° C. for 3 hours, the reaction mixture was treated at 100° C. for 10 minutes. After centrifugation, 100 $\mu$l of the supernatant was analyzed using HPLC to determine the degree of conversion into smaller molecules. As controls, a reaction mixture obtained by a reaction in which the buffer used for dissolving the sulfated fucan-digesting enzyme solution was used in place of the digesting enzyme solution and a reaction mixture obtained by a reaction in which water was used in place of the sulfated fucan fraction were similarly analyzed using HPLC.

One unit of an activity of sulfated fucan-digesting enzyme is defined as an amount of an enzyme that cleaves fucosyl bonds in 1 $\mu$mol of a sulfated fucan in 1 minute in the above-mentioned reaction system. The activity of sulfated fucan-digesting enzyme was calculated according to the following equation:

$$\{(12\times1000\times2.5/100)MG\}\times\{(MG/M)-1\}\times\{1/(180\times0.012)\}=U/ml$$

12×1000×2.5/100: sulfated fucan fraction added ($\mu$g);
MG: the average molecular weight of the sulfated fucan as a substrate;
M: the average molecular weight of the reaction product;
(MG/M)–1: the number of sites cleaved by the enzyme in one sulfated fucan molecule;
180: the reaction time (minutes); and
0.012: the volume of the enzyme solution (ml).
  The HPLC was carried out as follows:
  Instrument: L-6200 (Hitachi);
  Column: OHpak SB-806HQ (8×300 mm; Showa Denko);
  Eluent: 50 mM sodium chloride containing 5 mM sodium azide;
  Detection: differential refractive index detector (Shodex RI-71, Showa Denko);
  Flow rate: 1 ml/minute; and
  Column temperature: 25° C.

The following procedure was carried out in order to determine the average molecular weight of the reaction product. Commercially available pullulan (STANDARD P-82, Showa Denko) of which the molecular weight was known was analyzed under the same conditions as those for the above-mentioned HPLC analysis. The relationship between the molecular weight of pullulan and retention time was expressed as a curve, which was used as a standard curve for determining the molecular weight of the reaction product. The amount of protein was determined by measuring the absorbance of the enzyme solution at 280 nm. The calculation was carried out assuming the absorbance of a solution containing a protein at a concentration of 1 mg/ml as 1.0.

Example 1

Preparation of Sulfated Fucan-Digesting Enzyme

*Fucanobacter lyticus* SN-1009 was inoculated into 4 ml of a medium consisting of artificial seawater (Jamarine Laboratory) (pH 8.2) containing 0.2% fucoidan prepared as described in Referential Example 1 and 0.3% peptone which had been autoclaved at 120° C. for 20 minutes, and cultured at 25° C. for 24 hours to prepare a seed culture. The seed culture was inoculated into 600 ml of a medium consisting of artificial seawater (pH 8.2) containing 0.25% glucose, 1% peptone, 0.05% yeast extract and antifoaming agent (KM70, Shin-Etsu Chemical) in a 2-L Erlenmeyer flask which had been autoclaved at 120° C. for 20 minutes, and cultured at 25° C. for 20 hours. 20 L of a medium consisting of artificial seawater (pH 8.2) containing 1% peptone, 0.02% yeast extract and antifoaming agent (KM70, Shin-Etsu Chemical) in a 30-L jar fermentor which had been autoclaved at 120° C. for 20 minutes was mixed with the fucoidan prepared as described in Referential Example 1 which had been treated at 100° C. for 20 minutes. The culture was inoculated into the mixture and cultured at 25° C. for 28 hours. After cultivation, the culture was centrifuged to collect cells and a culture supernatant.

The culture supernatant was concentrated using an ultrafiltration device equipped with hollow fibers with exclusion molecular weight of 10,000. The concentrate was subjected to solvent exchange for 20 mM Tris-hydrochloride buffer (pH 8.2) containing 10 mM calcium chloride and 150 mM sodium chloride and centrifuged to obtain a supernatant.

The supernatant was loaded onto a 2-L DEAE-Cellulofine A-800 column equilibrated with the same buffer. After washing with the same buffer, elution was then carried out with a gradient of 150 mM to 400 mM sodium chloride such that each fraction contained 63 ml of the eluate to collect an active fraction.

The active fraction was concentrated using an ultrafiltration device equipped with hollow fibers with exclusion molecular weight of 10,000. The concentrate was subjected to solvent exchange for 20 mM Tris-hydrochloride buffer (pH 8.2) containing 10 mM calcium chloride and 100 mM sodium chloride. The enzyme solution was loaded onto a 200-ml DEAE-Cellulofine A-800 column equilibrated with the same buffer. After washing with the same buffer, elution was then carried out with a gradient of 100 mM to 300 mM sodium chloride such that each fraction contained 19 ml of the eluate to collect an active fraction.

The active fraction was concentrated using an ultrafiltration device equipped with an ultrafiltration membrane with exclusion molecular weight of 10,000. Sodium chloride at a final concentration of 4 M was added thereto. The solution was loaded onto a Phenyl-Sepharose CL-4B column equilibrated with 20 mM Tris-hydrochloride buffer (pH 8.0) containing 100 mM calcium chloride and 4 M sodium chloride. After washing with the same buffer, elution was then carried out with a gradient of 4 M to 1 M sodium chloride such that each fraction contained 9.4 ml of the eluate. Thus, a purified preparation of sulfated fucan-digesting enzyme was obtained.

Example 2

Preparation of Sulfated Fucan Oligosaccharide Using Sulfated Fucan-Digesting Enzyme, and Purification and Structural Analysis thereof (1) Preparation 200 g of dried cultured *Kjellmaniella crassifolia* was soaked in 10 L of 18 mM imidazole-hydrochloride buffer (pH 7.0) containing 45 mM calcium chloride, 500 mM sodium chloride and 9% ethanol. 30 U of the sulfated fucan-digesting enzyme was added thereto. The mixture was stirred at room temperature for 2 days and filtered through a filter paper. A small molecule fraction recovered from the filtrate using an ultrafiltration device equipped with hollow fibers with exclusion molecular weight of 100,000 was designated as a sulfated fucan oligosaccharide fraction 1.

(2) Purification

The sulfated fucan oligosaccharide fraction 1 obtained in Example 2-(1) was desalted using a desalting apparatus (Micro Acilyzer G3, Asahi Kasei) and concentrated using a rotary evaporator. Imidazole and sodium chloride were added to the sulfated fucan oligosaccharide solution 1 at final concentrations of 10 mM and 300 mM, respectively. The resulting mixture was loaded onto a 1-L DEAE-Cellulofine A-800 column equilibrated with 10 mM imidazole-hydrochloride buffer (pH 6.0) containing 300 mM sodium chloride. After adequately washing with the same buffer, elution was then carried out with a gradient of 300 mM to 1200 mM sodium chloride. The total sugar content and the total uronic acid content of each of the eluted fractions were measured according to the phenol-sulfuric acid method and the carbazole-sulfuric acid method, respectively. As a result, the eluted fractions formed at least four distinct peaks. The fractions in the respective peaks were subjected to mass spectrometric analyses. Determination of the saccharide compositions for the respective peaks showed that they contained only fucose but did not contain uronic acid. Composition of the oligosaccharides having the respective masses estimated based on the saccharide compositions are shown in Table 1.

TABLE 1

|  |  | Composition of oligosaccharide | | |
|---|---|---|---|---|
| Peak no. | Molecular weight | Fucose | Sulfate group | Sodium |
| 1-(1) | 1914 | 6 | 10 | 10 |
|  | 1812 | 6 | 9 | 9 |
|  | 1564 | 5 | 8 | 8 |
| 1-(2) | 2264 | 7 | 12 | 12 |
|  | 2162 | 7 | 11 | 11 |
|  | 1914 | 6 | 10 | 10 |
|  | 2016 | 6 | 11 | 11 |
| 1-(3) | 2366 | 7 | 13 | 13 |
|  | 2264 | 7 | 12 | 12 |
|  | 2016 | 6 | 11 | 11 |
|  | 1914 | 6 | 10 | 10 |
|  | 2162 | 7 | 11 | 11 |
| 1-(4) | 3460 | 11 | 18 | 18 |
|  | 3358 | 11 | 17 | 17 |
|  | 3110 | 10 | 16 | 16 |

The fractions constituting each peak were combined, concentrated using an evaporator and purified as follows:

Column: YMC Pack Polyamine II (20×250 mm, YMC);

Flow rate: 8 ml/minute;

Column temperature: 30° C.;

Equilibration solution: 0.5 M sodium dihydrogenphosphate containing 10% acetonitrile;

Elution solution: gradient from 0.5 M sodium dihydrogenphosphate containing 10% acetonitrile to 1.5 M sodium dihydrogenphosphate containing 10% acetonitrile; as for peak number 1-(4), the gradient for the elution was from 787.5 mM sodium dihydrogenphosphate containing 10% acetonitrile to 1462.5 mM sodium dihydrogenphosphate containing 10% acetonitrile;

Fractionation: 4 ml/fraction; and

Detection: the phenol-sulfuric acid method.

Fractions obtained by the column chromatography were subjected to mass spectrometric analyses. As a result, substances having masses of 1914, 2264, 2366 and 3460 were observed as main peaks for the peak nos. 1-(1), 1-(2), 1-(3) and 1-(4), respectively. Fractions constituting each peak were combined, loaded onto a Cellulofine GCL-25 column equilibrated with 10% ethanol and eluted using 10% ethanol for desalting. Thus, the sulfated fucan oligosaccharides 1-(1) to 1-(4) of the present invention were obtained.

(3) Structural Analysis

The sulfated fucan oligosaccharides 1-(1) to 1-(4) of the present invention obtained in Example 2-(2) were subjected to analyses of saccharides at the reducing ends and saccharide compositions according to a fluorescence labeling method using 2-aminopyridine. As a result, the saccharide at the reducing end of and the sole saccharide constituting each of the oligosaccharides 1-(1) to 1-(4) were determined to be fucose. Next, determination of the sulfuric acid content (measured according to the turbidinetric method using barium chloride) and the uronic acid content (measured according to the carbazole-sulfuric acid method), and NMR analysis using a nuclear magnetic resonance apparatus JNM α-500 (Nippon Denshi) were carried out. Samples to be analyzed were subjected to structural analyses after exchange for heavy water according to a conventional method. Bonds of constituting saccharides were analyzed using the HMBC method, a method for $^1$H-detection of heteronuclei. The DQF-COSY method and the HOHAHA method were used for identification in $^1$H-NMR. The HSQC method was used for identification in $^{13}$C-NMR.

Physical properties of the oligosaccharides 1-(1) to 1-(4) are shown below.

(a) Physical Properties of the Oligosaccharide 1-(1)

Figure 2:
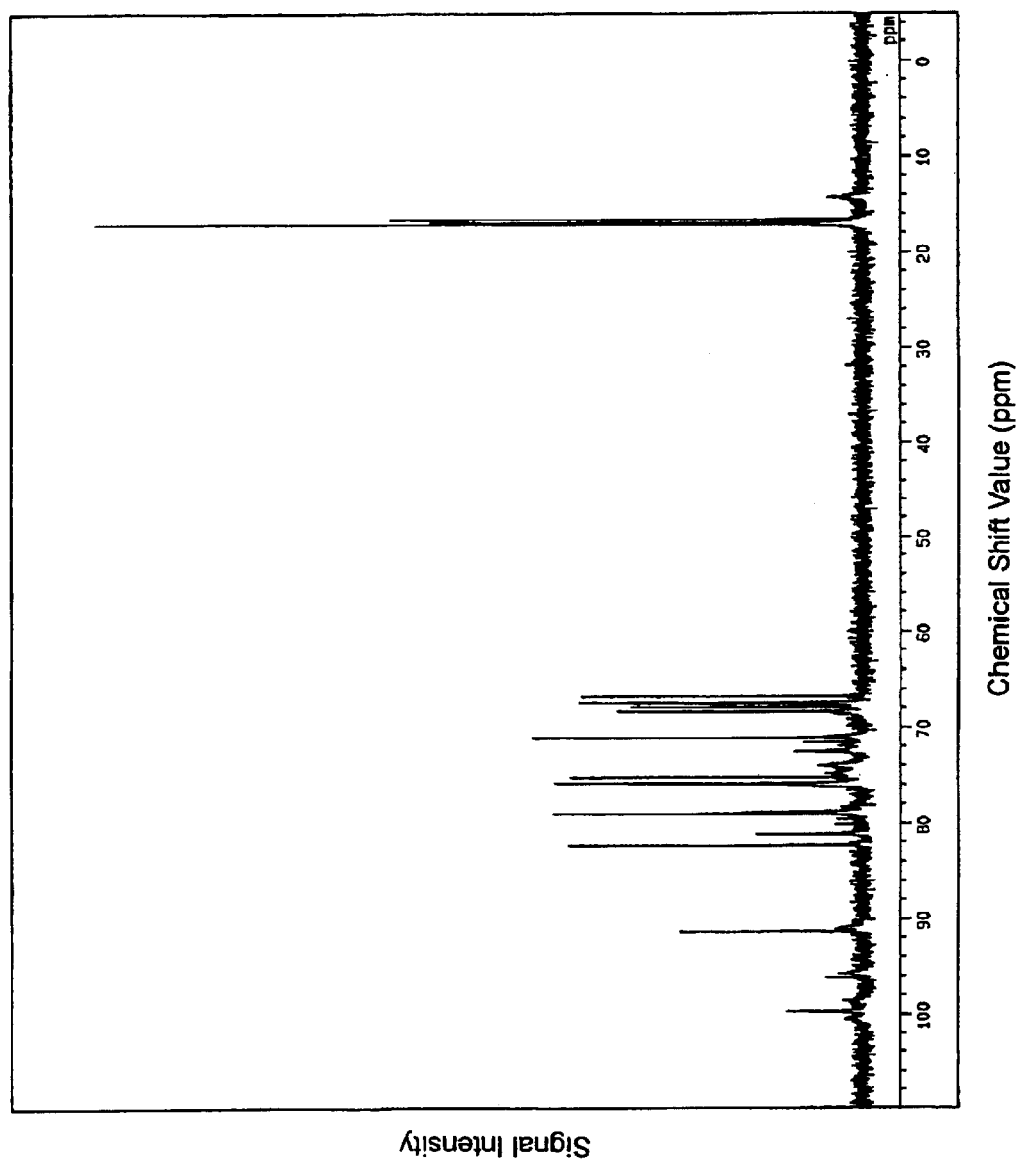
FIG. 2: a figure which illustrates the $^{13}$C-NMR spectrum of the sulfated fucan oligosaccharide 1-(1) according to the present invention.
Figure 3:
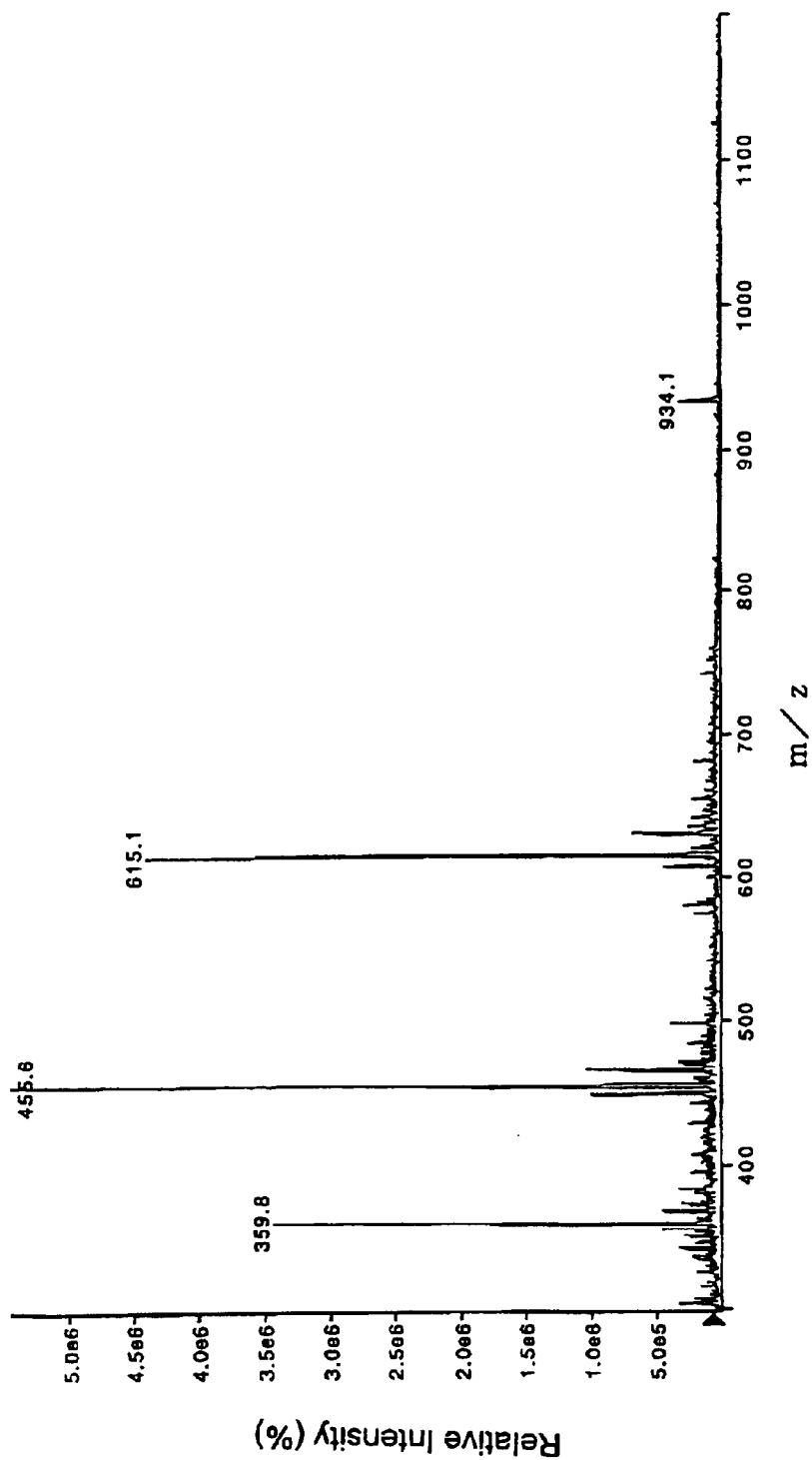
FIG. 3: a figure which illustrates the mass spectrum of the sulfated fucan oligosaccharide 1-(1) according to the present invention.

The results for mass spectrometric analysis and identification in NMR analysis are shown below. The $^1$H-NMR spectrum, $^{13}$C-NMR spectrum and mass spectrum of the sulfated fucan oligosaccharide 1-(1) of the present invention are illustrated in FIGS. 1, 2 and 3, respectively. In FIGS. 1 and 2, the vertical axes represent the signal intensity and the horizontal axes represent the chemical shift value (ppm). In FIG. 3, the vertical axis represents the relative intensity and the horizontal axis represents the m/z value.

Molecular weight: 1914 MS m/z 455.0 [M-4Na$^+$]$^{4-}$, 614.8 [M-3Na$^+$]$^{3-}$, 933.8 [M-2Na$^+$]$^{2-}$ Results of $^1$H-NMR and $^{13}$C-NMR analyses are shown in Tables 2 and 3.

TABLE 2

| | Chemical shift value (ppm) | |
|---|---|---|
| $^{13}$C-NMR | $^1$H-NMR Chemical shift value, multiplicity, coupling constant | |
| F1-1 | 91.3 | 5.41, d, 3.4 |
| F1-2 | 75.9 | 4.39, dd, 3.4, 10.1 |
| F1-3 | 75.9 | 4.14, dd, 2.4, 10.1 |
| F1-4 | 81.1 | 4.81, d, 2.4 |
| F1-5 | 67.6 | 4.20, q, 6.4 |
| F1-6 | 16.8 | 1.16, d, 6.4 |
| F2-1 | 99.7 | 5.25, d, 1.8 |
| F2-2 | 75.2 | 4.43, m |
| F2-3 | 72.5 | 4.43, m |
| F2-4 | 78.8 | 4.75, br-s |
| F2-5 | 68.3 | 4.27, q, 6.7 |
| F2-6 | 17.0 | 1.18, d, 6.7 |
| F3-1 | 91.0 | 5.22, br-s |
| F3-2 | 75.8 | 4.10, d, 5.2 |
| F3-3 | 74.7 | 4.27, dd, 5.2, 2.5 |
| F3-4 | 74.0 | 4.73, dd, 2.5, 5.5 |

TABLE 2-continued

| | Chemical shift value (ppm) | |
|---|---|---|
| $^{13}$C-NMR | $^1$H-NMR Chemical shift value, multiplicity, coupling constant | |
| F3-5 | 71.9 | 4.32, m, 5.5, 6.1 |
| F3-6 | 14.2 | 1.45, d, 6.1 |

TABLE 3

| | Chemical shift value (ppm) | |
|---|---|---|
| $^{13}$C-NMR | $^1$H-NMR Chemical shift value, multiplicity, coupling constant | |
| F4-1 | 98.5 | 5.32, d, 3.1 |
| F4-2 | 74.0 | 4.45, m |
| F4-3 | 71.0 | 4.27, m |
| F4-4 | 78.9 | 4.76, br-s |
| F4-5 | 68.3 | 4.29, q, 6.7 |
| F4-6 | 17.0 | 1.18, d, 6.7 |
| F5-1 | 96.1 | 5.29, d, 3.4 |
| F5-2 | 75.9 | 4.35, dd, 3.4, 10.7 |
| F5-3 | 67.4 | 4.27, dd, 2.4, 10.7 |
| F5-4 | 82.3 | 4.60, d, 2.4 |
| F5-5 | 67.4 | 4.38, q, 6.4 |
| F5-6 | 17.0 | 1.16, d, 6.4 |
| F6-1 | 100.5 | 5.18, d, 4.0 |
| F6-2 | 66.7 | 3.84, dd, 4.0, 10.4 |
| F6-3 | 78.8 | 4.45, dd, 3.1, 10.4 |
| F6-4 | 71.1 | 4.07, d, 3.1 |
| F6-5 | 67.9 | 4.06, q, 6.4 |
| F6-6 | 16.5 | 1.13, d, 6.4 |

Saccharide composition: L-fucose (6 molecules)

Sulfate group: 10 molecules

Sodium: 10 molecules

The numbers for peak identification in $^1$H-NMR and $^{13}$C-NMR are as indicated in formula (IV) below:

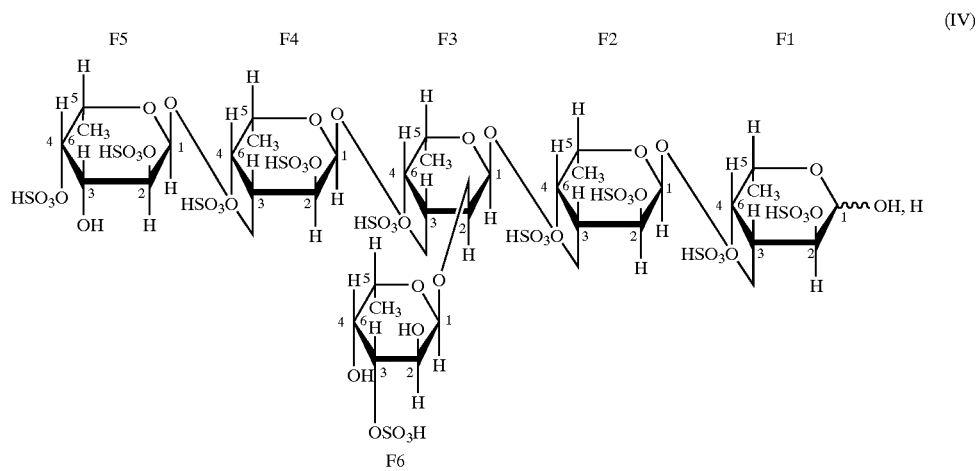

(IV)

(b) Physical Properties of the Oligosaccharide 1-(2)

Figure 4:
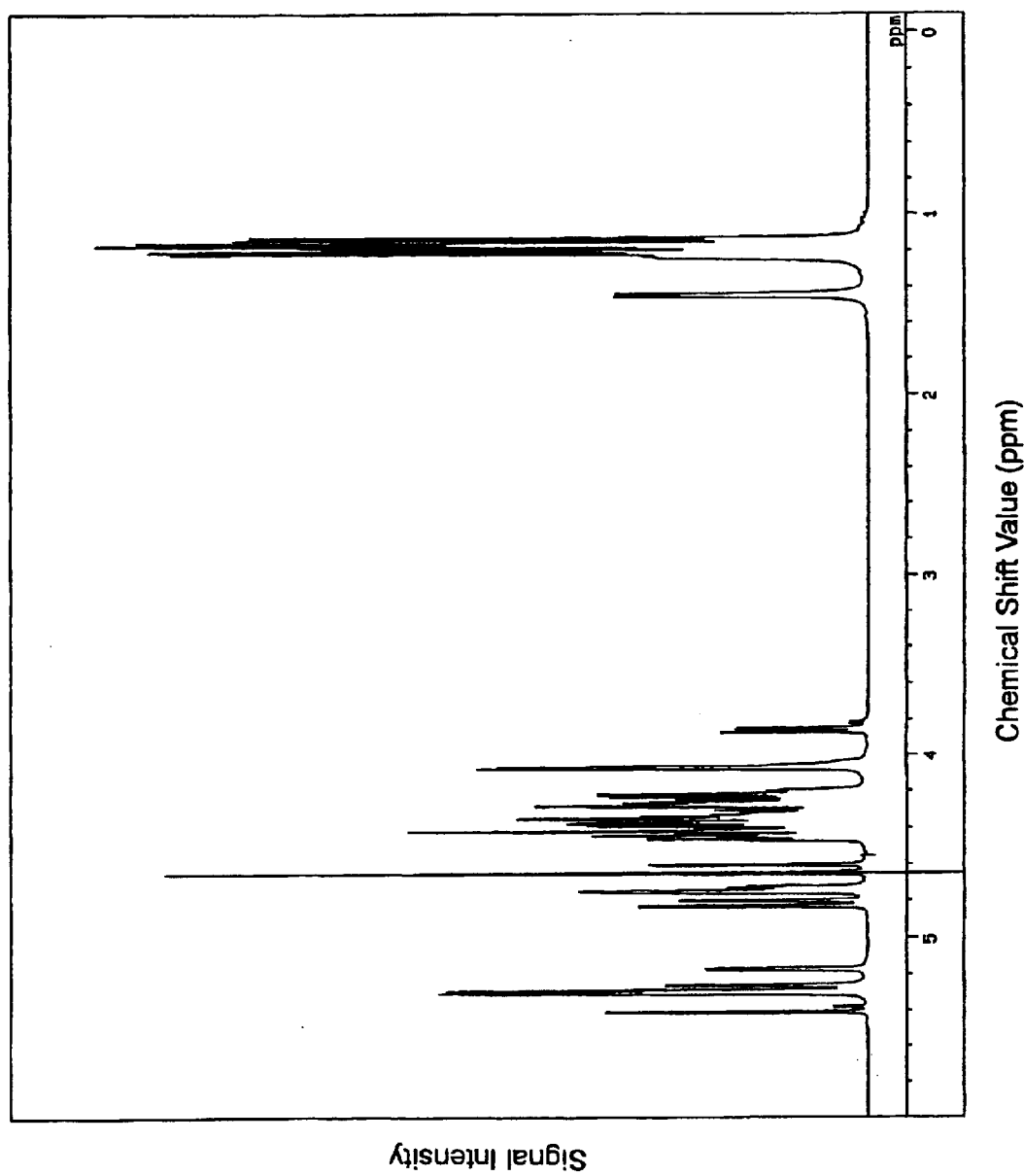
FIG. 4: a figure which illustrates the $^1$H-NMR spectrum of the sulfated fucan oligosaccharide 1-(2) according to the present invention.
Figure 5:
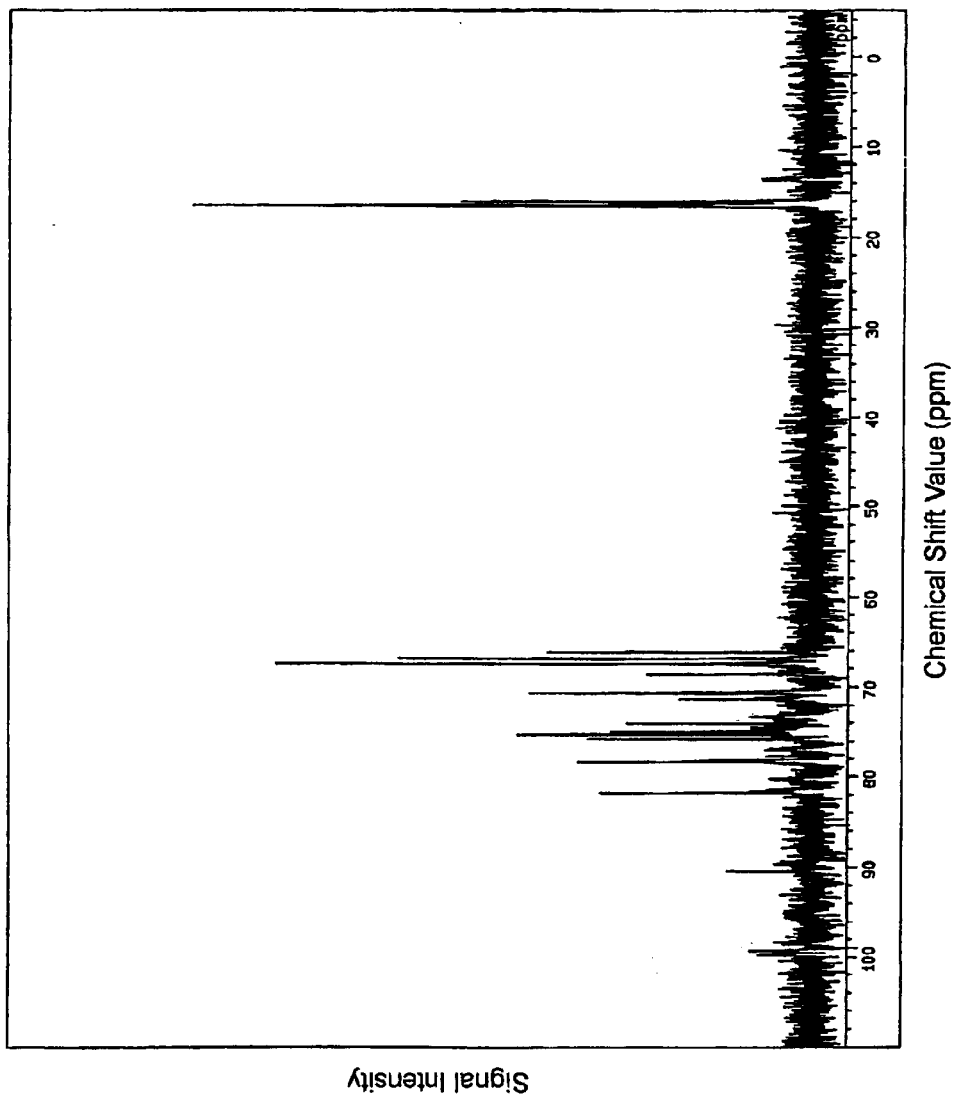
FIG. 5: a figure which illustrates the $^{13}$C-NMR spectrum of the sulfated fucan oligosaccharide 1-(2) according to the present invention.
Figure 6:
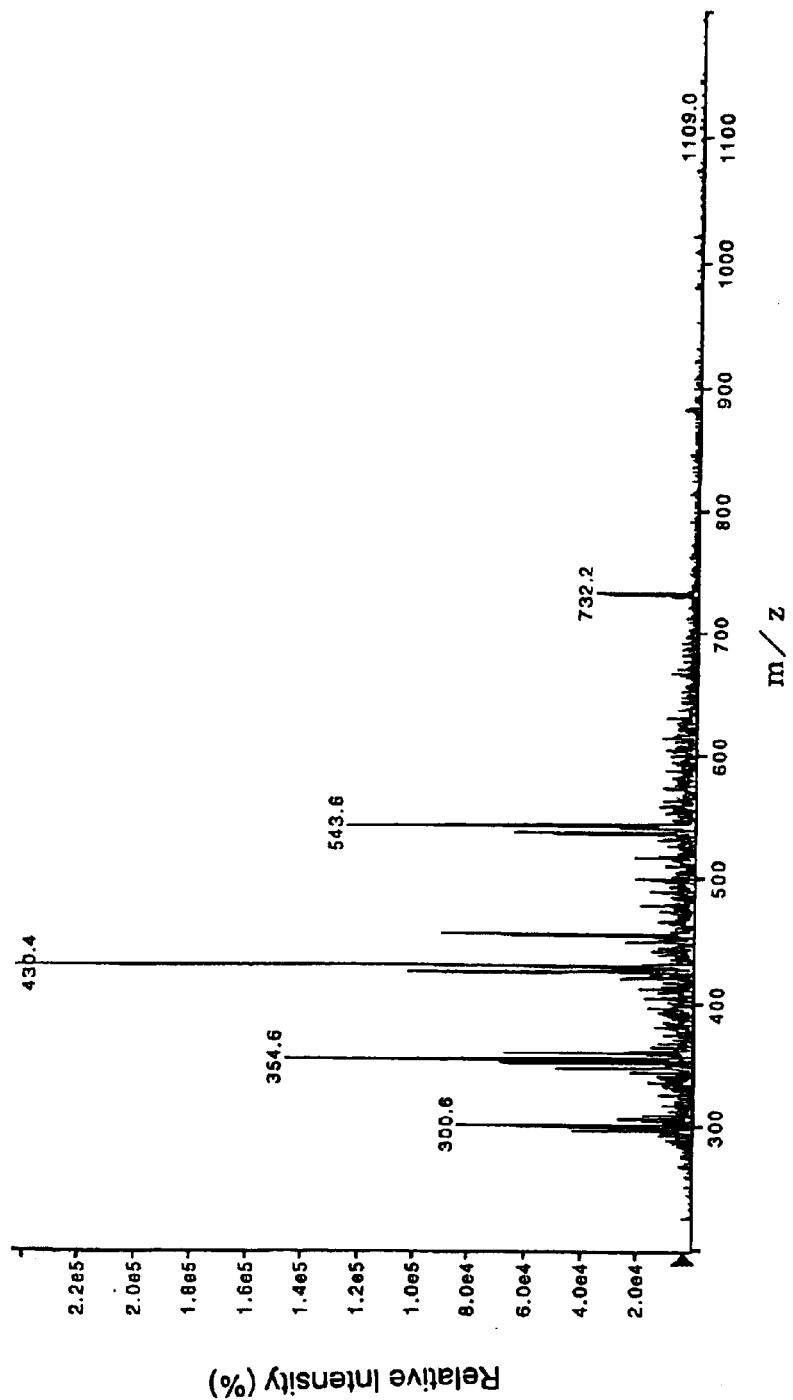
FIG. 6: a figure which illustrates the mass spectrum of the sulfated fucan oligosaccharide 1-(2) according to the present invention.

The results for mass spectrometric analysis and identification in NMR analysis are shown below. The $^1$H-NMR spectrum, $^{13}$C-NMR spectrum and mass spectrum of the sulfated fucan oligosaccharide 1-(2) of the present invention are illustrated in FIGS. 4, 5 and 6, respectively. In FIGS. 4 and 5, the vertical axes represent the signal intensity and the horizontal axes represent the chemical shift value (ppm). In FIG. 6, the vertical axis represents the relative intensity and the horizontal axis represents the m/z value.

Molecular weight: 2264 MS m/z 354.2 [M-6Na$^+$]$^{6-}$, 429.8 [M-5Na$^+$]$^{5-}$, 543.0 [M-4Na$^+$]$^{4-}$, 731.6 [M-3Na$^+$]$^{3-}$ Results of $^1$H-NMR and $^{13}$C-NMR analyses are shown in Tables 4 and 5.

TABLE 4

| | Chemical shift value (ppm) | |
|---|---|---|
| | $^{13}$C-NMR | $^1$H-NMR |
| F1-1 | 90.3 | 5.41, d, 3.4 |
| F1-2 | 75.7 | 4.38, dd, 3.4, 9.8 |
| F1-3 | 74.9 | 4.22, m |
| F1-4 | 80.2 | 4.80, br-s |
| F1-5 | 67.5 | 4.23, q, 6.7 |
| F1-6 | 16.0 | 1.19, d, 6.7 |
| F2-1 | 99.3 | 5.31, d, 3.4 |
| F2-2 | 75.2 | 4.40, m |
| F2-3 | 76.9 | 4.29, m |
| F2-4 | 81.5 | 4.83, d, 2.8 |
| F2-5 | 68.5 | 4.22, q, 6.4 |
| F2-6 | 16.4 | 1.16, d, 6.4 |
| F3-1 | 99.7 | 5.29, br-s |
| F3-2 | 74.0 | 4.41, m |
| F3-3 | 71.1 | 4.41, m |
| F3-4 | 78.2 | 4.75, m |
| F3-5 | 67.4 | 4.34, q, 6.7 |
| F3-6 | 16.5 | 1.22, d, 6.7 |
| F4-1 | 89.6 | 5.26, br-s |
| F4-2 | 74.4 | 4.07, m |
| F4-3 | 74.4 | 4.27, m |
| F4-4 | 73.3 | 4.73, dd, 2.8, 5.8 |

TABLE 4-continued

| | Chemical shift value (ppm) | |
|---|---|---|
| | $^{13}$C-NMR | $^1$H-NMR |
| F4-5 | 71.2 | 4.36, m, 5.8, 6.4 |
| F4-6 | 13.5 | 1.44, d, 6.4 |

TABLE 5

| | Chemical shift value (ppm) | |
|---|---|---|
| | $^{13}$C-NMR | $^1$H-NMR |
| F5-1 | 98.3 | 5.31, d, 3.4 |
| F5-2 | 73.4 | 4.45, dd, 3.4, 10.1 |
| F5-3 | 70.4 | 4.26, m |
| F5-4 | 78.2 | 4.76, br-s |
| F5-5 | 67.6 | 4.33, q, 6.4 |
| F5-6 | 16.4 | 1.23, d, 6.4 |
| F6-1 | 95.2 | 5.29, d, 3.7 |
| F6-2 | 75.2 | 4.36, m |
| F6-3 | 66.8 | 4.27, m |
| F6-4 | 81.7 | 4.60, d, 2.8 |
| F6-5 | 66.8 | 4.38, q, 6.7 |
| F6-6 | 16.4 | 1.16, d, 6.7 |
| F7-1 | 100.1 | 5.17, d, 4.3 |
| F7-2 | 66.1 | 3.86, dd, 4.3, 10.4 |
| F7-3 | 78.3 | 4.45, dd, 3.7, 10.4 |
| F7-4 | 70.5 | 4.07, d, 3.7 |
| F7-5 | 67.4 | 4.05, q, 6.4 |
| F7-6 | 16.0 | 1.13, d, 6.4 |

Saccharide composition: L-fucose (7 molecules)

Sulfate group: 12 molecules

Sodium: 12 molecules

The numbers for peak identification in $^1$H-NMR and $^{13}$C-NMR are as indicated in formula (V) below:

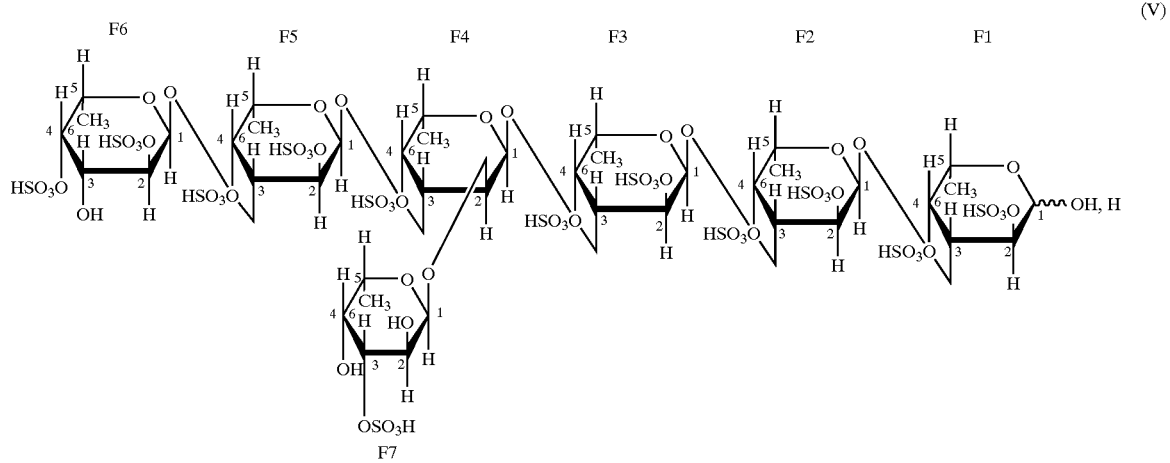

(V)

An activity of inducing HGF production as determined according to the method described in Example 1-(2) in WO 00/62785 was observed for the sulfated saccharide of formula (V).

(c) Physical Properties of the Oligosaccharide 1-(3)

Figure 7:
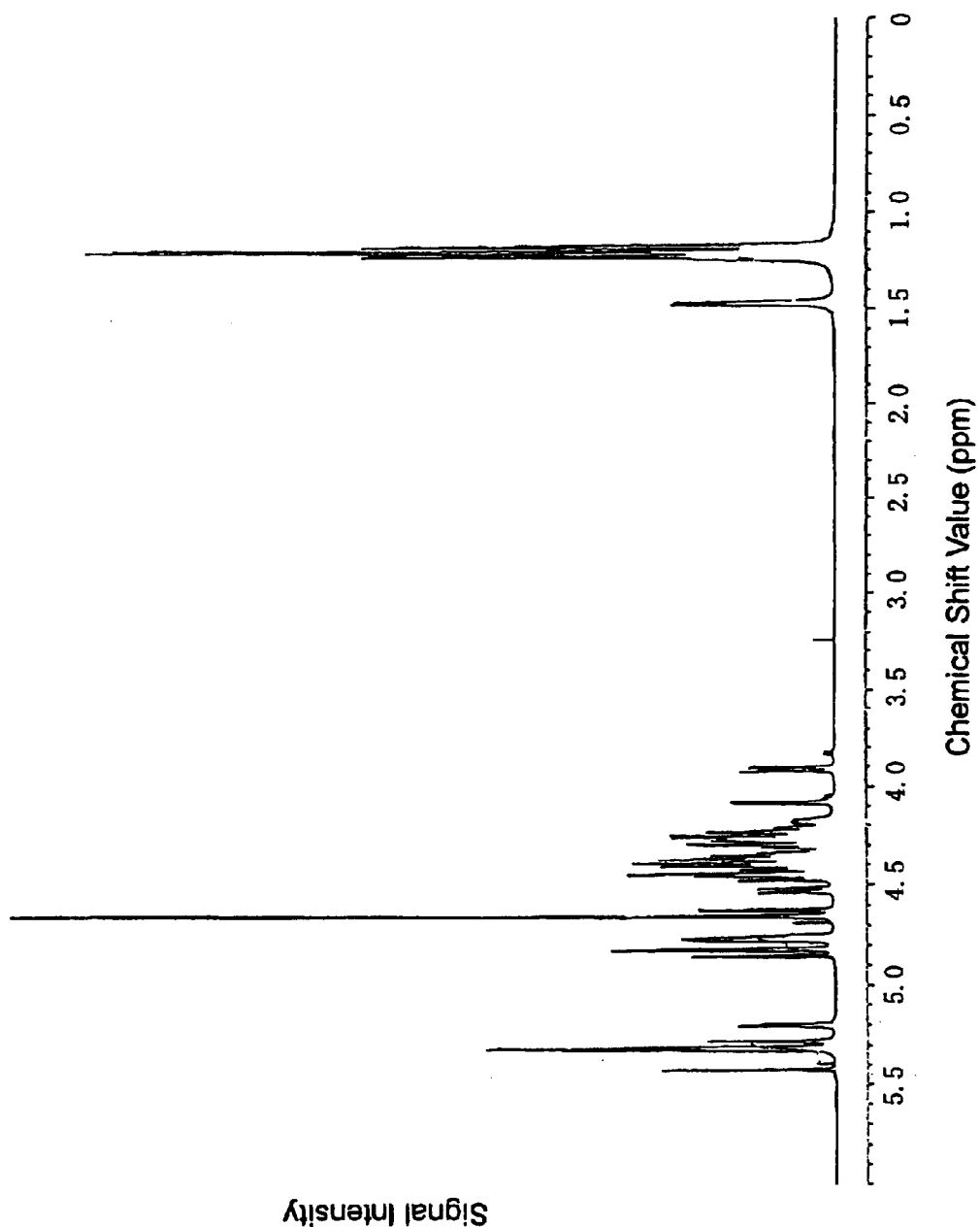
FIG. 7: a figure which illustrates the $^1$H-NMR spectrum of the sulfated fucan oligosaccharide 1-(3) according to the present invention.
Figure 8:
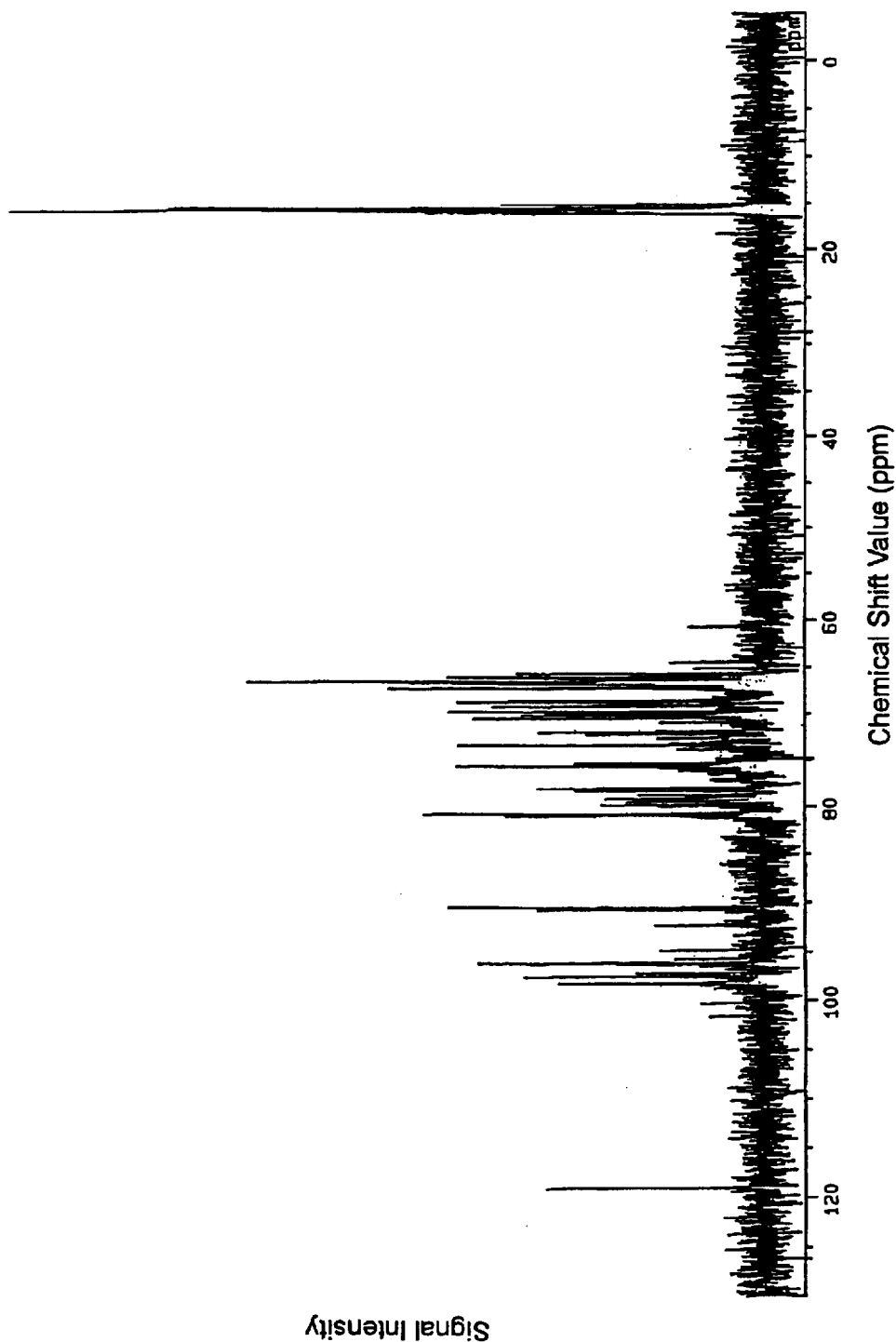
FIG. 8: a figure which illustrates the $^{13}$C-NMR spectrum of the sulfated fucan oligosaccharide 1-(3) according to the present invention.
Figure 9:
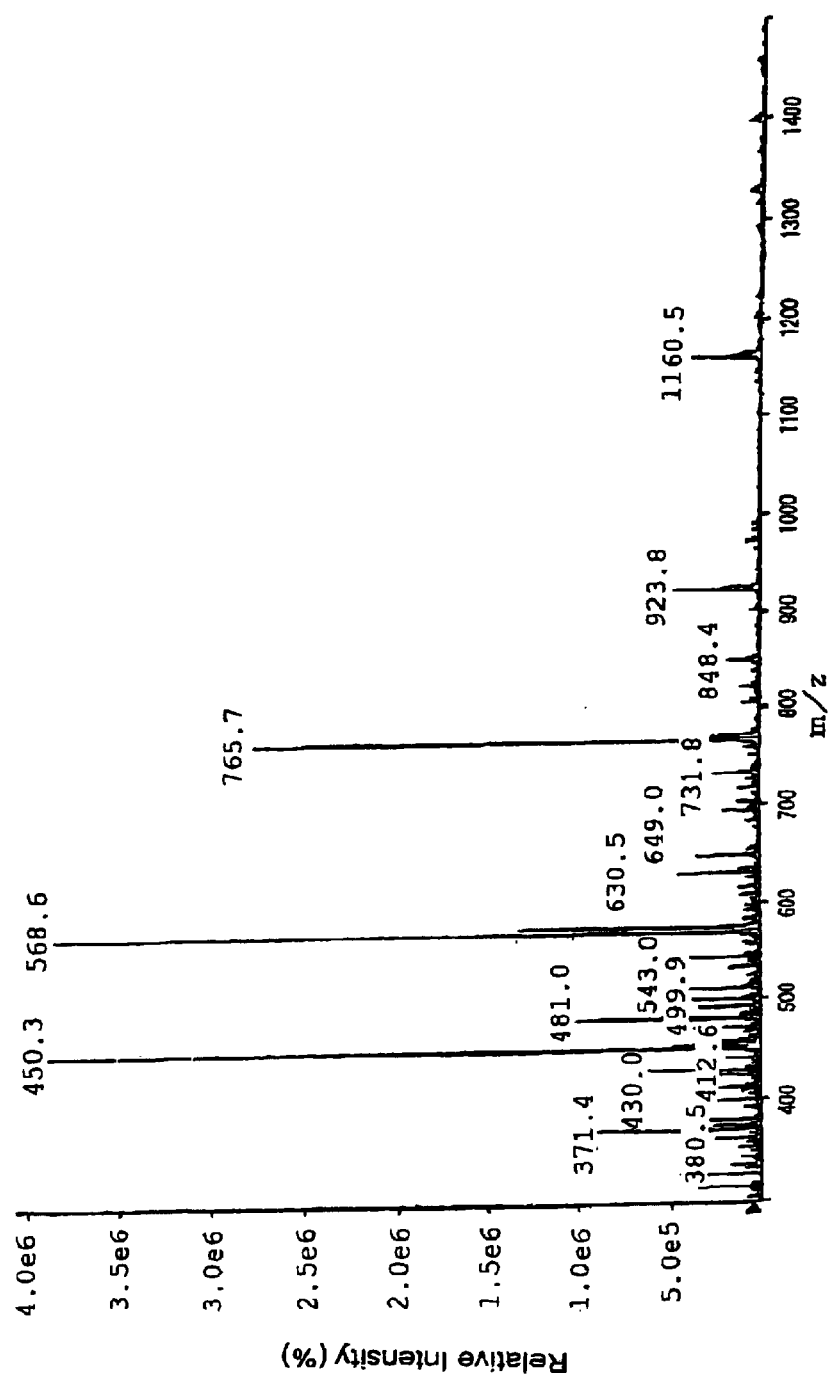
FIG. 9: a figure which illustrates the mass spectrum of the sulfated fucan oligosaccharide 1-(3) according to the present invention.

The results for mass spectrometric analysis are shown below. The $^1$H-NMR spectrum, $^{13}$C-NMR spectrum and mass spectrum of the sulfated fucan oligosaccharide 1-(3) of the present invention are illustrated in FIGS. 7, 8 and 9. In FIGS. 7 and 8, the vertical axes represent the signal intensity and the horizontal axes represent the chemical shift value (ppm) In FIG. 9, the vertical axis represents the relative intensity and the horizontal axis represents the m/z value.

Molecular weight: 2366 MS m/z 371.4 [M-6Na$^+$]$^{6-}$, 450.3 [M-5Na$^+$]$^{5-}$, 568.6 [M-4Na$^+$]$^{4-}$, 765.7 [M-3Na$^+$]$^{3-}$ The results of $^1$H-NMR and $^{13}$C-NMR analyses are shown in Tables 6 and 7.

TABLE 6

| | Chemical shift value (ppm) | |
|---|---|---|
| | | $^1$H-NMR |
| | $^{13}$C-NMR | Chemical shift value, multiplicity, coupling constant |
| F1-1 | 89.6 | 5.42, d, 2.5 |
| F1-2 | 75.3 | 4.40, m |
| F1-3 | 73.9 | 4.28, m |
| F1-4 | 78.6 | 4.78, m |
| F1-5 | 67.5 | 4.24, m |
| F1-6 | 15.9 | 1.24, d, 6.5 |
| F2-1 | 98.3 | 5.34, d, 3.5 |
| F2-2 | 74.8 | 4.43, m |
| F2-3 | 76.0 | 4.29, m |
| F2-4 | 80.8 | 4.83, m |
| F2-5 | 68.1 | 4.20, m |
| F2-6 | 15.9 | 1.18, d, 7.0 |
| F3-1 | 99.1 | 5.29, m |
| F3-2 | 73.8 | 4.45, m |
| F3-3 | 70.8 | 4.45, m |
| F3-4 | 77.5 | 4.73, m |
| F3-5 | 66.8 | 4.31, m |
| F3-6 | 15.9 | 1.25, d, 6.5 |

TABLE 7

| | Chemical shift value (ppm) | |
|---|---|---|
| | | $^1$H-NMR |
| | $^{13}$C-NMR | Chemical shift value, multiplicity, coupling constant |
| F4-1 | 89.2 | 5.27, br-s |
| F4-2 | 74.1 | 4.09, d, 9.5 |
| F4-3 | 74.3 | 4.26, m |
| F4-4 | 72.8 | 4.74, m |
| F4-5 | 70.8 | 4.36, m |
| F4-6 | 13.3 | 1.46, d, 7.0 |
| F5-1 | 97.3 | 5.31, d, 3.5 |
| F5-2 | 73.1 | 4.47, dd, 10.0, 3.5 |
| F5-3 | 69.8 | 4.27, m |
| F5-4 | 77.5 | 4.75, m |
| F5-5 | 67.0 | 4.34, m |
| F5-6 | 15.9 | 1.20, d, 6.0 |
| F6-1 | 94.6 | 5.29, m |
| F6-2 | 74.9 | 4.38, m |
| F6-3 | 66.6 | 4.29, m |
| F6-4 | 81.3 | 4.60, m |
| F6-5 | 66.4 | 4.38, m |
| F6-6 | 15.4 | 1.17, d, 6.5 |
| F7-1 | 99.3 | 5.22, d, 4.0 |
| F7-2 | 65.9 | 3.91, dd, 11.0, 4.0 |
| F7-3 | 75.3 | 4.52, dd, 11.0, 3.0 |
| F7-4 | 79.0 | 4.80, d, 3.0 |
| F7-5 | 66.6 | 4.16, m |
| F7-6 | 15.9 | 1.20, d, 6.0 |

Saccharide composition: L-fucose (7 molecules)

Sulfate group: 13 molecules

Sodium: 13 molecules

The numbers for signal assignment in $^1$H-NMR and $^{13}$C-NMR are as indicated in formula (VI) below:

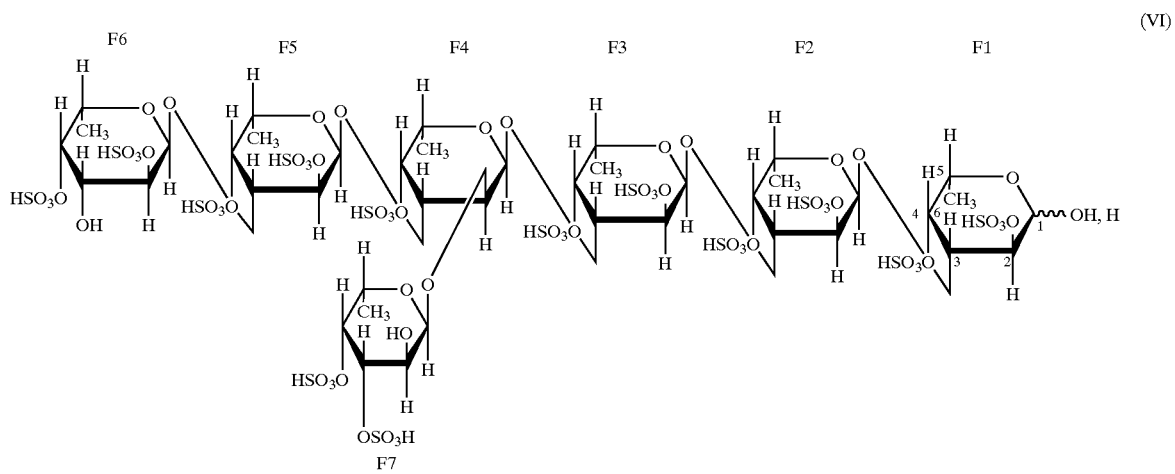

(VI)

(d) Physical Properties of the Oligosaccharide 1-(4)

Figure 10:
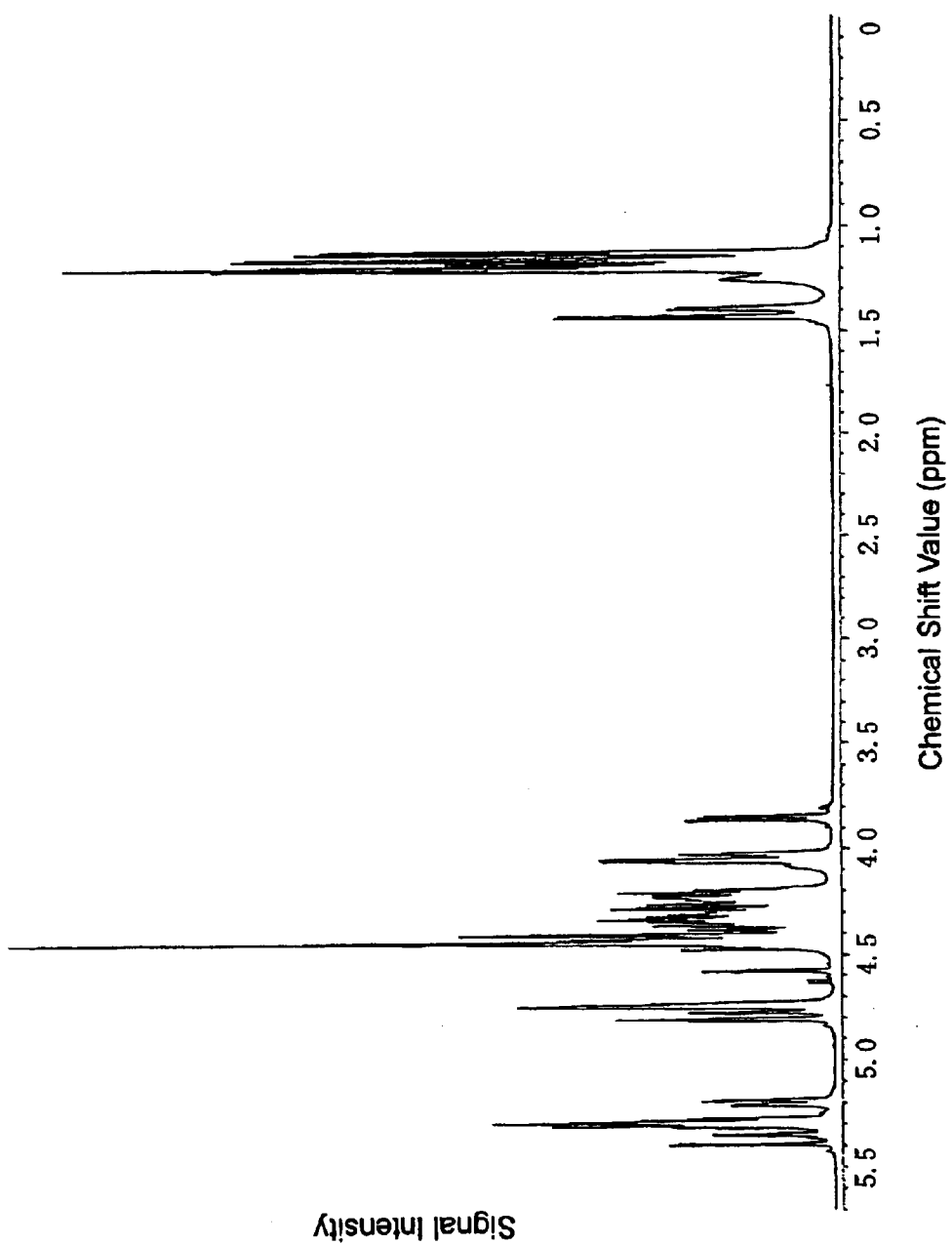
FIG. 10: a figure which illustrates the $^1$H-NMR spectrum of the sulfated fucan oligosaccharide 1-(4) according to the present invention.
Figure 11:
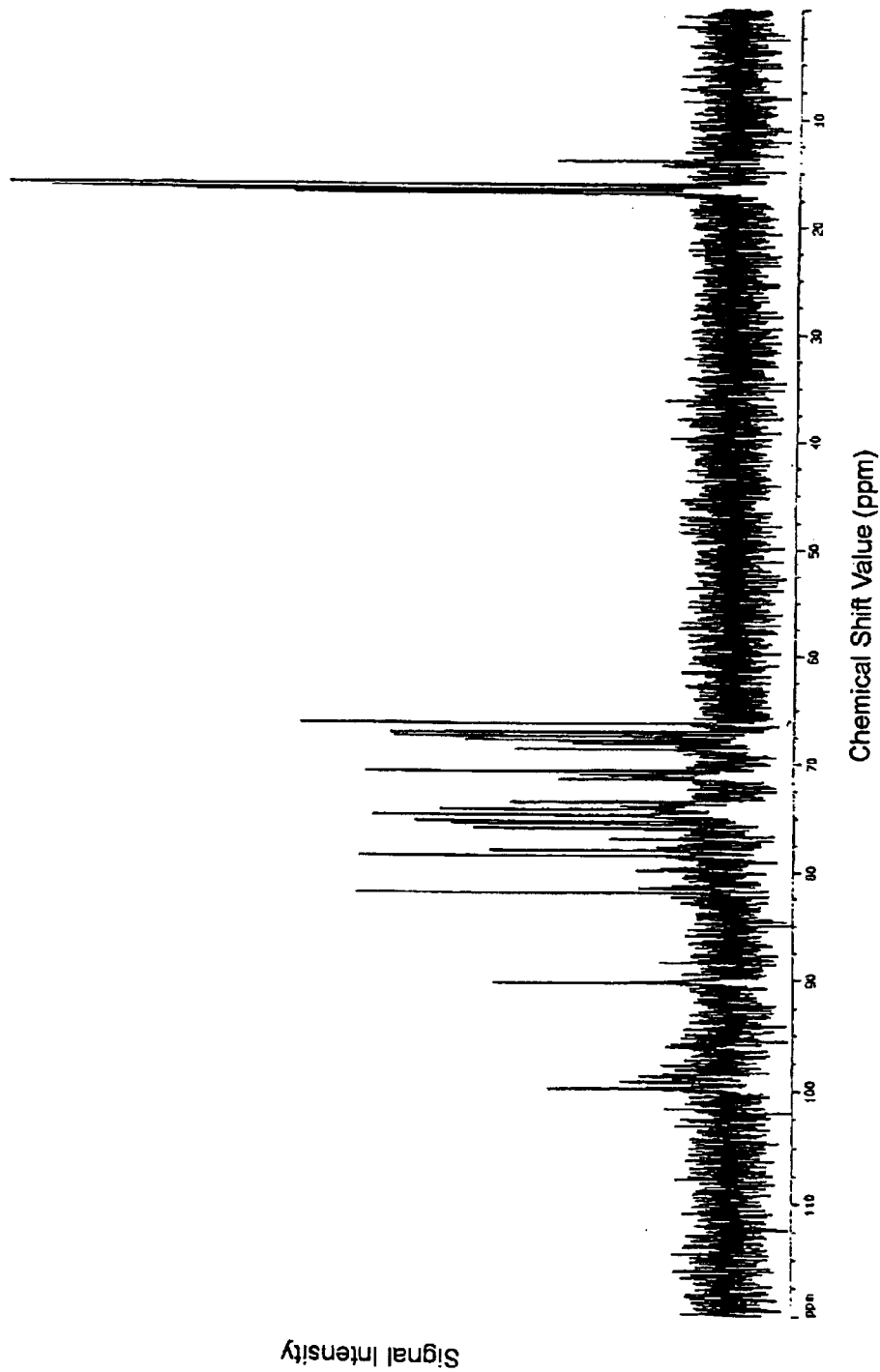
FIG. 11: a figure which illustrates the $^{13}$C-NMR spectrum of the sulfated fucan oligosaccharide 1-(4) according to the present invention.
Figure 12:
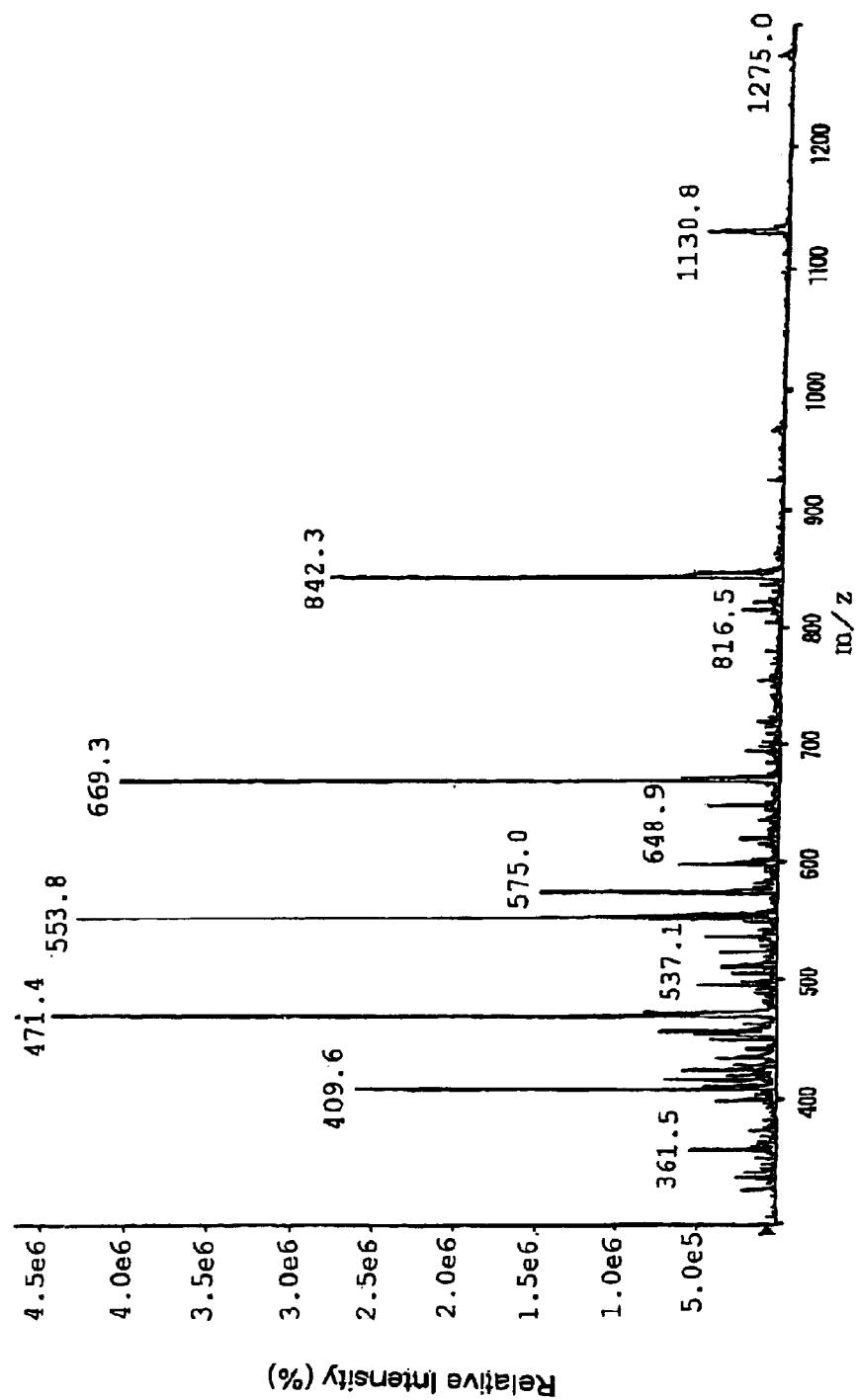
FIG. 12: a figure which illustrates the mass spectrum of the sulfated fucan oligosaccharide 1-(4) according to the present invention.

The results for mass spectrometric analysis are shown below. The $^1$H-NMR spectrum, $^{13}$C-NMR spectrum and mass spectrum of the sulfated fucan oligosaccharide 1-(4) of the present invention are illustrated in FIGS. 10, 11 and 12. In FIGS. 10 and 11, the vertical axes represent the signal intensity and the horizontal axes represent the chemical shift value (ppm). In FIG. 12, the vertical axis represents the relative intensity and the horizontal axis represents the m/z value.

Molecular weight: 3460 MS m/z 409.6 [M-8Na$^+$]$^{8-}$, 471.4 [M-7Na$^+$]$^{7-}$, 553.8 [M-6NA$^+$]$^{6-}$, 669.3 [M-5Na$^+$]$^{5-}$, 842.3 [M-4Na$^+$]$^{4-}$, 1130.8 [M-3Na$^+$]$^{3-}$ The results of $^1$H-NMR and $^{13}$C-NMR analyses are shown in Tables 8 to 10.

TABLE 8

| | Chemical shift value (ppm) | |
|---|---|---|
| | | $^1$H-NMR |
| | | Chemical shift value, multiplicity, |
| | $^{13}$C-NMR | coupling constant |
| F1-1 | 90.3 | 5.39, d, 3.3 |
| F1-2 | 75.5 | 4.37, m |
| F1-3 | 76.0 | 4.21, m |
| F1-4 | 79.8 | 4.77, m |
| F1-5 | 67.5 | 4.19, m |
| F1-6 | 16.5 | 1.15, m |
| F2-1 | 99.8 | 5.28, m |
| F2-2 | 73.6 | 4.41, m |
| F2-3 | 73.6 | 4.41, m |
| F2-4 | 78.1 | 4.74, m |
| F2-5 | 68.7 | 4.25, m |
| F2-6 | 16.8 | 1.20, m |
| F3-1 | 98.7 | 5.31, m |
| F3-2 | 74.8 | 4.46, m |
| F3-3 | 73.6 | 4.35, m |
| F3-4 | 78.1 | 4.74, m |
| F3-5 | 67.7 | 4.25, m |
| F3-6 | 16.8 | 1.20, m |
| F4-1 | 90.2 | 5.29, m |
| F4-2 | 74.8 | 4.04, m |
| F4-3 | 74.9 | 4.27, m |
| F4-4 | 74.3 | 4.74, m |
| F4-5 | 68.1 | 4.27, q, 6.5 |
| F4-6 | 14.0 | 1.39, d, 6.5 |

TABLE 9

| | Chemical shift value (ppm) | |
|---|---|---|
| | | $^1$H-NMR |
| | | Chemical shift value, multiplicity, |
| | $^{13}$C-NMR | coupling constant |
| F5-1 | 99.2 | 5.34, d, 3.5 |
| F5-2 | 74.3 | 4.42, m |
| F5-3 | 74.3 | 4.21, m |
| F5-4 | 81.5 | 4.81, m |
| F5-5 | 68.7 | 4.20, m |
| F5-6 | 16.6 | 1.18, m |
| F6-1 | 98.7 | 5.31, m |
| F6-2 | 75.3 | 4.46, m |
| F6-3 | 71.1 | 4.35, m |
| F6-4 | 78.1 | 4.74, m |

TABLE 9-continued

| | Chemical shift value (ppm) | |
|---|---|---|
| | | $^1$H-NMR |
| | | Chemical shift value, multiplicity, |
| | $^{13}$C-NMR | coupling constant |
| F6-5 | 67.7 | 4.25, m |
| F6-6 | 16.7 | 1.19, m |
| F7-1 | 90.2 | 5.29, m |
| F7-2 | 74.8 | 4.04, m |
| F7-3 | 74.9 | 4.27, m |
| F7-4 | 74.3 | 4.74, m |
| F7-5 | 67.9 | 4.27, q, 7.0 |
| F7-6 | 14.0 | 1.43, d, 7.0 |

TABLE 10

| | Chemical shift value (ppm) | |
|---|---|---|
| | | $^1$H-NMR |
| | | Chemical shift value, multiplicity, |
| | $^{13}$C-NMR | coupling constant |
| F8-1 | 96.0 | 5.30, m |
| F8-2 | 75.3 | 4.46, m |
| F8-3 | 71.1 | 4.35, m |
| F8-4 | 78.1 | 4.81, m |
| F8-5 | 67.1 | 4.43, m |
| F8-6 | 16.7 | 1.19, m |
| F9-1 | 96.0 | 5.29, m |
| F9-2 | 75.5 | 4.33, m |
| F9-3 | 67.1 | 4.27, m |
| F9-4 | 82.0 | 4.58, d, 2.8 |
| F9-5 | 67.1 | 4.34, q, 6.5 |
| F9-6 | 16.5 | 1.15, d, 6.5 |
| F10-1 | 99.8 | 5.19, d, 4.2 |
| F10-2 | 66.3 | 3.85, dd, 4.2, 10.4 |
| F10-3 | 78.5 | 4.43, m |
| F10-4 | 70.8 | 4.05, br-s |
| F10-5 | 67.5 | 4.03, q, 6.6 |
| F10-6 | 16.1 | 1.12, d, 6.6 |
| F11-1 | 99.8 | 5.21, d, 4.2 |
| F11-2 | 66.3 | 3.85, dd, 4.2, 10.4 |
| F11-3 | 78.5 | 4.44, m |
| F11-4 | 70.8 | 4.06, br-s |
| F11-5 | 67.5 | 4.08, q, 6.6 |
| F11-6 | 16.1 | 1.12, d, 6.6 |

Saccharide composition: L-fucose (11 molecules)

Sulfate group: 18 molecules

Sodium: 18 molecules

The numbers for signal assignment in $^1$H-NMR and $^{13}$C-NMR are as indicated in formula (VII) below:

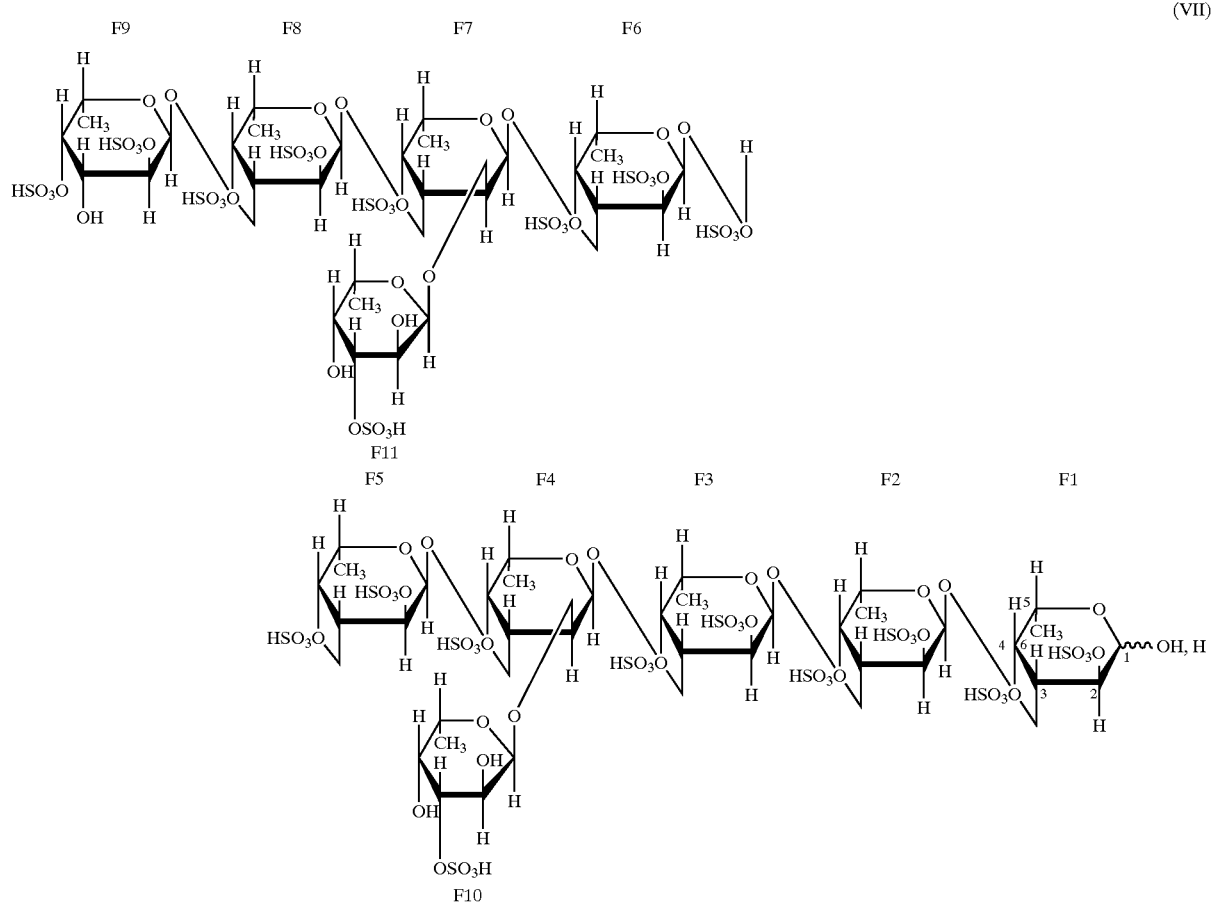

Example 3

Preparation of Sulfated Fucan Oligosaccharide Using Sulfated Fucan-Digesting Enzyme, and Purification and Structural Analysis Thereof (1) Preparation Chips were prepared from dried cultured *Kjellmaniella crassifolia* using a cutter mill (Masuko Sangyo) equipped with a screen having a pore diameter of 1 mm. 250 g of the *Kjellmaniella crassifolia* chips were suspended in 5 L of 80% ethanol. The suspension was stirred at room temperature for 2 hours and filtered. The washing in 80% ethanol was repeated four times to obtain washed *Kjellmaniella crassifolia* chips. 250 g of the washed chips were suspended in 5 L of 17 mM imidazole-hydrochloride buffer (pH 7.5) containing 125 mM calcium chloride, 250 mM sodium chloride and 10% ethanol. The suspension was stirred at room temperature for 24 hours, filtered and centrifuged to obtain a *Kjellmaniella crassifolia* fucoidan solution. 10 U of the sulfated fucan-digesting enzyme was added to 1 L of the extract. The resulting mixture was stirred at room temperature for three days, and then filtered through a filter paper. A supernatant was obtained by centrifuging the filtrate. A small molecule fraction recovered from the supernatant using an ultrafiltration device equipped with hollow fibers with exclusion molecular weight of 10,000 was designated as a sulfated fucan oligosaccharide fraction 2.

(2) Purification

The sulfated fucan oligosaccharide fraction 2 obtained in Example 3-(1) was loaded onto a 1-L DEAE-Cellulofine A-800 column equilibrated with 10 mM imidazole-hydrochloride buffer (pH 6.5) containing 100 mM sodium chloride. After adequately washing with the same buffer, elution was then carried out with a gradient of 100 mM to 1 M sodium chloride. The total sugar content and the total uronic acid content of each of the eluted fractions were measured according to the phenol-sulfuric acid method and the carbazole-sulfuric acid method, respectively. As a result, the eluted fractions formed two peaks. The fractions in the respective peaks were subjected to mass spectrometric analyses. Determination of the saccharide compositions for the respective peaks showed that they contained only fucose but did not contain uronic acid. Compositions of the oligosaccharides having the respective masses estimated based on the saccharide compositions are shown in Table 11.

TABLE 11

| Peak no. | Molecular weight | Composition of oligosaccharide | | |
|---|---|---|---|---|
| | | Fucose | Sulfate group | Sodium |
| 2-(1) | 1914 | 6 | 10 | 10 |
| | 2264 | 7 | 12 | 12 |
| | 2016 | 6 | 11 | 11 |

TABLE 11-continued

|  | | Composition of oligosaccharide | | |
| --- | --- | --- | --- | --- |
| Peak no. | Molecular weight | Fucose | Sulfate group | Sodium |
| 2-(2) | 3110 | 10 | 16 | 16 |
|  | 2760 | 9 | 14 | 14 |
|  | 3360 | 11 | 17 | 17 |
|  | 4308 | 14 | 22 | 22 |
|  | 3958 | 13 | 20 | 20 |

The fractions constituting each peak were pooled, concentrated using an evaporator, and purified by the same method described in Example 2-(2).

Fractions obtained by YMC Pack Polyamine II column chromatography were subjected to mass spectrometric analyses, and substances having masses of 1914 and 2016 from peak number 2-(1), and a substance having a mass of 3110 from peak number 2-(2) were obtained as their main peak.

The fractions constituting each peak that contained having masses of 1914, 2016, and 3110 were polled, applied to a Cellulofine GCL-25 column equilibrated with 10% ethanol and eluted using 10% ethanol to desalt. Thus the sulfated fucan oligosaccharides 2-(1)-1, 2-(1)-2, and 2-(2) of the present invention were obtained.

(3) Structural Analyses

The sulfated fucan oligosaccharides 2-(1)-1, 2-(1)-2, and 2-(2) of the present invention obtained in Example 3-(2) were subjected to analyses of the reducing terminal sugar and component sugar according to a fluorescence labeling method using 2-aminopyridine. As a result, the reducing terminal and the component sugar of them were only fucose. Next, their sulfate content (by the turbidimetric method using barium chloride) and their uronic acid content (by the carbazole-sulfuric acid method) were determined. NMR analyses of them using a nuclear magnetic resonance apparatus JNM α-500 (Nippon Denshi) were also carried out. The linkages among the constituting saccharides were analyzed using the HMBC method, a method for $^1$H-detection of heteronuclei. The DQF-COSY method and the HOHAHA method were used for the assignment of $^1$H-NMR data, and the HSQC method was used for the assignment of $^{13}$C-NMR data.

Physical properties of the sulfated fucan oligosaccharides 2-(1)-1, 2-(1)-2, and 2-(2) of the present invention are shown below.

(a) Physical Properties of the Sulfated Fucan Oligosaccharide 2-(1)-1

The result of all the above analyses showed that the sulfated fucan oligosaccharide 2-(1)-1 is the same substance as the sulfated fucan oligosaccharide 1-(1) of the present invention.

(b) Physical Properties of the Sulfated Fucan Oligosaccharide 2-(1)-2

Figure 13:
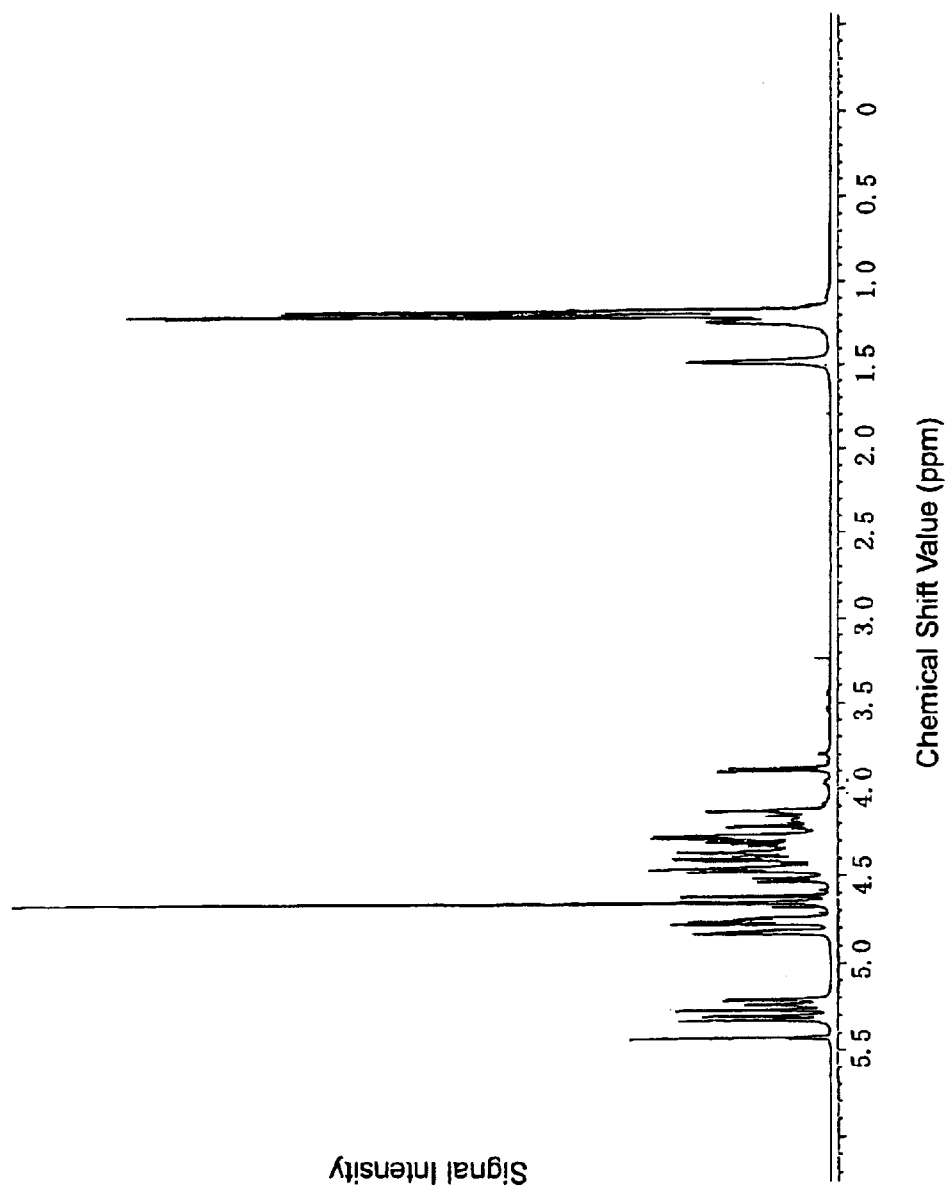
FIG. 13: a figure which illustrates the $^1$H-NMR spectrum of the sulfated fucan oligosaccharide 2-(1)-2 according to the present invention.
Figure 14:
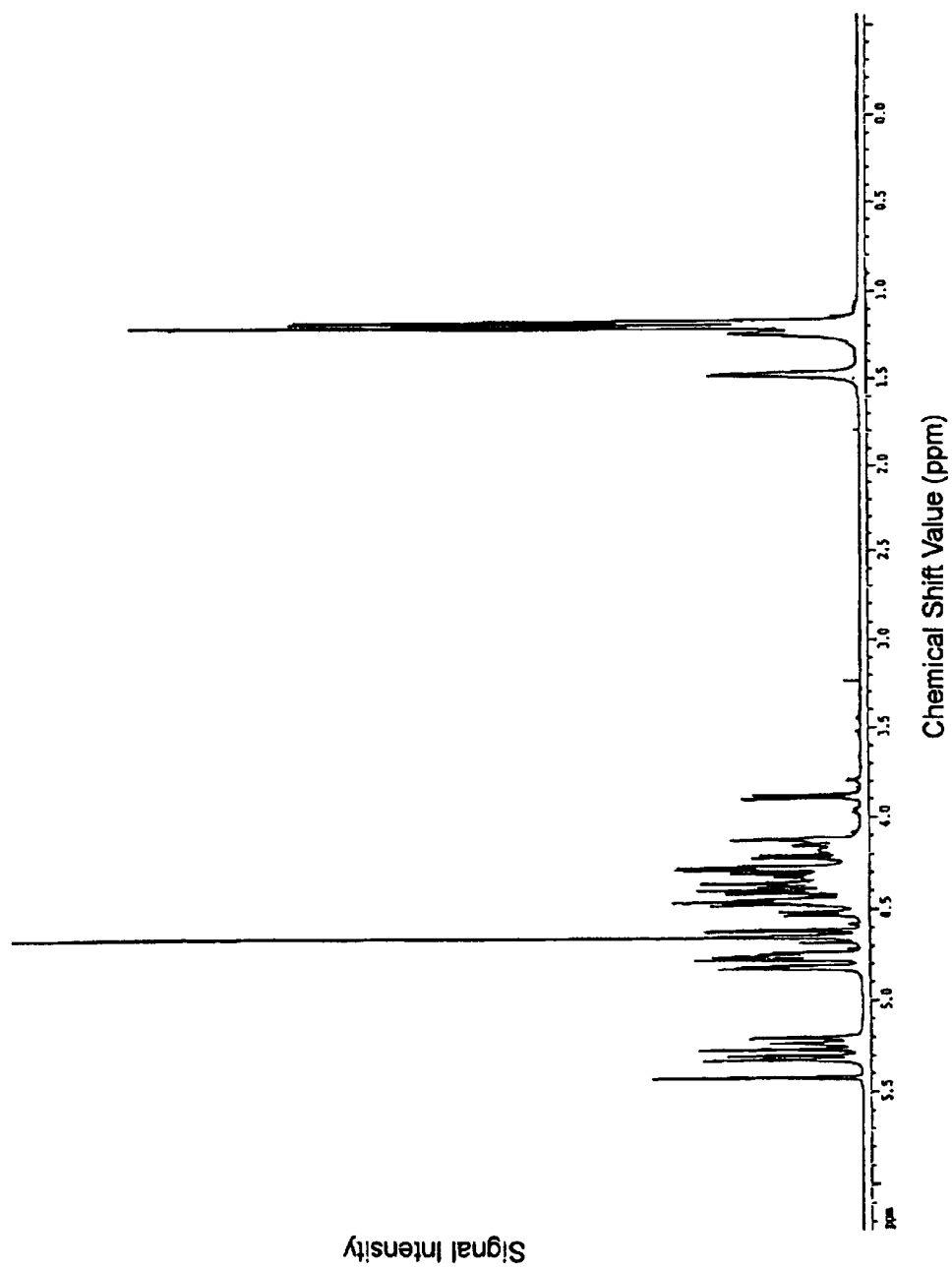
FIG. 14: a figure which illustrates the $^{13}$C-NMR spectrum of the sulfated fucan oligosaccharide 2-(1)-2 according to the present invention.
Figure 15:
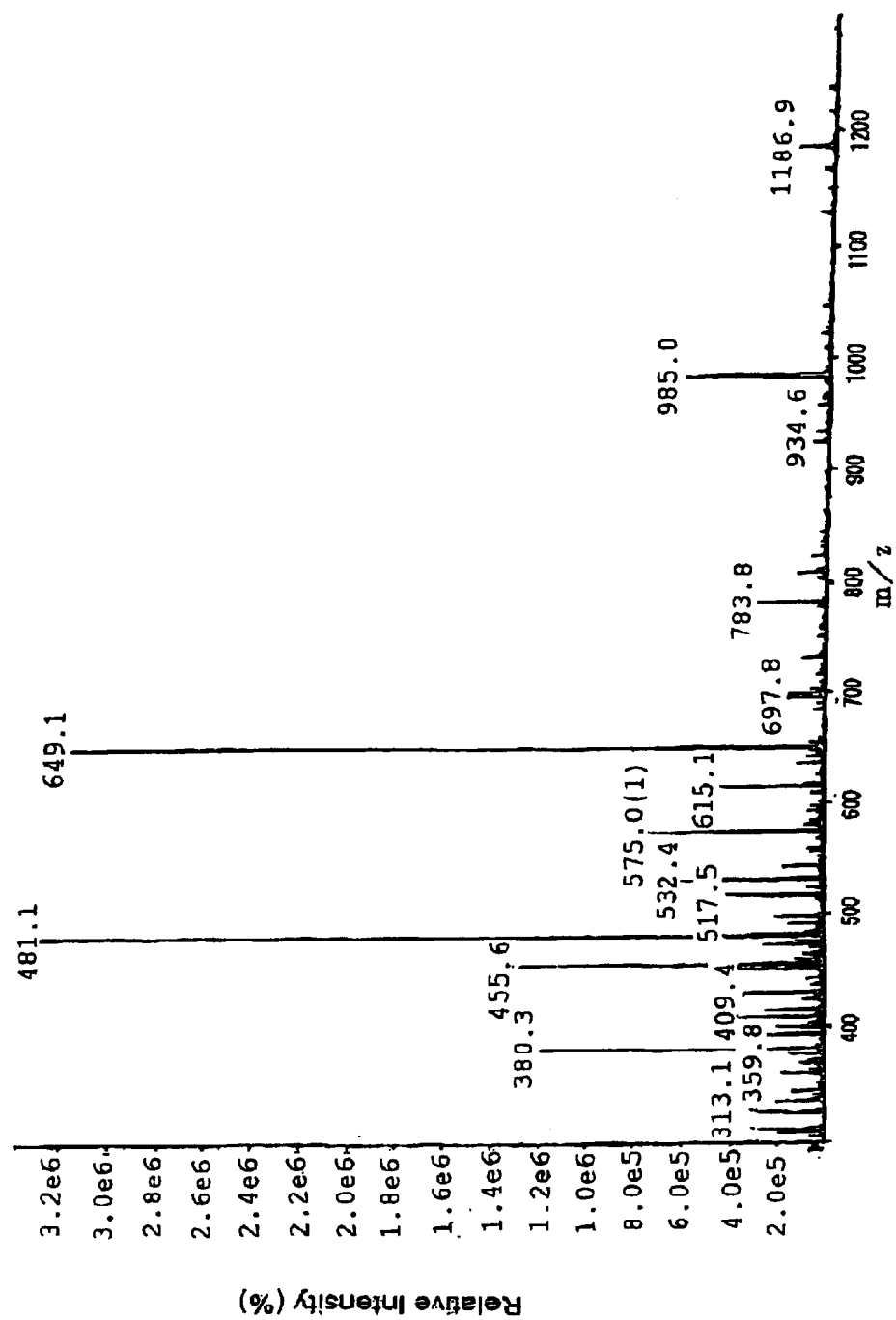
FIG. 15: a figure which illustrates the mass spectrum of the sulfated fucan oligosaccharide 2-(1)-2 according to the present invention.
Figure 1:
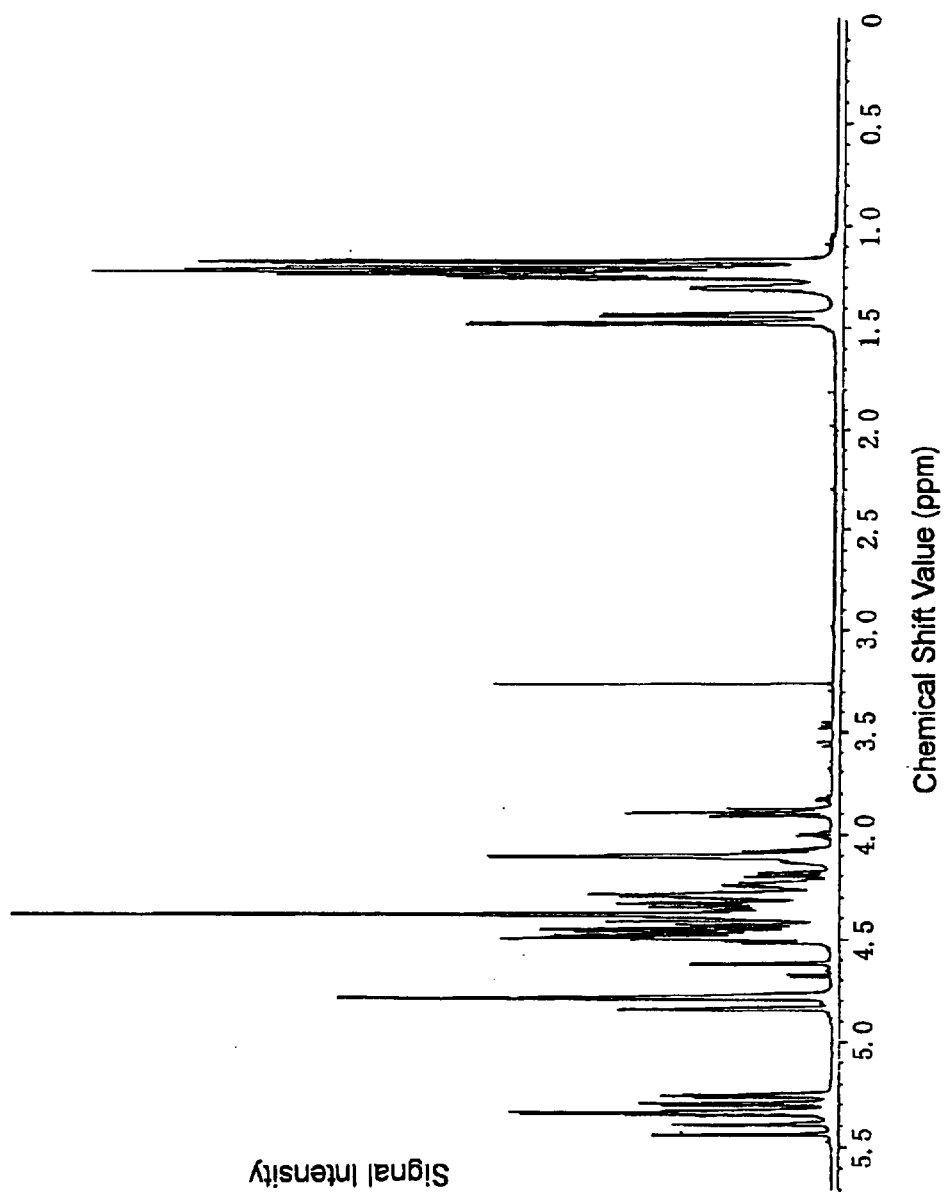

The results for the mass spectrometric analysis and assignment in NMR analyses are shown below. The $^1$H-NMR spectrum, $^{13}$C-NMR spectrum, and the mass spectrum of this oligosaccharide are shown in FIGS. 13, 14, and 15, respectively. In FIGS. 13 and 14, the vertical axes represent the signal intensity and the horizontal axes represent the chemical shift value (ppm). In FIG. 15, the vertical axis represents the relative intensity of the signals and the horizontal axis represents the m/z value.

Molecular weight: 2016 MS m/z 313.1 $[M-6Na^+]^{6-}$, 380.3 $[M-5Na^+]^{5-}$, 481.1 $[M-4Na^+]^{4-}$, 649.1 $[M-3Na^+]^{3-}$, 985.0 $[M-2Na^+]^{2-}$ The results of $^1$H-NMR and $^{13}$C-NMR analyses are shown in Tables 12 and 13.

TABLE 12

| | Chemical shift value (ppm) | |
| --- | --- | --- |
| | $^{13}$C-NMR | $^1$H-NMR Chemical shift value, multiplicity, coupling constant |
| F1-1 | 90.7 | 5.43, d, 3.6 |
| F1-2 | 75.3 | 4.41, dd, 3.6, 10.1 |
| F1-3 | 75.7 | 4.15, dd, 10.1, 2.4 |
| F1-4 | 80.6 | 4.83, d, 2.4 |
| F1-5 | 67.0 | 4.22, q, 6.6 |
| F1-6 | 16.5 | 1.18, d, 6.6 |
| F2-1 | 99.2 | 5.27, d, 3.2 |
| F2-2 | 74.5 | 4.45, m |
| F2-3 | 71.9 | 4.46, m |
| F2-4 | 78.1 | 4.77, br-s |
| F2-5 | 67.7 | 4.30, q, 6.6 |
| F2-6 | 16.5 | 1.20, d, 6.6 |
| F3-1 | 89.8 | 5.24, br-s |
| F3-2 | 75.2 | 4.12, m |
| F3-3 | 74.2 | 4.28, m |
| F3-4 | 73.3 | 4.76, br-s |
| F3-5 | 71.4 | 4.36, q, 6.0 |
| F3-6 | 13.6 | 1.48, d, 6.0 |

TABLE 13

| | Chemical shift value (ppm) | |
| --- | --- | --- |
| | $^{13}$C-NMR | $^1$H-NMR Chemical shift value, multiplicity, coupling constant |
| F4-1 | 98.2 | 5.33, d, 3.3 |
| F4-2 | 73.3 | 4.47, m |
| F4-3 | 71.0 | 4.28, m |
| F4-4 | 78.1 | 4.78, br-s |
| F4-5 | 67.7 | 4.32, q, 6.6 |
| F4-6 | 16.5 | 1.20, d, 6.6 |
| F5-1 | 94.8 | 5.31, d, 3.4 |
| F5-2 | 75.3 | 4.38, m |
| F5-3 | 66.9 | 4.28, m |
| F5-4 | 81.7 | 4.62, d, 2.4 |
| F5-5 | 66.8 | 4.40, q, 6.6 |
| F5-6 | 16.5 | 1.18, d, 6.6 |
| F6-1 | 100.1 | 5.22, d, 3.6 |
| F6-2 | 66.3 | 3.89, dd, 3.6, 10.4 |
| F6-3 | 75.7 | 4.52, dd, 10.4, 3.0 |
| F6-4 | 79.2 | 4.82, d, 3.0 |
| F6-5 | 67.2 | 4.18, q, 6.6 |
| F6-6 | 16.3 | 1.20, d, 6.6 |

Component sugar: only L-fucose (6 molecules)

Sulfate residues: 11 molecules

Sodium: 11 molecules

The numbers for signal assignment in $^1$H-NMR and $^{13}$C-NMR analyses are as indicated in formula (VIII) below:

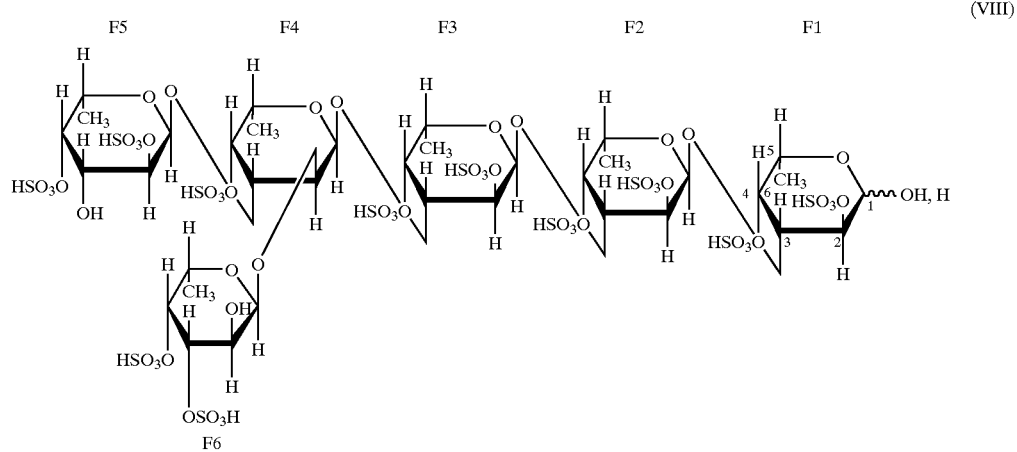

(VIII)

Physical Properties of the Oligosaccharide 2-(2)

Figure 17:
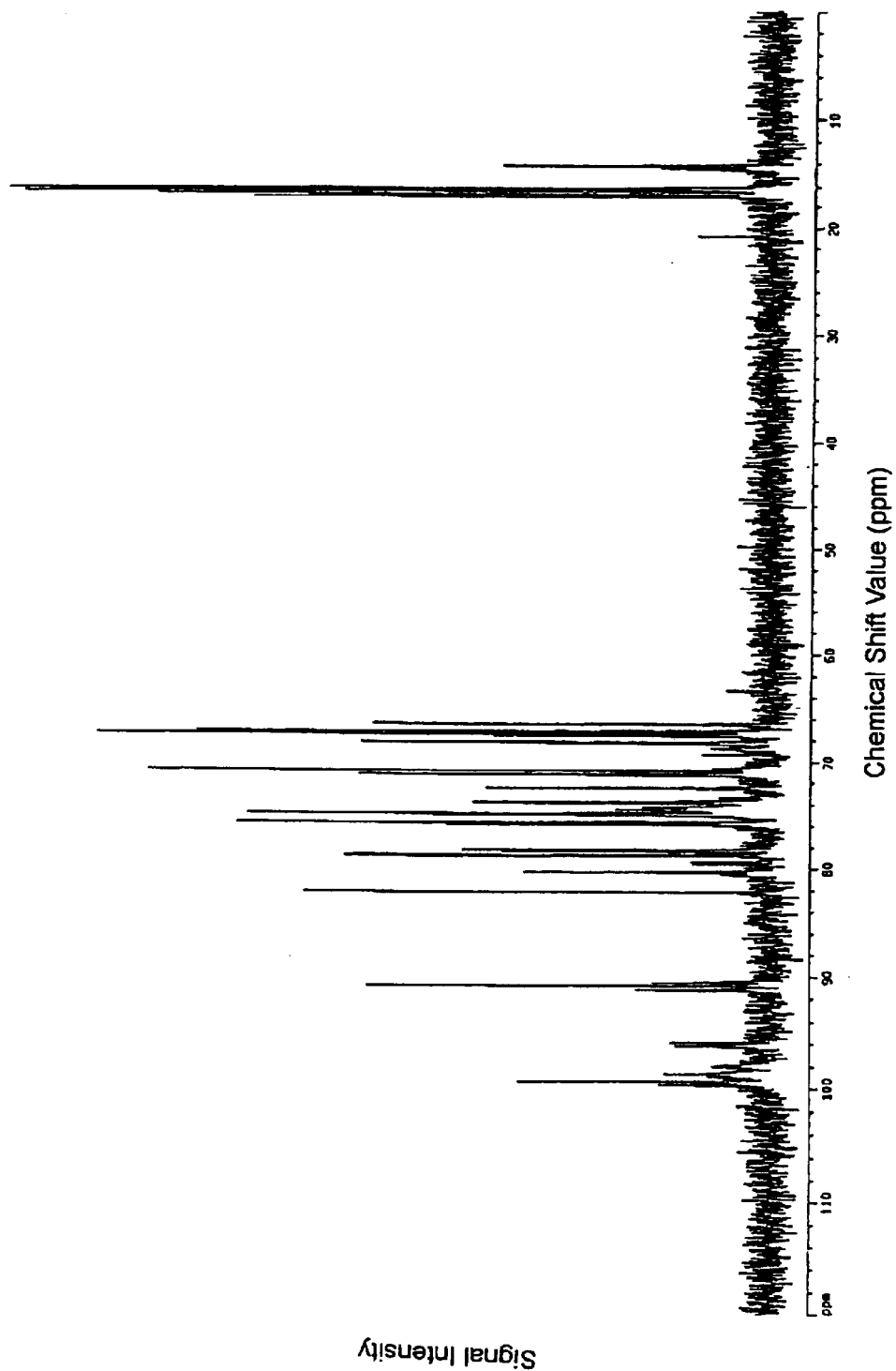
FIG. 17: a figure which illustrates the $^{13}$C-NMR spectrum of the sulfated fucan oligosaccharide 2-(2) according to the present invention.
Figure 18:
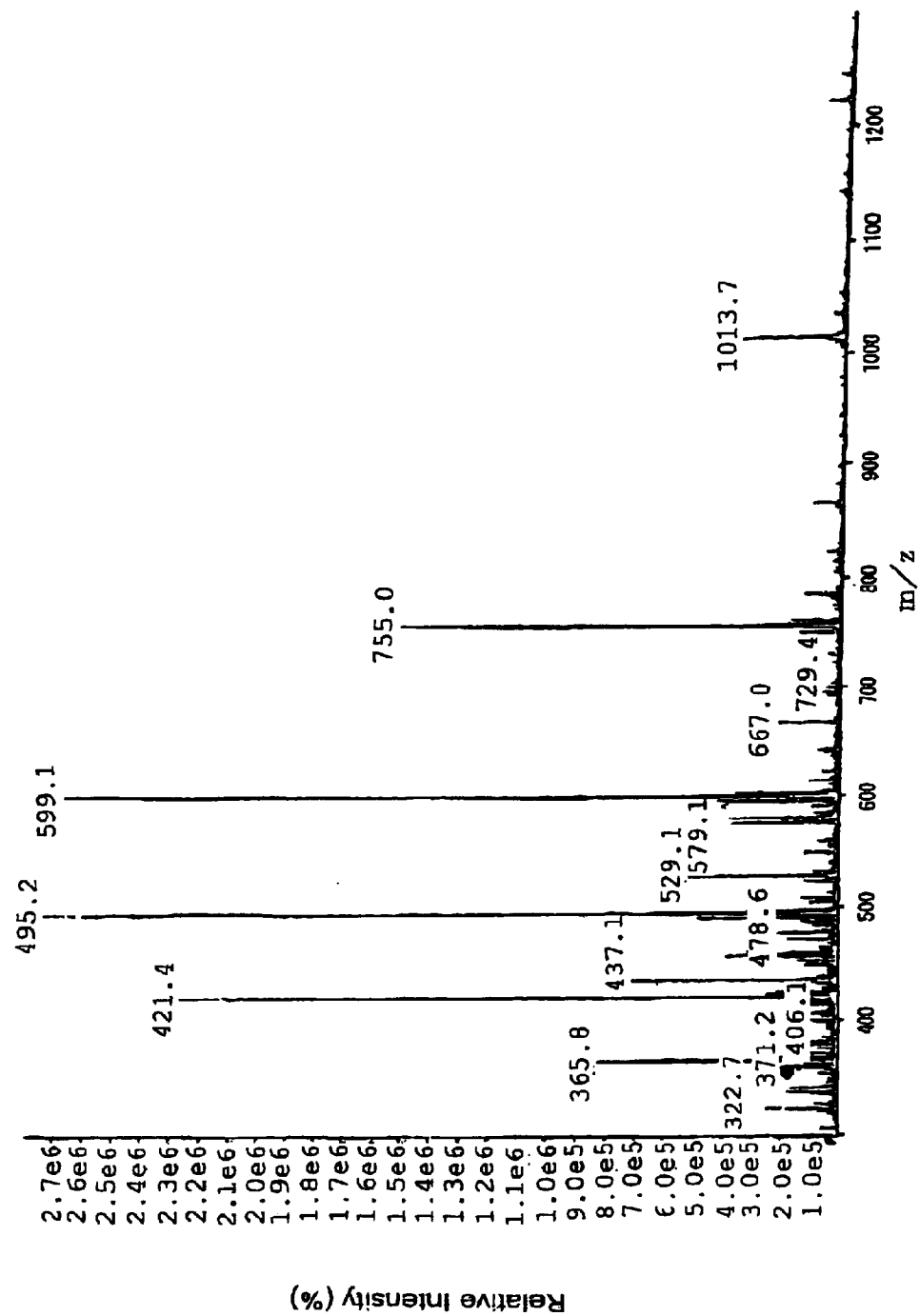
FIG. 18: a figure which illustrates the mass spectrum of the sulfated fucan oligosaccharide 2-(2) according to the present invention.

The results of the mass spectrometric analysis are shown below, and the $^1$H-NMR spectrum, $^{13}$C-NMR spectrum, and the mass spectrum of the sulfated fucan oligosaccharide 2-(2) of the present invention are shown in FIGS. 16, 17, and 18, respectively. In FIGS. 16 and 17, the vertical axes represent the signal intensity and the horizontal axes represent the chemical shift value (ppm). In FIG. 18, the vertical axis represents the relative intensity of the signals and the horizontal axis represents the m/z value.

Molecular weight: 3111 MS m/z 365.8[M-8Na$^+$]$^{8-}$, 421.4 [M-7Na$^+$]$^{7-}$, 495.2[M-6Na$^+$]$^{6-}$, 599.1[M-5Na$^+$]$^{5-}$, 755.0 [M-4Na$^+$]$^{4-}$, 1013.7[M-3Na$^+$]$^{3-}$ The results of $^1$H-NMR and $^{13}$C-NMR analyses are shown in Tables 14 to 16.

TABLE 14

| | Chemical shift value (ppm) | |
|---|---|---|
| $^{13}$C-NMR | | $^1$H-NMR Chemical shift value, multiplicity, coupling constant |
| F1-1 | 90.8 | 5.44, d, 3.4 |
| F1-2 | 75.7 | 4.44, dd, 3.4, 9.8 |
| F1-3 | 75.9 | 4.19, dd, 9.8, 2.9 |
| F1-4 | 80.3 | 4.84, d, 2.9 |
| F1-5 | 67.7 | 4.24, m |
| F1-6 | 16.6 | 1.22, m |
| F2-1 | 99.4 | 5.30, d, 3.0 |
| F2-2 | 74.9 | 4.46, m |
| F2-3 | 72.5 | 4.44, m |
| F2-4 | 78.4 | 4.78, br-s |
| F2-5 | 68.2 | 4.29, q, 6.6 |
| F2-6 | 17.1 | 1.25, d, 6.6 |
| F3-1 | 91.2 | 5.29, br-s |
| F3-2 | 74.9 | 4.11, m |
| F3-3 | 75.0 | 4.28, m |
| F3-4 | 74.5 | 4.78, br-s |
| F3-5 | 68.4 | 4.31, q, 6.8 |
| F3-6 | 14.5 | 1.43, d, 6.8 |
| F4-1 | 98.7 | 5.40, d, 3.5 |
| F4-2 | 74.9 | 4.48, m |
| F4-3 | 74.9 | 4.29, m |
| F4-4 | 80.3 | 4.48, br-s |
| F4-5 | 68.4 | 4.24, m |
| F4-6 | 16.6 | 1.22, m |

TABLE 15

| | Chemical shift value (ppm) | |
|---|---|---|
| $^{13}$C-NMR | | $^1$H-NMR Chemical shift value, multiplicity, coupling constant |
| F5-1 | 98.0 | 5.35, d, 3.6 |
| F5-2 | 73.8 | 4.51, m |
| F5-3 | 71.2 | 4.39, m |
| F5-4 | 78.4 | 4.78, m |
| F5-5 | 68.2 | 4.29, m |
| F5-6 | 16.9 | 1.23, m |
| F6-1 | 90.5 | 5.34, br-s |
| F6-2 | 74.9 | 4.11, m |
| F6-3 | 75.0 | 4.29, m |
| F6-4 | 74.5 | 4.78, br-s |
| F6-5 | 68.4 | 4.31, q, 7.0 |
| F6-6 | 14.2 | 1.48, d, 7.0 |
| F7-1 | 95.9 | 5.33, m |
| F7-2 | 73.9 | 4.48, m |
| F7-3 | 71.2 | 4.37, m |
| F7-4 | 78.2 | 4.78, m |
| F7-5 | 67.3 | 4.46, m |
| F7-6 | 16.8 | 1.23, m |

TABLE 16

| | Chemical shift value (ppm) | |
|---|---|---|
| $^{13}$C-NMR | | $^1$H-NMR Chemical shift value, multiplicity, coupling constant |
| F8-1 | 96.2 | 5.33, d, 3.3 |
| F8-2 | 75.7 | 4.38, m |
| F8-3 | 67.3 | 4.31, m |
| F8-4 | 82.2 | 4.62, d, 3.1 |
| F8-5 | 67.3 | 4.38, m |
| F8-6 | 16.4 | 1.20, m |
| F9-1 | 99.7 | 5.25, d, 4.4 |
| F9-2 | 66.5 | 3.88, dd, 4.4, 10.2 |
| F9-3 | 78.7 | 4.48, m |
| F9-4 | 70.9 | 4.10, m |
| F9-5 | 67.5 | 4.08, q, 6.6 |
| F9-6 | 16.2 | 1.17, d, 6.6 |
| F10-1 | 99.7 | 5.26, d, 4.4 |
| F10-2 | 66.5 | 3.90, dd, 4.4, 10.2 |
| F10-3 | 78.7 | 4.49, m |
| F10-4 | 70.9 | 4.11, m |

TABLE 16-continued

| | Chemical shift value (ppm) | |
|---|---|---|
| | $^{13}$C-NMR | $^1$H-NMR<br>Chemical shift value, multiplicity,<br>coupling constant |
| F10-5 | 67.5 | 4.12, q, 6.6 |
| F10-6 | 16.3 | 1.17, d, 6.6 |

Saccharide composition: L-fucose (10 molecules)
Sulfate group: 16 molecules
Sodium: 16 molecules The numbers for signal assignment in $^1$H-NMR and $^{13}$C-NMR analyses are as indicated in formula (IX) below:

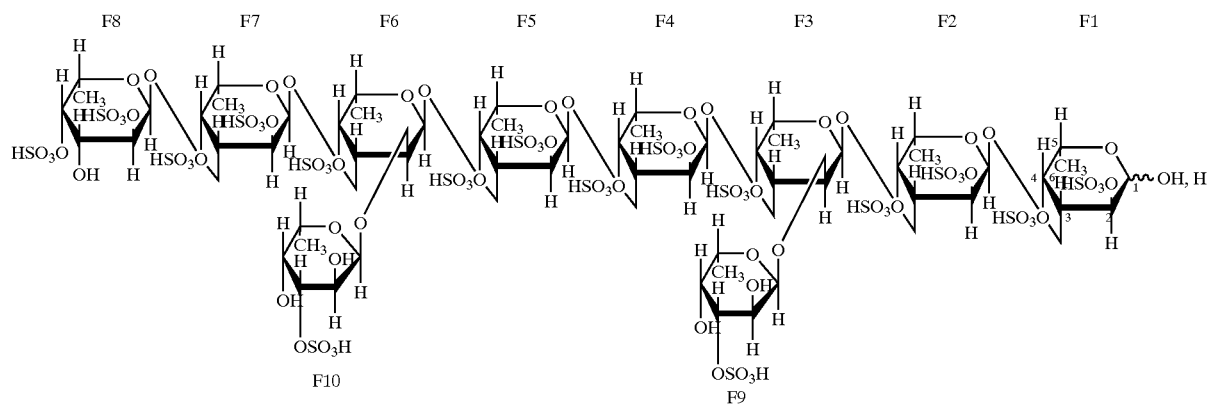

(IX)

Example 4

The Preparation of *Laminaria japonica* Sulfated Fucan Oligosaccharides Using Sulfated Fucan-Digesting Enzyme, their Purification, and their Structural Analyses (1) Preparation Dried cultured *Laminaria japonica* was disrupted into chips using a cutter mill (Masuko Sangyo) equipped with a screen having a pore diameter of 1 mm. Five hundred grams of *Laminaria japonica* chips were suspended in 4.5 L of 80% ethanol, stirred at room temperature for 24 hours, and filtered. The residue was washed with 80% ethanol for three times by the same method as described above, and the washed *Laminaria japonica* chips were obtained. All the washed chips were suspended in 10 L of 50 mM imidazole-HCl buffer (pH 8.0) containing 50 mM calcium chloride, 200 mM sodium chloride, and 10% ethanol, to the suspension was added 2 U of the sulfated fucan-digesting enzyme, stirred at room temperature for 5 days, filtered through filter paper, thus obtained filtrate was centrifuged, and the supernatant was fractionated using an ultrafiltration device equipped with hollow fibers with exclusion molecular weight of 10,000, and the low molecular weight fraction was recovered and designated as a *Laminaria japonica* sulfated fucan oligosaccharide fraction 1.

(2) Purification

The conductivity of the solution of the *Laminaria japonica* sulfated fucan oligosaccharide fraction 1 obtained in Example 4-(1) was adjusted by adding 10% ethanol to the same conductivity of the equilibration buffer described below, and it was applied to 500 ml of DEAE-Cellulofine A-800 column equilibrated with 20 mM imidazole-HCl buffer (pH 6.5) containing 200 mM sodium chloride and 10% ethanol, then the column was washed with the same buffer, and eluted with a linear gradient of sodium chloride from 200 mM to 1.2 M. For the elution, 4.5 L of the buffer was used, and fractions of 50 ml were collected. The total sugar content and the total uronic acid content of each of the eluted fractions were measured by the phenol-sulfuric acid method and carbazole-sulfuric acid method, respectively. As a result, the eluted fractions formed 3 peaks. Fractions around the second peak (44–48) were pooled, concentrated to 40 ml by evaporator, applied to Cellulofine GCL-25 column (4.1×90 cm) equilibrated with 10% ethanol, and eluted with 10% ethanol. The total sugar of each of the eluted fractions was determined by phenol-sulfuric acid method. The fractions in which sugar was detected were pooled, concentrated to 8.4 ml by evaporator, and purified by the condition described below.

Column: YMC Pack Polyamine II (20×250 mm, YMC)
Flow rate: 8 ml/minute
Column temperature: 30° C.
Equilibration solution: 875 mM sodium dihydrogenphosphate containing 10% acetonitrile
Elution: Gradient from 875 mM sodium dihydrogenphosphate containing 10% acetonitrile to 1.4 M sodium dihydrogenphosphate containing 10% acetonitrile
Fractionation: 4 ml/fraction
Detection: by the phenol-sulfuric acid method Fractions obtained by the column chromatography shown above (3 times, fraction number around 50–59) were pooled, dialyzed against 10% ethanol using a dialysis tube of which the exclusion molecular weight is 3,500, concentrated to about 40 ml by evaporator, applied to Cellulofine GCL-25 column equilibrated with 10% ethanol, and eluted with 10% ethanol.

The total sugar of each of the eluted fractions was determined by the phenol-sulfuric acid method. The fractions around the main peak were pooled and purified again by Cellulofine GCL-25 as described above. The fractions around the main peak of these eluted fractions were pooled, concentrated by Speed Vac, and lyophilized. Thus *Laminaria japonica* sulfated fucan oligosaccharide 1 was obtained.

(3) Structural Analyses

By the structural analyses of the oligosaccharide as shown in Example 2, the structure of *Laminaria japonica* sulfated fucan oligosaccharide 1 was determined to be the same structure as the sulfated fucan oligosaccharide 1-(3) shown in Example 2.

Example 5

Preparation, Purification, and Structural Analyses of *Lessonia nigrescence* Sulfated Fucan Oligosaccharide (1) Preparation By the method shown in Referential Example 1, *Lessonia nigrescens* fucoidan was prepared from dried chips of *Lessonia nigrescens*.

Namely, 10 g of *Lessonia nigrescens* fucoidan was dissolved in 2 L of 50 mM imidazole-HCl buffer (pH 8.0) containing 50 mM calcium chloride, 300 mM sodium chloride, and 10% ethanol. To the solution was added 1 U of sulfated fucan-digesting enzyme, stirred at room temperature for 40 hours, and recovered its low molecular weight fraction using an ultrafiltration device equipped with hollow fibers with exclusion molecular weight of 10,000, and thus obtained fraction was designated as a *Lessonia nigrescens* sulfated fucan oligosaccharide fraction 1.

(2) Purification

*Lessonia nigrescens* sulfated fucan oligosaccharide fraction 1 obtained in (1) was applied to 1000 ml of DEAE-Cellulofine A-800 column equilibrated with 10 mM imidazole-HCl buffer (pH 6.0) containing 200 mM sodium chloride and 10% ethanol, then the column was washed with the same buffer, and eluted with a linear gradient of sodium chloride from 200 mM to 700 mM. For the elution, 5 L of the buffer was used, and fractions of 56 ml were collected. The total sugar content and the total uronic acid content of each of the eluted fractions were measured by the phenol-sulfuric acid method and carbazole-sulfuric acid method, respectively. As a result, the eluted fractions formed 7 peaks. Fractions around the each peak were pooled separately, concentrated to 40 ml by evaporator (they are designated as *Lessonia nigrescens* sulfated fucan oligosaccharides 1-(1) to 1-(7)), applied to Cellulofine GCL-25 column (4.1×90 cm) equilibrated with 10% ethanol, and eluted with 10% ethanol. The total sugar of each of the eluted fractions was determined by phenol-sulfuric acid method. The fractions in which sugar was detected were pooled, concentrated by evaporator, and purified by the condition described below.

Column: YMC Pack Polyamine II (20×250 mm, YMC)
Flow rate: 8 ml/minute
Column temperature: 30° C.
Equilibration solution: For *Lessonia nigrescens* sulfated fucan oligosaccharides 1-(1), (2), and (3), 90 mM sodium dihydrogenphosphate containing 10% acetonitrile. For *Lessonia nigrescens* sulfated fucan oligosaccharide 1-(4) and (5), 630 mM sodium dihydrogenphosphate containing 10% acetonitrile. For *Lessonia nigrescens* sulfated fucan oligosaccharide 1-(6), 720 mM sodium dihydrogenphosphate containing 10% acetonitrile. For *Lessonia nigrescens* sulfated fucan oligosaccharide 1-(7), 900 mM sodium dihydrogenphosphate containing 10% acetonitrile.

Elution: For *Lessonia nigrescens* sulfated fucan oligosaccharides 1-(1), (2), and (3), with the gradient from 90 mM sodium dihydrogenphosphate containing 10% acetonitrile to 900 mM sodium dihydrogenphosphate containing 10% acetonitrile. For *Lessonia nigrescens* sulfated fucan oligosaccharides 1-(4) and (5), with the gradient from 630 mM sodium dihydrogenphosphate containing 10% acetonitrile to 1260 mM sodium dihydrogenphosphate containing 10% acetonitrile. For *Lessonia nigrescens* sulfated fucan oligosaccharide 1-(6), with the gradient from 720 mM sodium dihydrogenphosphate containing 10% acetonitrile to 1440 mM sodium dihydrogenphosphate containing 10% acetonitrile. For *Lessonia nigrescens* sulfated fucan oligosaccharide 1-(7), with the gradient from 900 mM sodium dihydrogenphosphate containing 10% acetonitrile to 1620 mM sodium dihydrogenphosphate containing 10% acetonitrile.

Fractionation: 4 ml/fraction

Detection: by the phenol-sulfuric acid method

*Lessonia nigrescens* sulfated fucan oligosaccharides from 1-(1) to 1-(7) were fractionated by the column chromatography shown above, and the fractions in which sugar was detected were pooled, concentrated to about 40 ml by evaporator, applied to Cellulofine GCL-25 column equilibrated with 10% ethanol, and eluted with 10% ethanol.

The total sugar of each of the eluted fractions was determined by the phenol-sulfuric acid method. The fractions around the main peak were pooled and purified again by Cellulofine GCL-25 as described above. As for *Lessonia nigrescens* sulfated fucan oligosaccharide 1-(7), two main peaks were observed, therefore, the two peaks were designated as *Lessonia nigrescens* sulfated fucan oligosaccharides 1-(7)-1 and 1-(7)-2.

The fractions around the main peak of each of these eluted fractions were pooled, concentrated by Speed Vac, and lyophilized. Thus *Lessonia nigrescens* sulfated fucan oligosaccharides from 1-(1) to 1-(7)-2 were obtained.

(3) Structural Analyses

The structural analyses of these oligosaccharides were carried out as described in Example 2.

Physical properties of the *Lessonia nigrescens* sulfated fucan oligosaccharides 1-(1) to 1-(7)-2 of the present invention are shown below.

(a) Physical Properties of *Lessonia nigrescens* Sulfated Fucan Oligosaccharide 1-(1)

Figure 19:
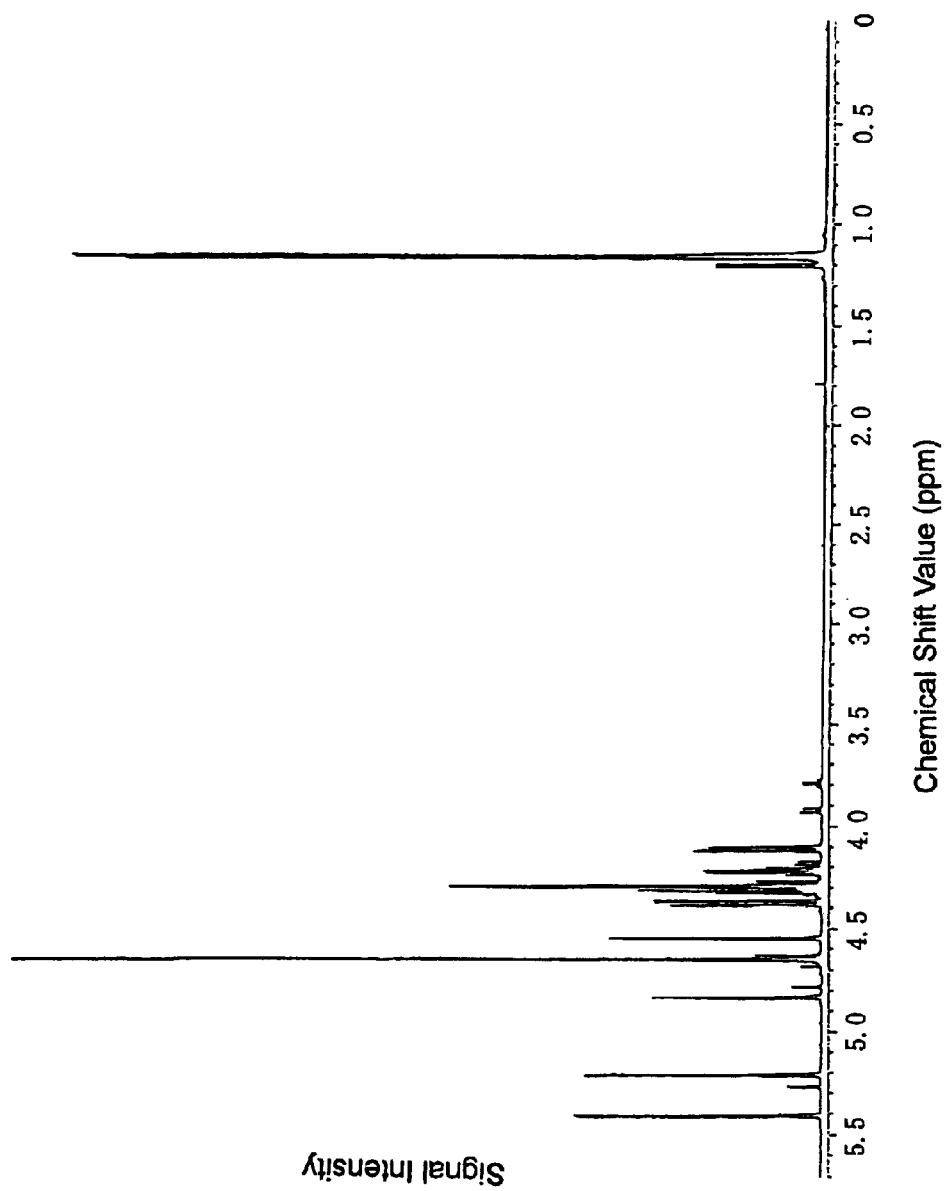
FIG. 19: a figure which illustrates the $^1$H-NMR spectrum of the *Lessonia nigrescens* sulfated fucan oligosaccharide 1-(1) according to the present invention.
Figure 20:
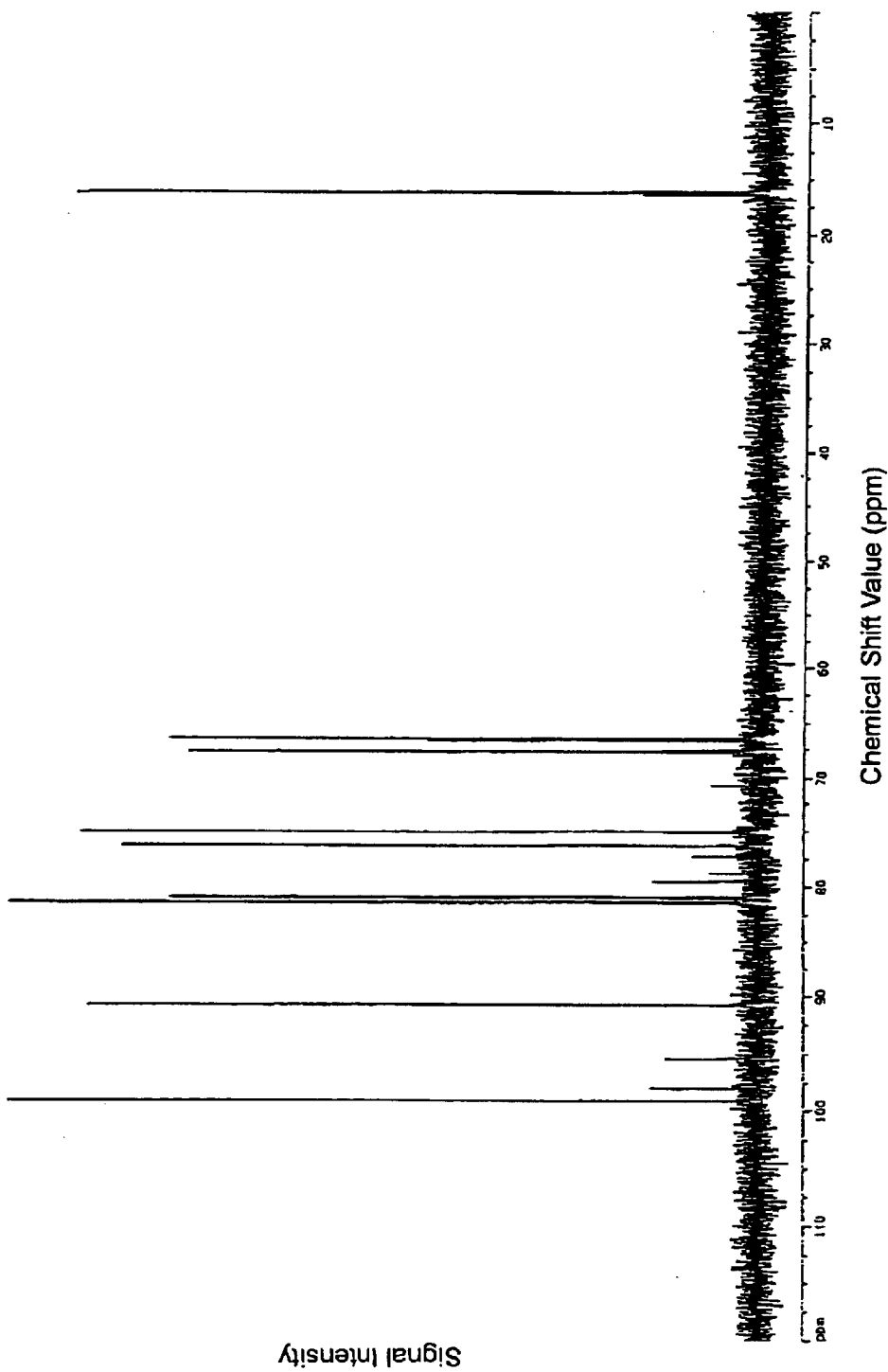
FIG. 20: a figure which illustrates the $^{13}$C-NMR spectrum of the *Lessonia nigrescens* sulfated fucan oligosaccharide 1-(1) according to the present invention.
Figure 21:
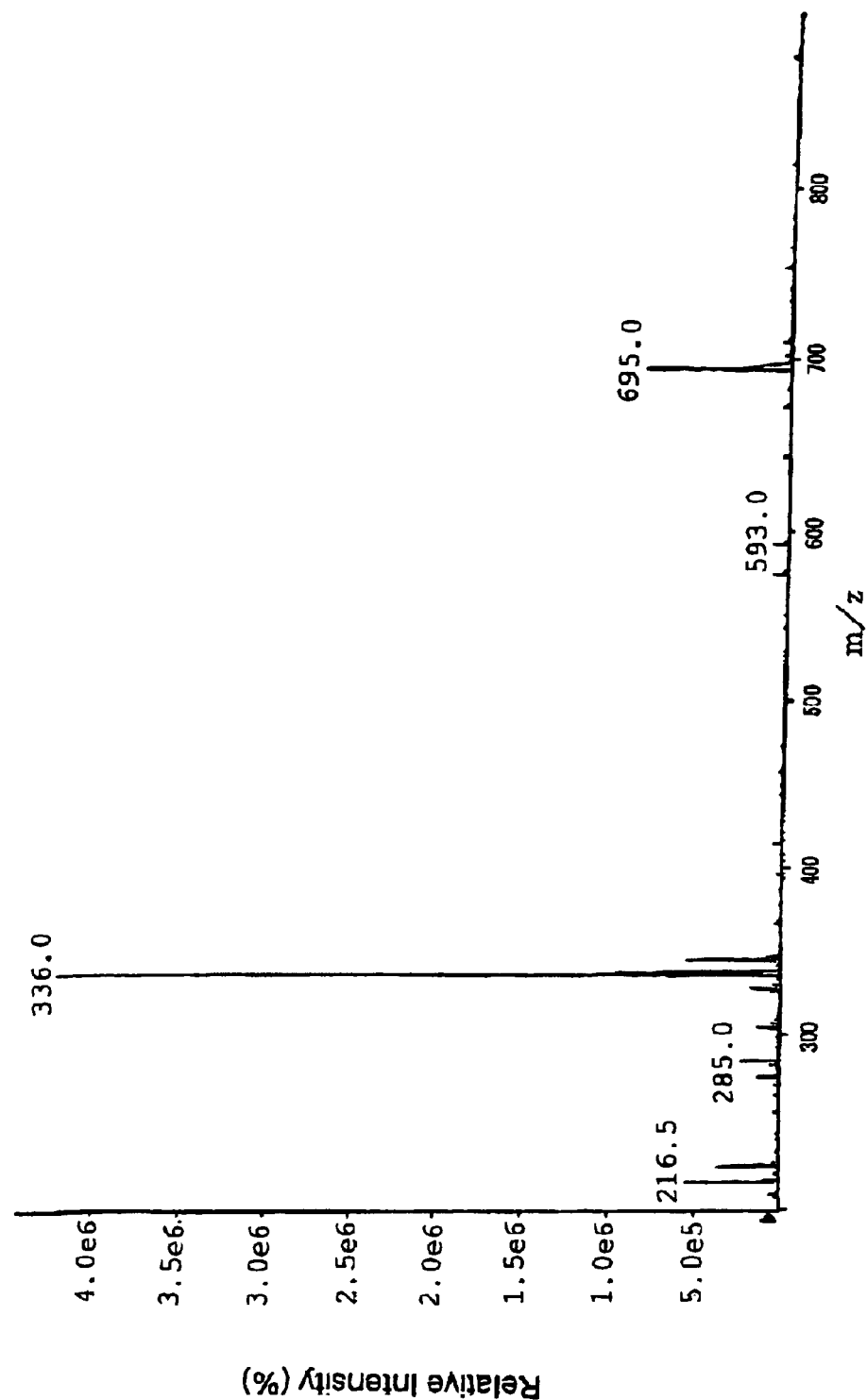
FIG. 21: a figure which illustrates the mass spectrum of the *Lessonia nigrescens* sulfated fucan oligosaccharide 1-(1) according to the present invention.

The results for the mass spectrometric analysis and assignment in NMR analyses are shown below, and the $^1$H-NMR spectrum, $^{13}$C-NMR spectrum, and the mass spectrum of this oligosaccharide are shown in FIGS. 19, 20, and 21, respectively. In FIGS. 19 and 20, the vertical axes represent the signal intensity and the horizontal axes represent the chemical shift value (ppm). In FIG. 21, the vertical axis represents the relative intensity of the signals and the horizontal axis represents the m/z value.

Molecular weight; 718 MS m/z 216.5 [M-3Na$^+$]$^{3-}$, 336.0 [M-2Na$^+$]$^{2-}$, 695.0 [M–Na$^+$]$^-$ The results of $^1$H-NMR and $^{13}$C-NMR analyses are shown in Table 17.

TABLE 17

| | Chemical shift value (ppm) | |
|---|---|---|
| | | $^1$H-NMR |
| | $^{13}$C-NMR | Chemical shift value, multiplicity, coupling constant |
| F1-1 | 90.8 | 5.41, d, 3.6 |
| F1-2 | 75.1 | 4.38, dd, 3.6, 10.8 |
| F1-3 | 75.1 | 4.11, dd, 10.8, 3.0 |
| F1-4 | 81.0 | 4.84, d, 3.0 |
| F1-5 | 66.7 | 4.22, q, 6.0 |
| F1-6 | 16.2 | 1.16, d, 6.0 |
| F2-1 | 99.2 | 5.21, d, 3.0 |
| F2-2 | 76.4 | 4.29, m |
| F2-3 | 67.8 | 4.29, m |
| F2-4 | 81.5 | 4.55, d, 3.0 |
| F2-5 | 67.8 | 4.31, q, 6.6 |
| F2-6 | 16.3 | 1.16, d, 6.6 |

Component sugar: only L-fucose (2 molecules)
Sulfate residues: 4 molecules
Sodium: 4 molecules The numbers for signal assignment in $^1$H-NMR and $^{13}$C-NMR analyses are as indicated in formula (X) below:

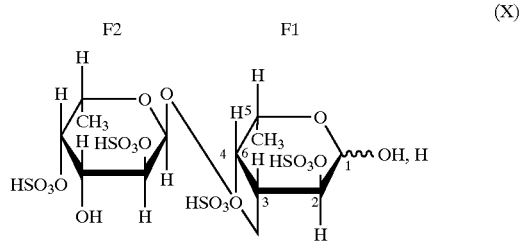

(X)

(b) Physical Properties of *Lessonia nigrescens* Sulfated Fucan Oligosaccharide 1-(2)

Figure 22:
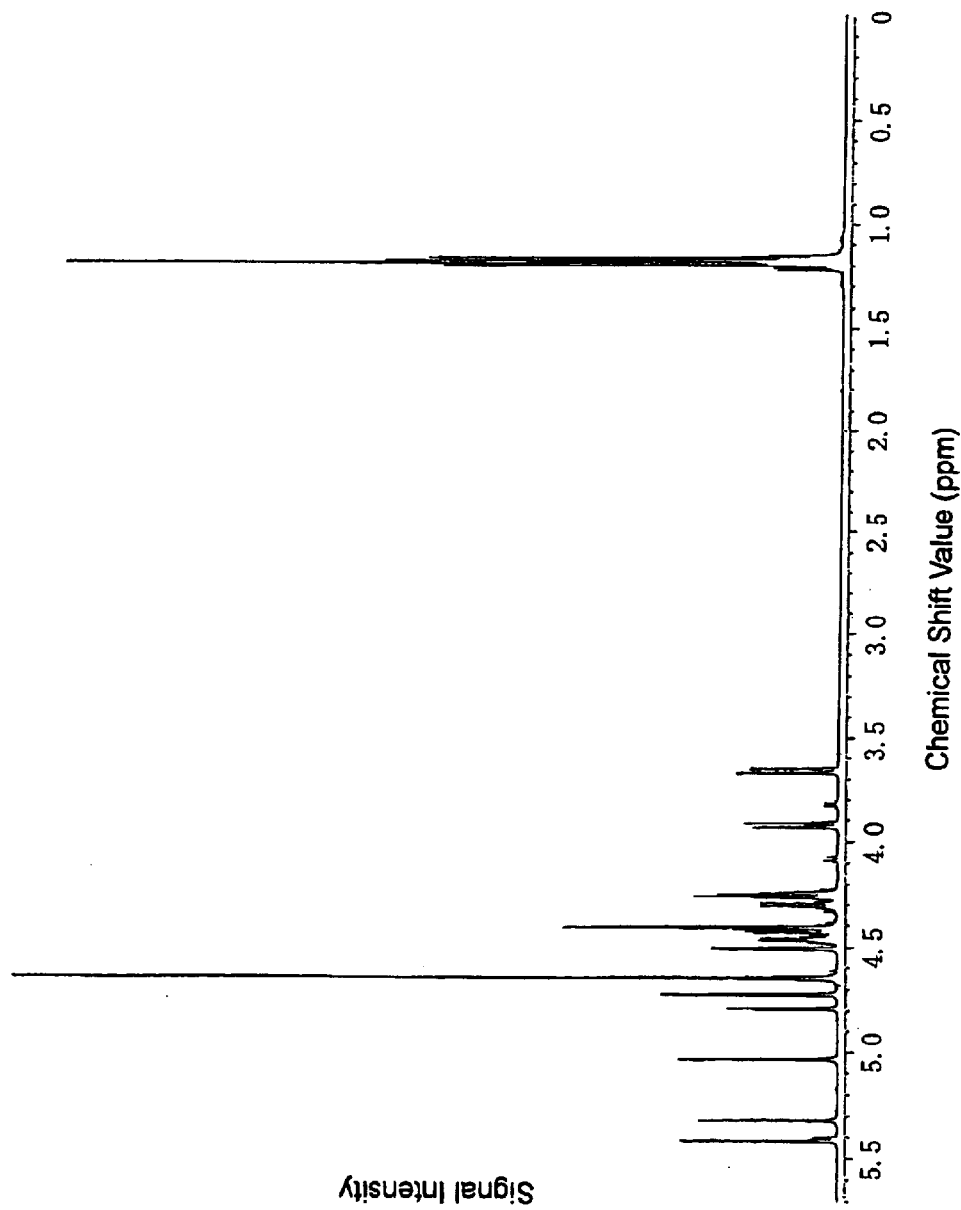
FIG. 22: a figure which illustrates the $^1$H-NMR spectrum of the *Lessonia nigrescens* sulfated fucan oligosaccharide 1-(2) according to the present invention.
Figure 2:
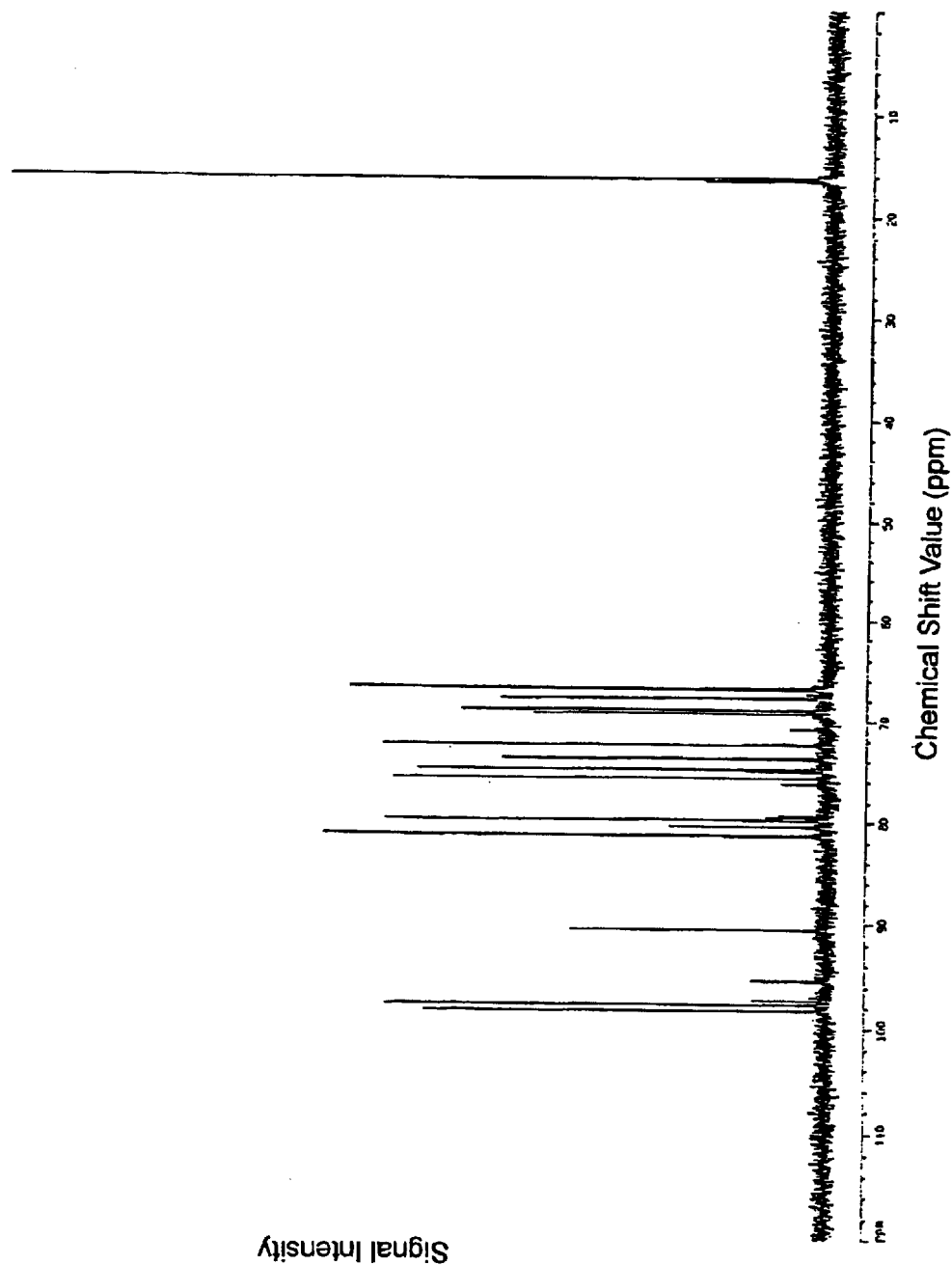
Figure 24:
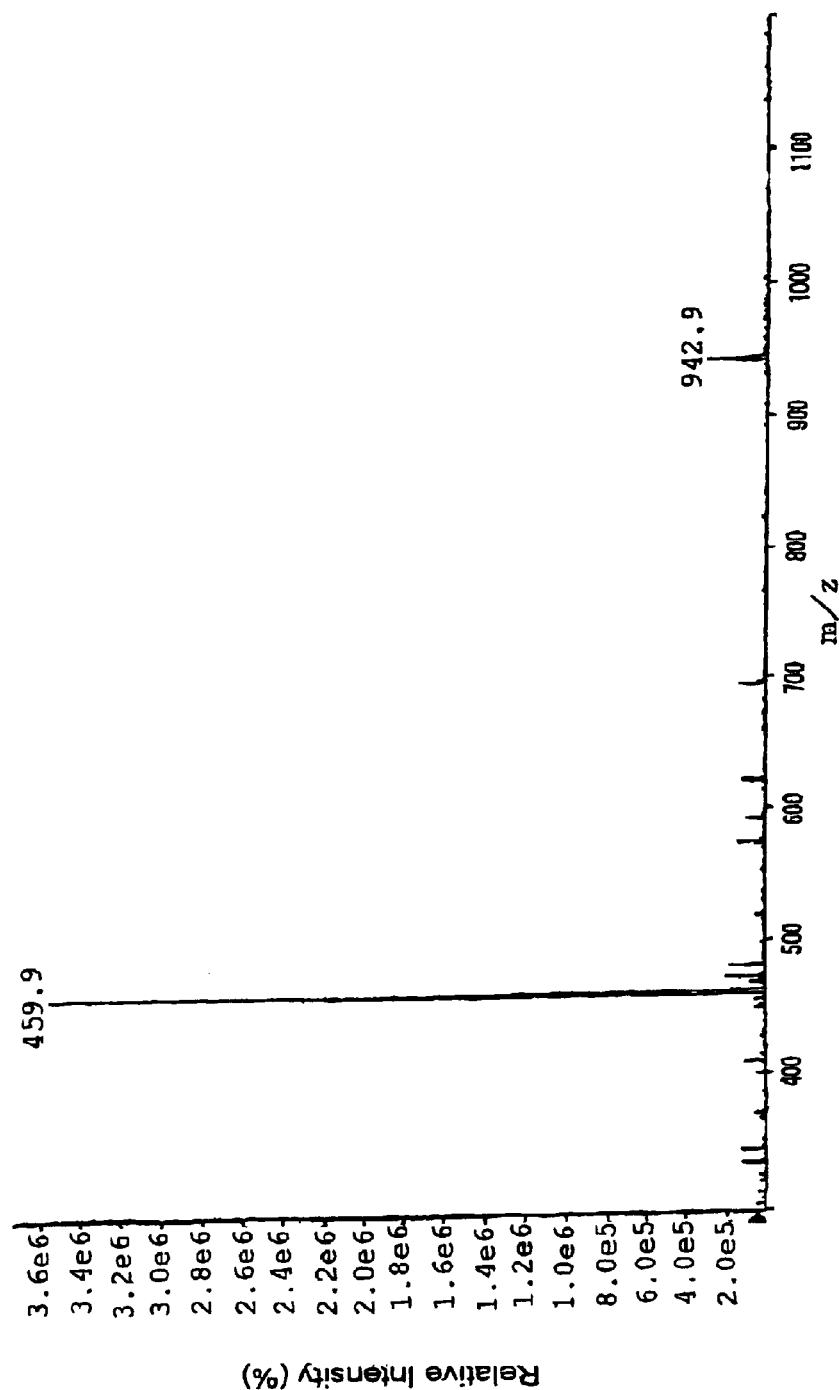
FIG. 24: a figure which illustrates the mass spectrum of the *Lessonia nigrescens* sulfated fucan oligosaccharide 1-(2) according to the present invention.

The results for the mass spectrometric analysis and assignment in NMR analyses are shown below, and the $^1$H-NMR spectrum, $^{13}$C-NMR spectrum, and the mass spectrum of the *Lessonia nigrescens* sulfated fucan oligosaccharide 1-(2) are shown in FIGS. 22, 23, and 24, respectively. In FIGS. 22 and 23, the vertical axes represent the signal intensity and the horizontal axes represent the chemical shift value (ppm). In FIG. 24, the vertical axis represents the relative intensity of the signals and the horizontal axis represents the m/z value.

Molecular weight; 966 MS m/z 459.9[M-2Na$^+$]$^{2-}$, 942.9 [M–Na$^+$]$^-$

The results of $^1$H-NMR and $^{13}$C-NMR analyses are shown in Table 18.

TABLE 18

| | Chemical shift value (ppm) | |
|---|---|---|
| | | $^1$H-NMR |
| | $^{13}$C-NMR | Chemical shift value, multiplicity, coupling constant |
| F1-1 | 90.6 | 5.42, d, 3.6 |
| F1-2 | 75.7 | 4.22, dd, 3.6, 10.4 |
| F1-3 | 73.8 | 4.24, dd, 10.4, 2.4 |
| F1-4 | 80.5 | 4.79, d, 2.4 |
| F1-5 | 66.9 | 4.24, q, 6.4 |
| F1-6 | 16.3 | 1.18, d, 6.4 |

TABLE 18-continued

| | Chemical shift value (ppm) | |
|---|---|---|
| | | $^1$H-NMR |
| | $^{13}$C-NMR | Chemical shift value, multiplicity, coupling constant |
| F2-1 | 98.3 | 5.32, d, 2.0 |
| F2-2 | 74.9 | 4.41, m |
| F2-3 | 72.5 | 4.41, m |
| F2-4 | 79.8 | 4.72, br-s |
| F2-5 | 67.8 | 4.30, q, 6.5 |
| F2-6 | 16.3 | 1.17, d, 6.5 |
| F3-1 | 97.7 | 5.03, d, 3.9 |
| F3-2 | 69.0 | 3.66, dd, 3.9, 10.5 |
| F3-3 | 69.3 | 3.93, dd, 10.5, 2.8 |
| F3-4 | 81.4 | 4.51, d, 2.8 |
| F3-5 | 66.9 | 4.46, q, 6.4 |
| F3-6 | 16.3 | 1.19, d, 6.4 |

Component sugar: only L-fucose (3 molecules)
Sulfate residues: 5 molecules
Sodium: 5 molecules The numbers for signal assignment in $^1$H-NMR and $^{13}$C-NMR analyses are as indicated in formula (XI) below:

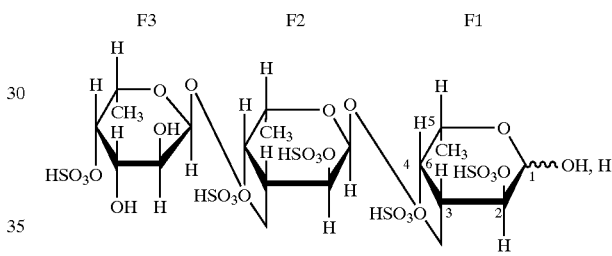

(XI)

(c) Physical Properties of *Lessonia nigrescens* Sulfated Fucan Oligosaccharide 1-(3)

Figure 25:
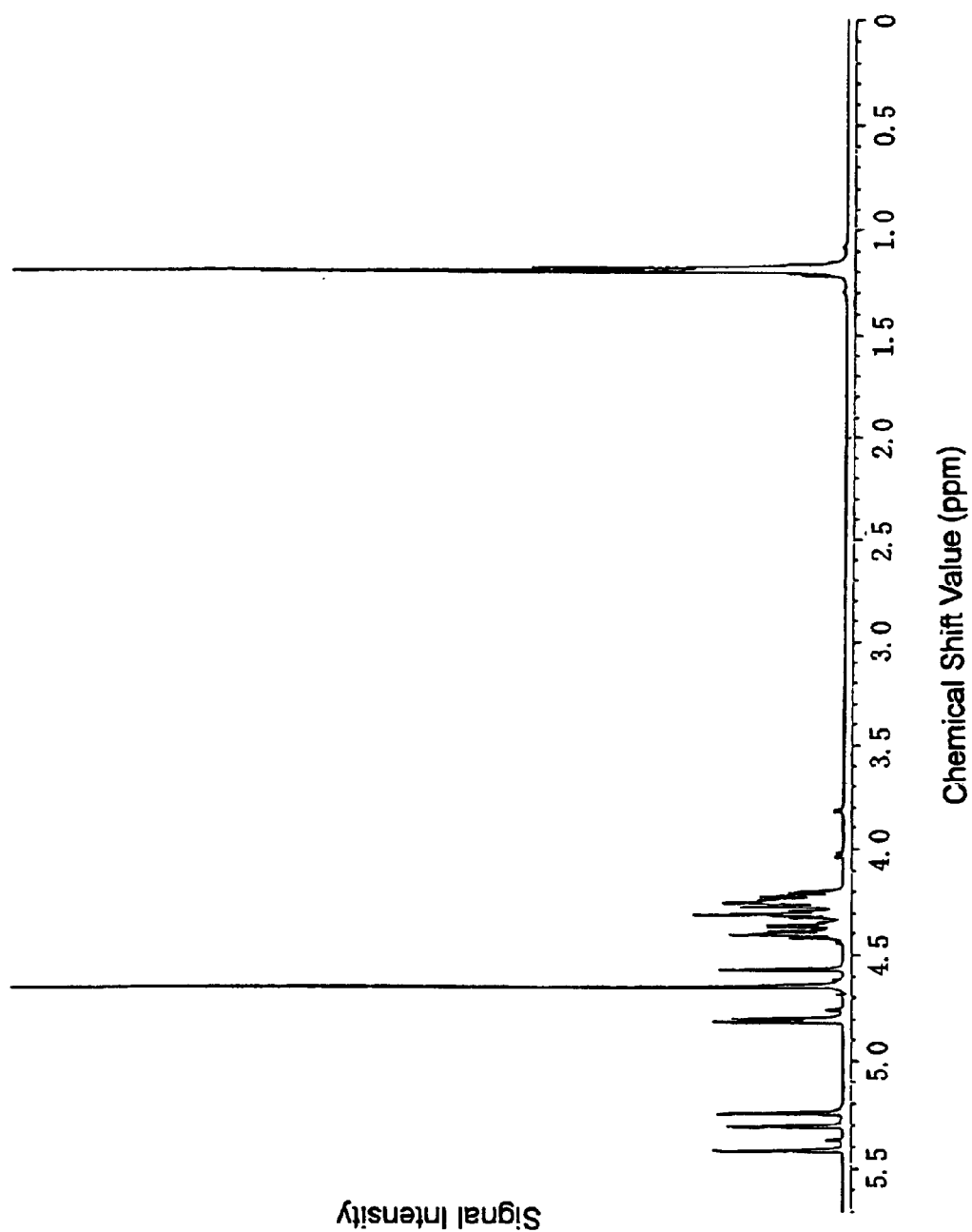
FIG. 25: a figure which illustrates the $^1$H-NMR spectrum of the *Lessonia nigrescens* sulfated fucan oligosaccharide 1-(3) according to the present invention.
Figure 2:
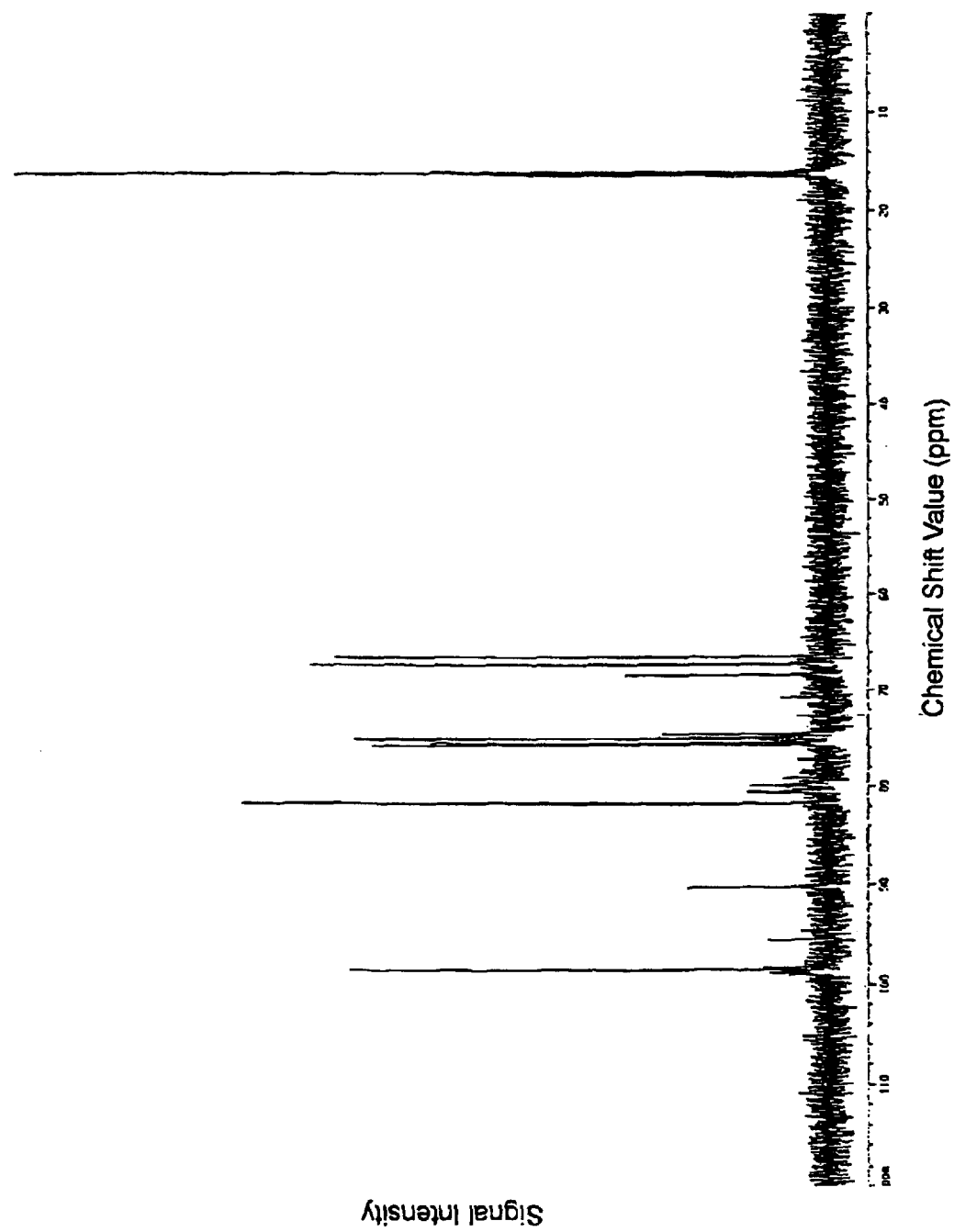
Figure 27:
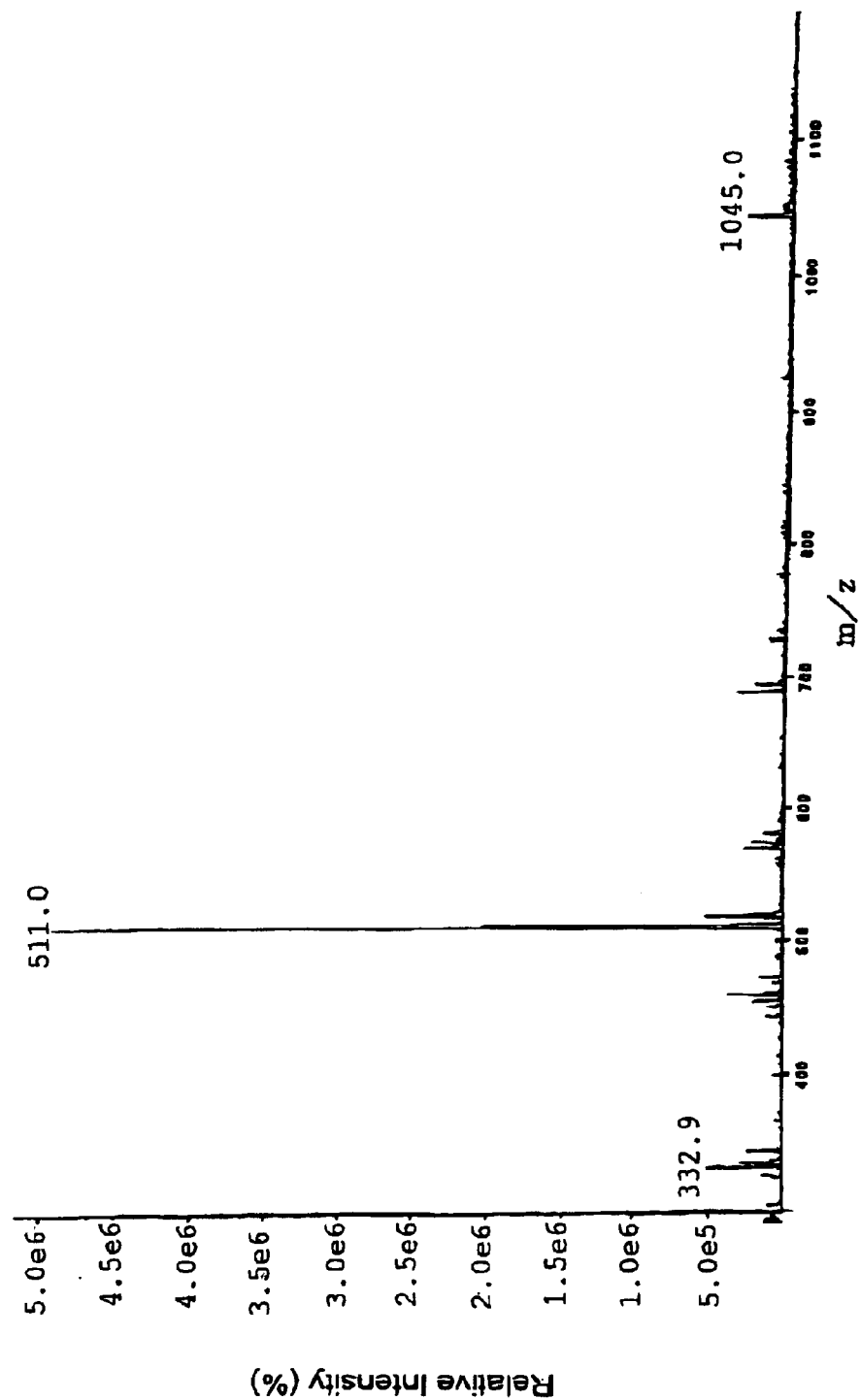
FIG. 27: a figure which illustrates the mass spectrum of the *Lessonia nigrescens* sulfated fucan oligosaccharide 1-(3) according to the present invention.

The results for the mass spectrometric analysis and assignment in NMR analyses are shown below, and the $^1$H-NMR spectrum, $^{13}$C-NMR spectrum, and the mass spectrum are shown in FIGS. 25, 26, and 27, respectively. In FIGS. 25 and 26, the vertical axes represent the signal intensity and the horizontal axes represent the chemical shift value (ppm). In FIG. 27, the vertical axis represents the relative intensity of the signals and the horizontal axis represents the m/z value.

Molecular weight; 1068 MS m/z 332.9 [M-3Na$^+$]$^{3-}$, 511.0 [M-2Na$^+$]$^{2-}$, 1045.0 [M-Na$^+$]$^-$ The results of $^1$H-NMR and $^{13}$C-NMR analyses are shown in Table 19.

TABLE 19

| | Chemical shift value (ppm) | |
|---|---|---|
| | | $^1$H-NMR |
| | $^{13}$C-NMR | Chemical shift value, multiplicity, coupling constant |
| F1-1 | 90.3 | 5.42, d, 3.4 |
| F1-2 | 75.5 | 4.39, dd, 3.4, 10.2 |
| F1-3 | 74.6 | 4.22, dd, 10.2, 2.9 |
| F1-4 | 78.0 | 4.80, d, 2.9 |
| F1-5 | 67.3 | 4.24, q, 6.6 |
| F1-6 | 16.3 | 1.20, d, 6.6 |

TABLE 19-continued

| | Chemical shift value (ppm) | |
|---|---|---|
| $^{13}$C-NMR | $^1$H-NMR Chemical shift value, multiplicity, coupling constant | |
| F2-1 | 98.8 | 5.30, d, 3.3 |
| F2-2 | 75.0 | 4.41, m |
| F2-3 | 75.0 | 4.30, m |
| F2-4 | 80.7 | 4.81, d, 2.6 |
| F2-5 | 68.4 | 4.25, q, 6.7 |
| F2-6 | 16.2 | 1.18, d, 6.7 |
| F3-1 | 98.5 | 5.24, d, 3.2 |
| F3-2 | 75.7 | 4.31, dd, 3.2, 10.4 |
| F3-3 | 66.5 | 4.26, dd, 10.4, 3.0 |
| F3-4 | 81.7 | 4.57, d, 3.0 |
| F3-5 | 67.4 | 4.36, q, 6.6 |
| F3-6 | 16.0 | 1.20, d, 6.6 |

Component sugar: only L-fucose (3 molecules)
Sulfate residues: 6 molecules
Sodium: 6 molecules The numbers for signal assignment in $^1$H-NMR and $^{13}$C-NMR analyses are as indicated in formula (XII) below:

(XII)

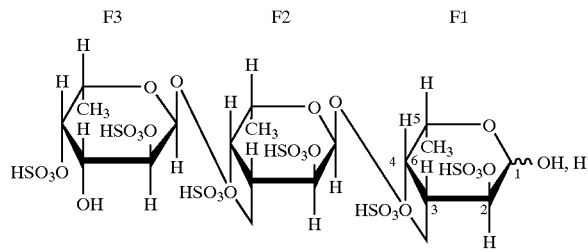

(d) Physical Properties of *Lessonia nigrescens* Sulfated Fucan Oligosaccharide 1-(4)

By the structural analyses of the oligosaccharide as shown in Example 2, the structure of *Lessonia nigrescens* sulfated fucan oligosaccharide 1-(4) was determined to be the same structure as the sulfated fucan oligosaccharide 1-(2) shown in Example 2.

(e) Physical Properties of *Lessonia nigrescens* Sulfated Fucan Oligosaccharide 1-(5)

By the structural analyses of the oligosaccharide as shown in Example 2, the structure of *Lessonia nigrescens* sulfated fucan oligosaccharide 1-(5) was determined to be the same structure as the sulfated fucan oligosaccharide 1-(3) shown in Example 2.

(f) Physical Properties of *Lessonia nigrescens* Sulfated Fucan Oligosaccharide 1-(6)

The results of the mass spectrometric analysis for *Lessonia nigrescens* sulfated fucan oligosaccharides 1-(6) of the present invention are shown below.

Molecular weight; 3461 MS m/z 361.5 [M-9Na$^+$]$^{9-}$, 409.62 [M-8Na$^+$]$^{8-}$, 471.42 [M-7Na$^+$]$^{7-}$, 553.81 [M-6Na$^+$]$^{6-}$, 669.31 [M-5Na$^+$]$^{5-}$, 842.32 [M-4Na$^+$]$^{4-}$, 1130.83 [M-3Na$^+$]$^{3-}$
Component sugar: only L-fucose (11 molecules)
Sulfate residues: 18 molecules
Sodium: 18 molecules (g) Physical Properties of *Lessonia nigrescens* Sulfated Fucan Oligosaccharide 1-(7)-1

The results of the mass spectrometric analysis for *Lessonia nigrescens* sulfated fucan oligosaccharide 1-(7)-1 of the present invention are shown below.

Molecular weight; 4659 MS m/z 442.82 [M-10Na$^+$]$^{10-}$, 494.72 [M-9Na$^+$]$^{9-}$, 559.32 [M-8Na$^+$]$^{8-}$, 642.62 [M-7Na$^+$]$^{7-}$, 753.52 [M-6Na$^+$]$^{6-}$, 908.82 [M-5Na$^+$]$^{5-}$, 1141.43 [M-4Na$^+$]$^{4-}$
Component sugar: only L-fucose (15 molecules)
Sulfate residues: 24 molecules
Sodium: 24 molecules (h) Physical Properties of *Lessonia nigrescens* Sulfated Fucan Oligosaccharide 1-(7)-2

The results of the mass spectrometric analysis for *Lessonia nigrescens* sulfated fucan oligosaccharide 1-(7)-2 of the present invention are shown below.

Molecular weight; 3564 MS m/z 373.12[M-9Na$^+$]$^{9-}$, 422.52 [M-8Na$^+$]$^{8-}$, 486.32 [M-7Na$^+$]$^{7-}$, 571.01 [M-6Na$^+$]$^{6-}$, 689.61 [M-5Na$^+$]$^{5-}$, 868.02 [M-4Na$^+$]$^{4-}$, 1164.93 [M-3Na$^+$]$^{3-}$
Component sugar: only L-fucose (11 molecules)
Sulfate residues: 19 molecules
Sodium: 19 molecules Example 6

Preparation of Sulfated Fucan Oligosaccharide Using Sulfated Fucan-Digesting Enzyme, and Purification and Structural Analysis thereof (1) Preparation 10 g of the fucoidan from cultured *Kjellmaniella crassifolia* as described in Referential Example 1 was dissolved in 4.8 L of 17 mM imidazole-hydrochloride buffer (pH 7.5) containing 125 mM calcium chloride, 250 mM sodium chloride and 10% ethanol. 10 U of the sulfated fucan-digesting enzyme was added thereto. The resulting mixture was stirred at room temperature for 72 hours to obtain a *Kjellmaniella crassifolia* fucoidan oligosaccharide solution. A small molecule fraction recovered from the solution using an ultrafiltration device equipped with hollow fibers with exclusion molecular weight of 10,000 was designated as a sulfated fucan oligosaccharide fraction 3.

(2) Analysis

The sulfated fucan oligosaccharide fraction 3 obtained in (1) above was loaded onto a 1-L DEAE-Cellulofine A-800 column equilibrated with 10 mM imidazole-hydrochloride buffer (pH 6.5) containing 100 mM sodium chloride. After adequately washing with the same buffer, elution was then carried out with a gradient of 100 mM to 1 M sodium chloride. The total sugar content and the total uronic acid content of each of the eluted fractions were measured according to the phenol-sulfuric acid method and the carbazole-sulfuric acid method, respectively. As a result, the eluted fractions formed two peaks. The fractions in the respective peaks were subjected to mass spectrometric analyses. Determination of the saccharide compositions for the respective peaks showed that they contained only fucose but did not contain uronic acid. Compositions of the oligosaccharides having the respective masses estimated based on the saccharide compositions are shown in Table 20.

TABLE 20

| Peak no. | Molecular weight | Composition of oligosaccharide | | |
|---|---|---|---|---|
| | | Fucose | Sulfate group | Sodium |
| 3-(1) | 1564 | 5 | 8 | 8 |
| | 1914 | 6 | 10 | 10 |
| | 2016 | 6 | 11 | 11 |
| | 2162 | 7 | 11 | 11 |
| | 2264 | 7 | 12 | 12 |
| | 2410 | 8 | 12 | 12 |
| 3-(2) | 3110 | 10 | 16 | 16 |
| | 3360 | 11 | 17 | 17 |
| | 3462 | 11 | 18 | 18 |

TABLE 20-continued

| Peak no. | Molecular weight | Composition of oligosaccharide | | |
|---|---|---|---|---|
| | | Fucose | Sulfate group | Sodium |
| | 3710 | 12 | 19 | 19 |
| | 4308 | 14 | 22 | 22 |

It was shown that the sulfated fucan oligosaccharide fraction 3 contained various sulfated fucan oligosaccharides as shown in the table above.

Example 7

Preparation of Sulfated Fucan Oligosaccharide Using Sulfated Fucan-Digesting Enzyme, and Purification, Structural Analysis and Physiological Activity thereof (1) In addition to the four distinct peaks observed in DEAE-Cellulofine column chromatography as described in Example 2-(2), a broad peak eluted with a higher salt concentration was observed. It was collected, designated as an oligosaccharide 4 and subjected to NMR analysis as described in Example 2. As a result, a spectrum almost identical to that for the sulfated fucan oligosaccharide 1-(2) was observed. These results strongly suggested that the oligosaccharide 4 had a structure in which several molecules of the oligosaccharide 1-(2) were connected each other. Then, the oligosaccharide 4 was digested using the sulfated fucan-digesting enzyme as described in Example 1, and the digestion product was analyzed using HPLC. The majority of the reaction products was eluted at the same position as that for the sulfated fucan oligosaccharide 1-(2).

The molecular weight of the oligosaccharide 4 as determined by gel filtration using pullulan as a standard substance was shown to be about triple of the oligosaccharide 1-(2).

Precise analysis of the $^1$H-NMR spectrum for the oligosaccharide 4 revealed that the repeat of seven saccharide residues was bound at the 3-position of fucose F6 in formula (IV) via an α-(1→3) bond.

A monomer to a pentamer of the sulfated saccharide represented by general formula (I) (i.e., sulfated saccharides of general formula (I) wherein n=1 to 5) were obtained from digestion products of a sulfated polysaccharide according to the method as described above.

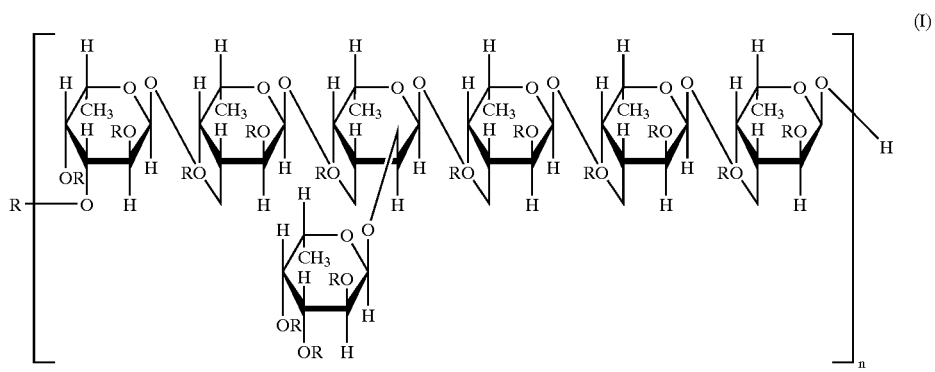

(I)

wherein R is H or SO$_3$H and at least one of Rs is SO$_3$H.

As described above, it was confirmed that a sulfated fucan-containing polysaccharide obtained from a brown alga such as Kjellmaniella crassifolia was converted into smaller molecules by treating it using a sulfated fucan-digesting enzyme, and that a sulfated polysaccharide containing a sulfated saccharide of the general formula above as an essential component of the constituting saccharide was then obtained. The average molecular weight of the sulfated polysaccharide extracted at pH 6–8 at 95° C. for about 2 hour as determined by gel filtration was about 200,000.

(2) The physiological activities of the sulfated saccharide obtained in (1) above were examined. As a result, an activity of inducing HGF production as determined according to the method described in Example 1-(2) in WO 00/62785 was observed for the sulfated polysaccharide of formula (I). In addition, the sulfated saccharides of formula (I) were shown to be very useful in retaining moisture as determined according to the method described in Examples 8 and 9 in WO 99/41288.

The present invention provides a method for producing a sulfated fucan oligosaccharide having a varying molecular weight, which is useful as a reagent for glycotechnology, using a sulfated fucan-digesting enzyme. The present invention also provides various sulfated fucan oligosaccharides of which the structures have been determined.

What is claimed is:

1. A sulfated fucan oligosaccharide obtainable by the method comprising:

allowing a sulfated fucan-digesting enzyme derived from *Alteromonas* sp. SN-1009 to act on the substance selected from the group consisting of:

a sulfated fucan having the following chemical and physical properties:

(1) containing fucose as a constituting saccharide;

(2) containing a sulfated saccharide of general formula (I) as an essential component of the constituting saccharide:

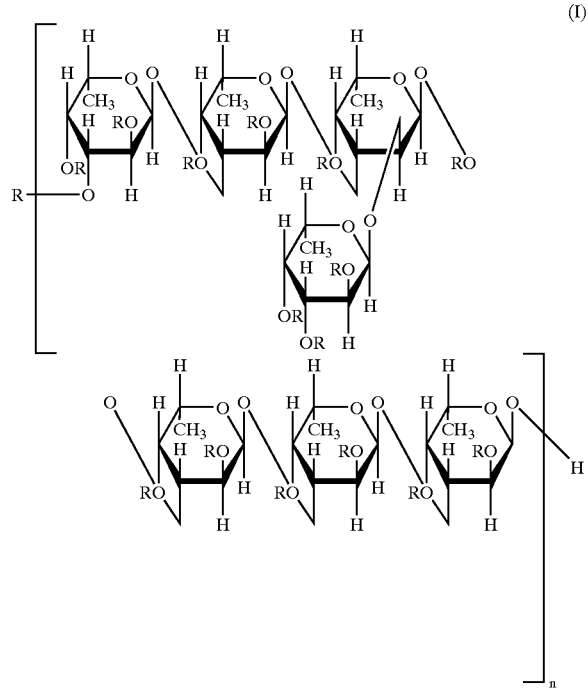
(I)
wherein R is H or SO$_3$H, at least one of R's is SO$_3$H and n is an integer of 1 or more; and
(3) being converted into smaller molecules by a sulfated fucan-digesting enzyme derived from *Alteromonas* sp. SN-1009 to generate at least one compound of general formulas (II), (III), (XIII), (XIV), (XV) and (XVI):
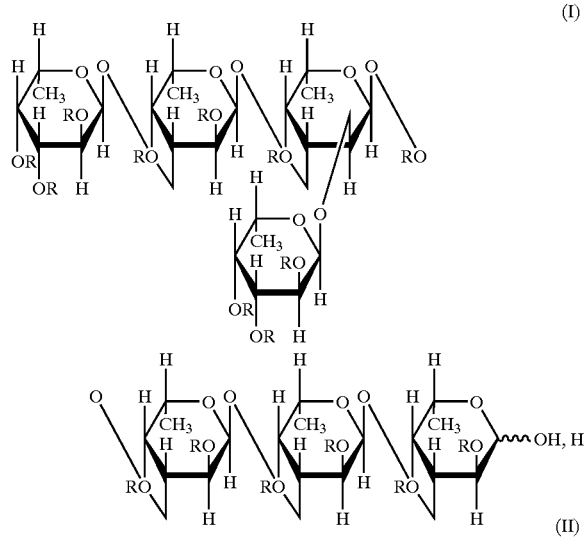
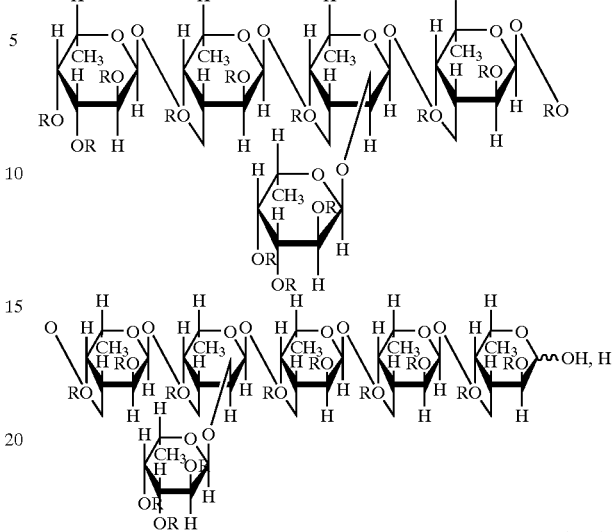
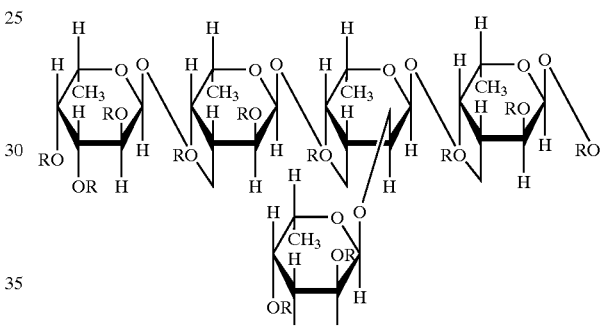
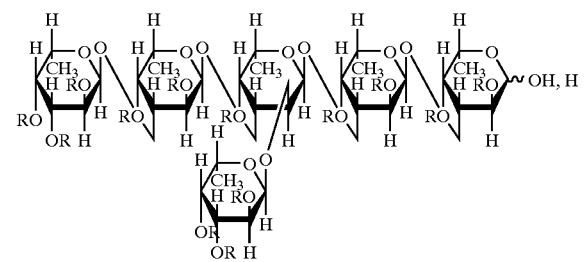
wherein R is H or SO$_3$H, at least one of R's is SO$_3$H in all formulas above, and a sulfated fucan oligosaccharide of general formula (I):

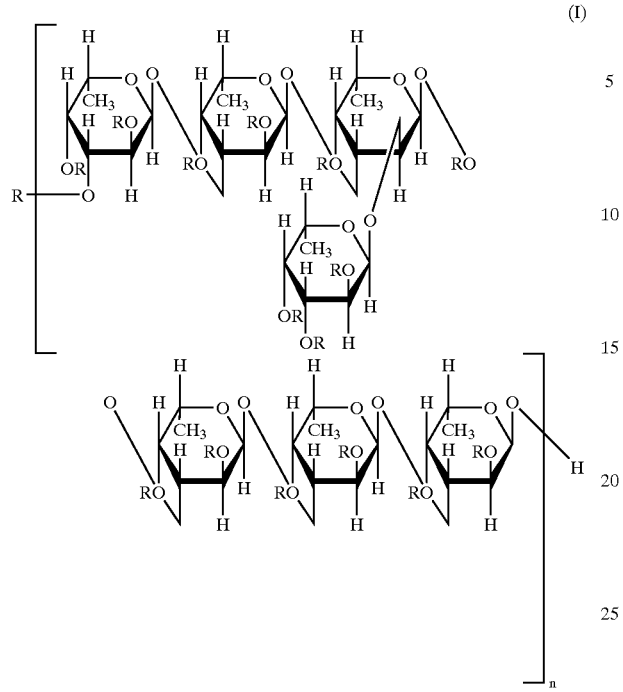

wherein R is H or $SO_3H$, at least one of R's is $SO_3H$ and n is 1 to 5; and collecting a digestion product.

2. A degradation product of sulfated fucan obtainable by the method comprising:

allowing a sulfate fucan-digesting enzyme derived from *Alteromonas* sp. SN-1009 to act on the substance selected from the group consisting of:

a sulfated fucan having the following chemical and physical properties:

(1) containing fucose as a constituting saccharide;

(2) containing a sulfated saccharide of general formula (I) as an essential component of the constituting saccharide:

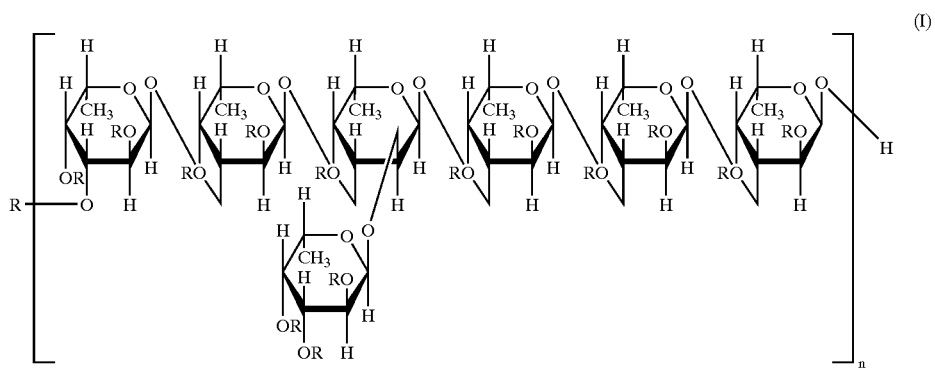

wherein R is H or $SO_3H$, at least one of R's is $SO_3H$ and n is an integer of 1 or more; and (3) being converted into smaller molecules by a sulfated fucan-digesting enzyme derived from *Alteromonas* sp. SN-1009 to generate at least one compound of general formulas (II), (III), (XIII), (XIX), (XV) and (XVI):

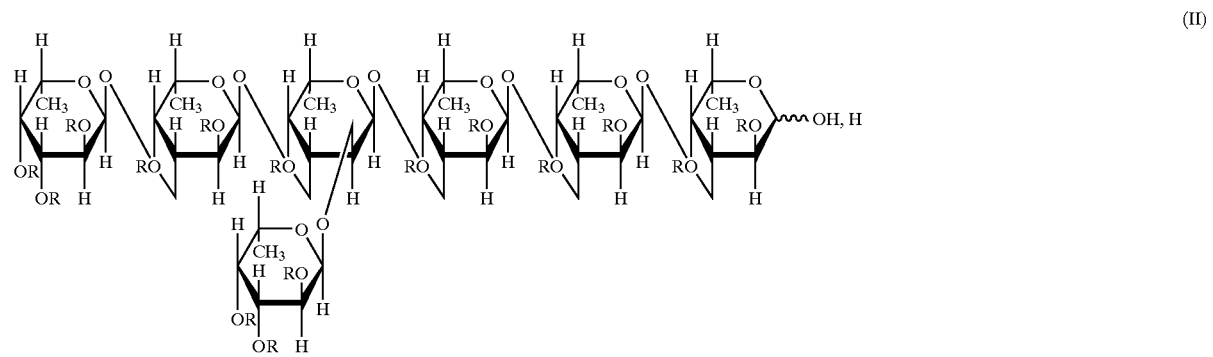

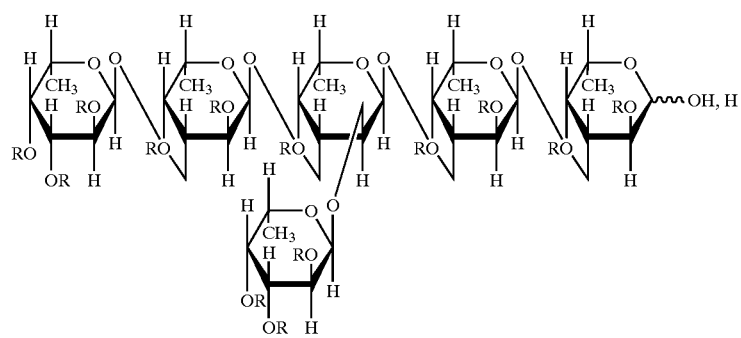
(III)
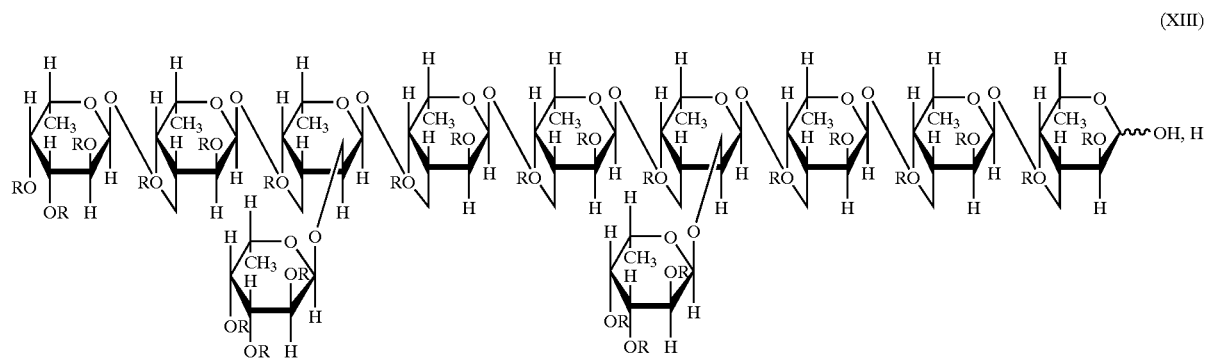
(XIII)
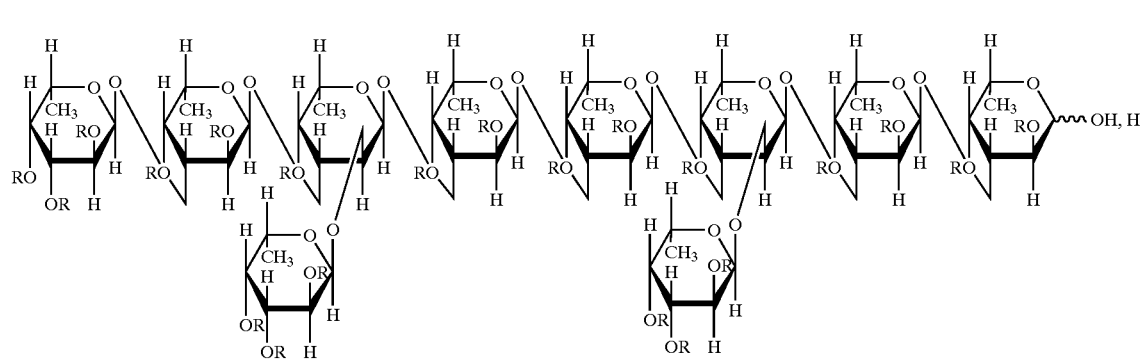
(XIV)
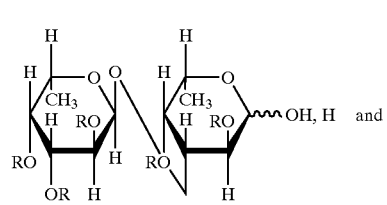
(XV) and
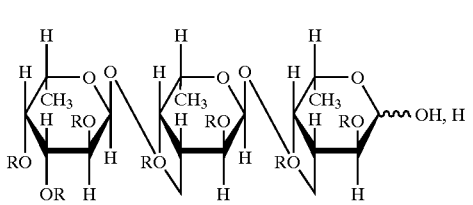
(XVI)
wherein R is H or SO$_3$H, at least one of R's is SO$_3$H in all formulas above; and
a sulfated fucan oligosaccharide of general formula (I):

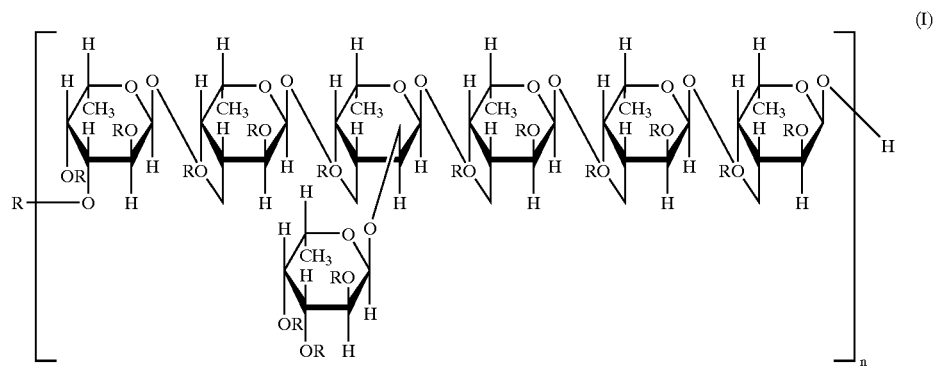
wherein R is H or SO₃H, at lease one of R's is SO₃H and n is 1 to 5.
* * * * *

SEQUENCE LISTING

<160> NUMBER OF SEQ ID NOS: 1

<210> SEQ ID NO 1
<211> LENGTH: 1506
<212> TYPE: DNA
<213> ORGANISM: Fucanobacter lyticus

<400> SEQUENCE: 1

```
agagtttgat cctggctcag attgaacgct ggcggcaggc ttaacacatg caagtcgagc      60
ggaaacgaga atagcttgct attcggcgtc gagcggcgga cgggtgagta atgcttggga     120
atatgcctaa tggtggggga caacagttgg aaacgactgc taataccgca taatgtctac     180
ggaccaaagg aggggattct tcggaacctt tcgccatttg attagcccaa gtgagattag     240
ctagtaggta aggtaatggc ttacctaggc gacgatctct agctggtttg agaggatgat     300
cagccacact gggactgaga cacggcccag actcctacgg gaggcagcag tggggaatat     360
tgcacaatgg gcgaaagcct gatgcagcca tgccgcgtgt gtgaagaagg ccttcgggtt     420
gtaaagcact ttcagcgagg aggaaagggt gtagattaat actctgcatc tgtgacgtta     480
ctcgcagaag aagcaccggc taacttcgtg ccagcagccg cggtaatacg agggtgcaa     540
gcgttaatcg gaattactgg gcgtaaagcg tgcgtaggtg gtttgttaag caagatgtga     600
aagccccggg ctcaacctgg gaactgcatt ttgaactggc aaactagagt tttgtagagg     660
gtagtggaat ttccagtgta gcggtgaaat gcgtagagat tggaaggaac atcagtggcg     720
aaggcggcta cctggacaga gactgacact gaggcacgaa agcgtgggga gcaaacagga     780
ttagataccc tggtagtcca cgccgtaaac gatgtcaact agccgtctgt agacttgatc     840
tgtgggtggc gtagctaacg cgctaagttg accgcctggg gagtacggcc gcaaggttaa     900
aactcaaatg aattgacggg ggcccgcaca agcggtggag catgtggttt aattcgatgc     960
aacgcgaaga accttaccat cccttgacat cctactaagt tactagagat agtttcgtgc    1020
cttcgggaaa gtagtgacag gtgctgcatg gctgtcgtca gctcgtgttg tgaaatgttg    1080
ggttaagtcc cgcaacgagc gcaaccccta tccttatttg ctagcgcgta atggcgagaa    1140
ctctaaggag actgccggtg ataaaccgga ggaaggtggg gacgacgtca agtcatcatg    1200
gcccttacgg gatgggctac acacgtgcta caatggcaag tacagagggc agcaataccg    1260
cgaggtggag cgaatcccac aaagcttgtc gtagtccgga ttggagtctg caactcgact    1320
ccatgaagtc ggaatcgcta gtaatcgtag atcagaatgc tacggtgaat acgttcccgg    1380
gccttgtaca caccgcccgt cacaccatgg gagtgggttg caaaagaagt ggctagttta    1440
acccttcggg gaggacggtc accactttgt gattcatgac tggggtgaag tcgtaacaag    1500
gtagcc                                                                1506
```